US012711903B2

(12) United States Patent
Park et al.

(10) Patent No.: US 12,711,903 B2
(45) Date of Patent: Aug. 18, 2026

(54) PIXEL CIRCUIT AND DISPLAY DEVICE INCLUDING THE SAME

(71) Applicant: LG DISPLAY CO., LTD., Seoul (KR)

(72) Inventors: Se Dong Park, Paju-si (KR); Sun Young Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/963,211

(22) Filed: Nov. 27, 2024

(65) Prior Publication Data

US 2025/0232710 A1 Jul. 17, 2025

(30) Foreign Application Priority Data

Jan. 16, 2024 (KR) ........................ 10-2024-0006447

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01)

(58) Field of Classification Search
None
See application file for complete search history.

(56) References Cited

U.S. PATENT DOCUMENTS

2016/0042686 A1 2/2016 Feng
2022/0310015 A1 9/2022 Wang
2025/0118264 A1 * 4/2025 Lee ...................... G09G 3/3258

FOREIGN PATENT DOCUMENTS

KR 10-2020-0080925 A 7/2020
KR 10-2159390 B1 9/2020
KR 10-2021-0131852 A 11/2021

* cited by examiner

*Primary Examiner* — Ifedayo B Iluyomade
(74) *Attorney, Agent, or Firm* — Birch, Stewart, Kolasch & Birch, LLP

(57) ABSTRACT

A pixel circuit can include a light-emitting element, a first driving transistor, a second driving transistor, a first emission switch transistor configured to electrically connect the first driving transistor to the light-emitting element in response to a light emission signal, and a second emission switch transistor configured to electrically connect the second driving transistor to the light-emitting element in response to the light emission signal. Also, the pixel circuit can include a first circuit configured to charge a first data voltage during a first driving period and transfer the light emission signal to the first emission switch transistor during a second driving period, and a second circuit configured to transmit the light emission signal to the second emission switch transistor during the first driving period and charge a second data voltage during the second driving period.

23 Claims, 63 Drawing Sheets

PIXEL CIRCUIT AND DISPLAY DEVICE INCLUDING THE SAME

CROSS-REFERENCE TO RELATED APPLICATION

This application claims priority to Korean Patent Application No. 10-2024-0006447, filed in the Republic of Korea, on Jan. 16, 2024, the entirety of which is incorporated by reference into the present application.

BACKGROUND

1) Field

The present disclosure relates to a pixel circuit and a display device including the same.

2) Description of the Related Art

Various flat panel display devices, such as a liquid crystal display device and an electroluminescent display device, can be used to display information. The electroluminescent display device can use light emitting elements arranged in each pixel to emit light by itself without a backlight, thereby displaying an input image. The light emitting elements of the electroluminescent display device can be categorized as an organic light emitting element and an inorganic light emitting element depending on the material of a light emitting layer.

Recently, a display device that uses a light emitting diode (LED), which is an inorganic light emitting element, as a light emitting element of a pixel has attracted attention as a next-generation display device. Since the LED is made of an inorganic material, it does not require a separate encapsulation layer to protect an organic material from moisture, and it has superior reliability and long lifespan compared to an organic light emitting diode (OLED). In addition, the LED has a fast light-up speed, good response time, excellent luminous efficiency, and impact resistance.

For inorganic light-emitting devices such as micro-LEDs, the luminous efficiency of the light-emitting elements may vary depending on the wavelength of the light emitted by the light-emitting elements, depending on the material properties of a light-emitting layer. Luminous efficiency is the efficiency expressed as luminance relative to the current applied to a light-emitting element. The driving period of a pixel circuit can be divided into a writing period of pixel data of an input image and a light emission period in a frame period. The light-emitting elements of certain colors have a peak efficiency band at higher voltages, but when the voltage is increased, the luminance may become too high, causing the color coordinates and white balance to deviate from the target values, resulting in a deterioration of an image quality.

SUMMARY OF THE DISCLOSURE

The present disclosure aims to solve the above-described necessity and/or problems.

The present disclosure provides a pixel circuit capable of driving each of the light-emitting elements in the maximum efficiency region without degrading image quality, and a display device including the pixel circuit.

The objects of the present disclosure are not limited to the above-mentioned objects, and other objects, which are not mentioned herein, will obviously be understood by those skilled in the art from the following description.

A pixel circuit according to an embodiment of the present disclosure includes a light-emitting element, a first driving transistor, a second driving transistor, a first EM switch transistor configured to electrically connect the first driving transistor to the light-emitting element in response to a light emission signal, a second EM switch transistor configured to electrically connect the second driving transistor to the light-emitting element in response to the light emission signal, a first circuit configured to charge a first data voltage during a first driving period and to transfer the light emission signal to the first EM switch transistor during a second driving period, and a second circuit configured to transmit the light emission signal to the second EM switch transistor during the first driving period and to charge a second data voltage during the second driving period.

Each of the first and second driving periods can be an I-frame period, where I is a natural number. A duty ratio of the light emission signal can be set independently for each color of the light-emitting element.

The first circuit and the second circuit can receive a first mask signal, a second mask signal, and the light emission signal. The voltage of the first mask signal and the voltage of the second mask signal can be inverted every cycle of an I-frame period, where I is a natural number. The voltage of the second mask signal can be a gate-off voltage when the voltage of the first mask signal is a gate-on voltage, and the voltage of the second mask signal can be the gate-on voltage when the voltage of the first mask signal is the gate-off voltage.

The first circuit and the second circuit can receive a first scan signal and a second scan signal. Each of the first scan signal, the second scan signal, the first mask signal, the second mask signal, and the light emission signal can swing between the gate-on voltage and the gate-off voltage.

The first circuit can include a plurality of first mask switch transistor configured to transmit the first mask signal and the second mask signal to different nodes in the first circuit. The second circuit can include a plurality of second mask switch transistors configured to transmit the first mask signal and the second mask signal to different nodes in the second circuit.

The first driving transistor can include a first electrode connected to a first-first node, a gate electrode connected to a first-second node, and a second electrode connected to a first-third node. The second driving transistor can include a first electrode connected to a second-first node, a gate electrode connected to a second-second node, and a second electrode connected to a second-third node. An anode electrode of the light-emitting element can be connected to a first power line to which a pixel driving voltage is applied, and a cathode electrode of the light-emitting element can be connected to a first-fourth node. The first EM switch transistor can include a first-first switch element including a first electrode connected to the first-fourth node, a gate electrode connected to a first-eighth node to which the light emission signal is applied, and a second electrode connected to the first-first node, and a first-second switch element including a first electrode connected to the first-third node, a gate electrode connected to the first-eighth node, and a second electrode connected to a second power line to which a ground voltage is applied. The second EM switch transistor can include a second-first switch element including a first electrode connected to the first-fourth node, a gate electrode connected to a second-eighth node to which the light emission signal is applied, and a second electrode connected to the second-first node, and a second-second switch element including a first electrode connected to the second-third node, a gate electrode connected to the second-eighth node, and a second electrode connected to the second power line.

The first circuit can include a first-third switch element including a first electrode connected to the first-fifth node, a gate electrode connected to the first-eighth node, and a second electrode connected to a third power line to which a reference voltage is applied, a first-fourth switch element including a first electrode connected to the third power line, a gate electrode connected to a first-seventh node to which the second scan signal is applied, and a second electrode connected to the first-third node, a first-fifth switch element including a first electrode connected to a data line to which a data voltage is applied, a gate electrode connected to a first-sixth node to which the first scan signal is applied, and a second electrode connected to the first-fifth node, a first-sixth switch element including a first electrode connected to the first-second node, a gate electrode connected to the first-sixth node, and a second electrode connected to the first-third node, a first-seventh switch element including a first electrode connected to the first power line, a gate electrode connected to the first-sixth node, and a second electrode connected to the first-first node, and a first-first capacitor connected between the first-second node and the first-fifth node.

The second circuit can further include a second-third switch element including a first electrode connected to the second-fifth node, a gate electrode connected to the second-eighth node, and a second electrode connected to the third power line, a second-fourth switch element including a first electrode connected to the third power line, a gate electrode connected to a second-seventh node to which the second scan signal is applied, and a second electrode connected to the second-third node, a second-fifth switch element including a first electrode connected to the data line, a gate electrode connected to a second-sixth node to which the first scan signal is applied, and a second electrode connected to the second-fifth node, a second-sixth switch element including a first electrode connected to the second-second node, a gate electrode connected to the second-sixth node, and a second electrode connected to the second-third node, a second-seventh switch element including a first electrode connected to the first power line, a gate electrode connected to the second-sixth node, and a second electrode connected to the second-first node, and a second-first capacitor connected between the second-second node and the second-fifth node.

The pixel circuit can further include a first-eighth switch transistor including a first electrode connected to a first gate line to which the first scan signal is applied, a gate electrode connected to a first mask signal line to which the first mask signal is applied, and a second electrode connected to the first-sixth node, a first-ninth switch transistor including a first electrode connected to a second gate line to which the second scan signal is applied, a gate electrode connected to the first mask signal line, and a second electrode connected to the first-seventh node, a first-tenth switch element including a first electrode connected to a third gate line to which the light emission signal is applied, a gate electrode connected to a second mask signal line to which the second mask signal is applied, and a second electrode connected to the first-eighth node, a second-eighth switch element including a first electrode connected to the first gate line, a gate electrode connected to the second mask signal line, and a second electrode connected to the second-sixth node, a second-ninth switch element including a first electrode connected to the second gate line, a gate electrode connected to the second mask signal line, and a second electrode connected to the second-seventh node, and a second-tenth switch element including a first electrode connected to the third gate line, a gate electrode connected to the first mask signal line, and a second electrode connected to the second-eighth node. Each of the first-first to first-tenth switch transistors and each of the second-first to second-tenth switch transistors can be turned on in response to the gate-on voltage and to be turned off in response to the gate-off voltage.

During a first period of each of the first frame period and the second frame period, the voltage of the second scan signal can be the gate-on voltage, and the voltage of the first scan signal can be the gate-off voltage. During a second period of each of the first frame period and the second frame period, the voltage of the first scan signal and the second scan signal can be the gate-on voltage. During a third period of each of the first frame period and the second frame period, the voltage of the first scan signal can be the gate-on voltage, and the voltage of the second scan signal can be the gate-off voltage. During a fourth period of each of the first frame period and the second frame period, the voltage of the first scan signal and the second scan signal can be the gate-off voltage. The voltage of the light emission signal can swing between the gate-on voltage and the gate-off voltage in at least one of the first period, the second period, the third period, and the fourth period of the first frame period. The voltage of the light emission signal can swing between the gate-on voltage and the gate-off voltage in at least one of the first period, the second period, the third period, and the fourth period of the second frame period.

The first mask signal can be the gate-on voltage during the first frame period and the gate-off voltage during the second frame period. The second mask signal can be the gate-off voltage during the first frame period and the gate-on voltage during the second frame period.

The first circuit can further include a first-second capacitor connected between the first power line and the first-first node, and a first-third capacitor connected between the first-first node and the first-second node. The second circuit can further include a second-second capacitor connected between the first power line and the second-first node, and a second-third capacitor connected between the second-first node and the second-second node.

The first driving transistor can include a first electrode connected to a first-first node to which a pixel driving voltage is applied, a gate electrode connected to a first-second node, and a second electrode connected to a first-third node. The second driving transistor can include a first electrode connected to a second-first node to which the pixel driving voltage is applied, a gate electrode connected to a second-second node, and a second electrode connected to a second-third node. An anode electrode of the light-emitting element can be connected to a first-fourth node, and a cathode electrode of the light-emitting element can be connected to a second power line to which a ground voltage is applied. The first EM switch transistor can include a first-first switch transistor including a first electrode connected to the first-third node, a gate electrode connected to a first-eighth node to which the light emission signal is applied, and a second electrode connected to the first-fourth node. The second EM switch transistor can include a second-first switch transistor including a first electrode connected to the second-third node, a gate electrode connected to a second-eighth node to which the emission signal is applied, and a second electrode connected to the first-fourth node.

The first circuit can include a first-second switch element including a first electrode connected to a first-fifth node, a gate electrode connected to the first-eighth node, and a second electrode connected to a third power line to which a reference voltage is applied, a first-third switch element including a first electrode connected to the first-second node, a gate electrode connected to a first-seventh node to which the second scan signal is applied, and a second electrode connected to the third power line, a first-fourth switch element including a first electrode connected to a data line to which a data voltage is applied, a gate electrode connected to a first-sixth node to which the first scan signal is applied, and a second electrode connected to the first-fifth node, a first-fifth switch element including a first electrode connected to the first-second node, a gate electrode connected to the first-sixth node, and a second electrode connected to the first-third node, a first-sixth switch element including a first electrode connected to the data line, a gate electrode connected to the first-seventh node, and a second electrode connected to the first-fifth node, and a first-first capacitor connected between the first-second node and the first-fifth node.

The second circuit can include a second-second switch element including a first electrode connected to a second-fifth node, a gate electrode connected to the second-eighth node, and a second electrode connected to the third power line, a second-third switch element including a first electrode connected to the second-second node, a gate electrode connected to a second-seventh node to which the second scan signal is applied, and a second electrode connected to the third power line, a second-fourth switch element including a first electrode connected to the data line, a gate electrode connected to a second-sixth node to which the first scan signal is applied, and a second electrode connected to the second-fifth node, a second-fifth switch element including a first electrode connected to the second-second node, a gate electrode connected to the second-sixth node, and a second electrode connected to the second-third node, a second-sixth switch element including a first electrode connected to the data line, a gate electrode connected to the second-seventh node, and a second electrode connected to the second-fifth node, and a second-first capacitor connected between the second-second node and the second-fifth node.

The pixel circuit can further include a first-seventh switch transistor including a first electrode connected to a first gate line to which the first scan signal is applied, a gate electrode connected to a first mask signal line to which the first mask signal is applied, and a second electrode connected to the first-sixth node, a first-eighth switch transistor including a first electrode connected to a second gate line to which the second scan signal is applied, a gate electrode connected to the first mask signal line, and a second electrode connected to the first-seventh node, a first-ninth switch element including a first electrode connected to a third gate line to which the light emission signal is applied, a gate electrode connected to a second mask signal line to which the second mask signal is applied, and a second electrode connected to the first-eighth node, a second-seventh switch element including a first electrode connected to the first gate line, a gate electrode connected to the second mask signal line, and a second electrode connected to the second-sixth node, a second-eighth switch element including a first electrode connected to the second gate line, a gate electrode connected to the second mask signal line, and a second electrode connected to the second-seventh node, and a second-ninth switch element including a first electrode connected to the third gate line, a gate electrode connected to the first mask signal line, and a second electrode connected to the second-eighth node. Each of the first-first to first-ninth switch transistors and the second-first to second-ninth switch transistors can be turned on in response to the gate-on voltage and to be turned off in response to the gate-off voltage.

During a first period of each of the first frame period and the second frame period, the voltage of the second scan signal can be the gate-on voltage, and the voltage of the first scan signal can be the gate-off voltage. During a second period of each of the first frame period and the second frame period, the voltage of the first scan signal and the second scan signal can be the gate-off voltage. During a third period of each of the first frame period and the second frame period, the voltage of the first scan signal can be the gate-on voltage, and the voltage of the second scan signal can be the gate-off voltage. During a fourth period of each of the first frame period and the second frame period, the voltage of the first scan signal and the second scan signal can be the gate-off voltage. The voltage of the light emission signal can swing between the gate-on voltage and the gate-off voltage in at least one of the first period, the second period, the third period, and the fourth period of the first frame period. The voltage of the light emission signal can swing between the gate-on voltage and the gate-off voltage in at least one of the first period, the second period, the third period, and the fourth period of the second frame period.

The first mask signal can be the gate-on voltage during the first frame period and the gate-off voltage during the second frame period. The second mask signal can be the gate-off voltage during the first frame period and the gate-on voltage during the second frame period.

A display device according to one embodiment of the present disclosure can include: a display panel in which a plurality of data lines, a plurality of gate lines, a plurality of power lines, and a plurality of sub-pixels are arranged, a data driver configured to output a data voltage to the data lines, and a gate driver configured to output a gate signal to the gate lines. Each of the sub-pixels further include the pixel circuit.

The gate signal can include a first scan signal, a second scan signal, and the light-emitting signal. The first scan signal can be applied to a first gate line connected to the first circuit and the second circuit at each of the sub-pixels. The second scan signal can be applied to a second gate line connected to the first circuit and the second circuit at each of the sub-pixels.

The light emission signal can include a first emission signal applied to a first EM line connected to sub-pixels of a first color, a second light emission signal applied to a second EM line connected to sub-pixels of a second color, and a third light emission signal applied to a third EM line connected to sub-pixels of a third color. A duty ratio of the first light emission signal can be different from a duty ratio of each of the second light emission signal and the third light emission signal.

The display device can include a circuit configured to output a first mask signal and a second mask signal. The display panel can include a first mask line configured to supply the first mask signal to the sub-pixels, and a second mask line configured to supply the second mask signal to the sub-pixels. The voltage of the second mask signal can be a gate-off voltage when the voltage of the first mask signal is a gate-on voltage, and the voltage of the second mask signal can be the gate-on voltage when the voltage of the first mask signal is the gate-off voltage. The voltage of the first mask signal and the voltage of the second mask signal can be inverted every cycle of an I-frame period, where I is a natural number.

According to the embodiments of the present disclosure, it is possible to improve the lifetime of the light-emitting element and drive the light-emitting element at low power by driving the light-emitting element with high efficiency and high luminance, as well as to implement the pixel circuit capable of driving each light-emitting element in a maximum efficiency region without deteriorating the image quality, and a display device including the same.

According to the present disclosure, one pixel circuit can include a circuit for performing data writing and a circuit for driving the light-emitting elements, and alternately drive the light-emitting elements in units of predetermined time so that the light-emitting elements can emit light while the data is being written, thereby freely controlling the light-on duty ratio of the respective light-emitting elements for each color without time constraints due to the time required for the data writing.

The effects of the present disclosure are not limited to those mentioned above, and other effects that are not mentioned will be clearly understood by those skilled in the art from the following description and the appended claims.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, in which.

DETAILED DESCRIPTION OF THE EMBODIMENTS

Figure 1:
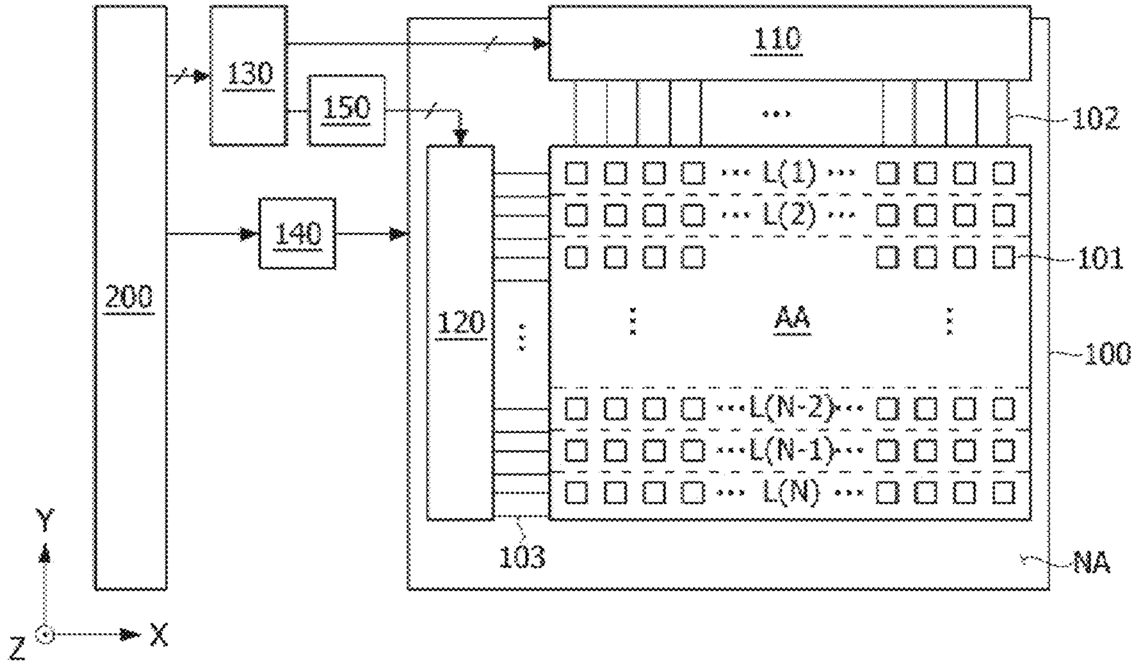
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure is only defined by the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as "comprising," "including," "having," and "containing" used herein are generally intended to allow other components to be added unless the terms are used with the term "only." Any references to singular can include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components can be interposed between them, unless "immediately" or "directly" is used.

When a temporal antecedent relationship is described, such as "after," "following," "next to," "before," or the like, it may not be continuous on a time base unless "immediately" or "directly" is used.

The terms "first," "second," and the like can be used to distinguish elements from each other, but the functions or structures of the components are not limited by ordinal numbers or component names in front of the components. Also, the term "can" includes all meanings and definitions of the term "may."

The following embodiments can be partially or entirely bonded to or combined with each other and can be linked and operated in technically various ways. The embodiments can be carried out independently of or in association with each other.

The pixel circuit of the display device can include a plurality of transistors. A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS)), since carriers are holes, a source voltage is higher than a drain voltage such that holes can flow from a source to a drain. In the p-channel transistor, since holes flow from the source to the drain, current flows from the source to the drain. It should be noted that a source and a drain of a transistor are not fixed. For example, a source and a drain can be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the situation of an n-channel transistor, the gate-on voltage can be a gate high voltage VGH, and the gate-off voltage can be a gate low voltage VGL. In the situation of a p-channel transistor, the gate-on voltage can be the gate low voltage VGL, and the gate-off voltage can be the gate high voltage VGH.

Hereinafter, various embodiments of the present disclosure will be described in detail with reference to the accompanying drawings.

Referring to FIG. 1, a display device according to one embodiment of the present disclosure includes a display panel 100, a display panel driving circuit for writing pixel data to pixels 101 of the display panel 100, and a power supply 140 that generates power to drive the pixels 101 and the display panel driving circuit.

A substrate of the display panel 100 can be a plastic substrate, a thin glass substrate, or a metal substrate, but is not limited thereto. The display panel 100 can be a rectangular panel having a length in an X-axis direction (or a first direction), a width in a Y-axis direction (or a second direction), and a thickness in a Z-axis direction (or a third direction), but is not limited thereto. For example, at least a portion of the display panel 100 can have a curved perimeter.

The display panel 100 can be implemented as a non-transmissive display panel or a transmissive display panel. The transmissive display panel can be applied to a transparent display device in which an image is displayed on a screen and a real object is visible beyond the display panel. The display panel 100 can be manufactured as a flexible display panel. In addition, the display panel 100 can be manufactured as a stretchable panel that can extend.

A display area AA of the display panel 100 includes a pixel array that displays an input image. The pixel array includes a plurality of data lines 102, a plurality of gate lines 103 intersecting the data lines 102, and the pixels 101 arranged in a matrix form. The display panel 100 can further include power lines connected in common to the pixels 101. The power lines are connected in common to the pixels 101 to supply the pixels with a constant voltage required to drive the pixels 101. The power lines can be implemented as long stripe wires along the first direction or the second direction, or as mesh wires in which wires in the first direction and wires in the second direction are electrically connected.

The display panel 100 can further include at least first and second mask signal lines. The mask signal lines can be commonly connected to the pixels 101. The first and second mask signal lines can be implemented as long stripe wires along either the first or second direction, or as mesh wires in which the wires in the first direction and the wires in the second direction are electrically connected.

Each of the pixels 101 can be divided into a red sub-pixel, a green sub-pixel, and a blue sub-pixel for color implementation. Each of the pixels can further include a white sub-pixel. Each sub-pixel includes a pixel circuit for driving a light-emitting element. Hereinafter, a "pixel" can be interpreted as having the same meaning as a "sub-pixel."

The pixel array includes a plurality of pixel lines L(1) to L(N). Where N is a natural number greater than or equal to 2. Each of the pixel lines L(1) to L(N) includes one line of pixels arranged along the line direction (X-axis direction) in the pixel array of the display panel 100. The pixels arranged in one pixel line can share a gate line 103. The sub-pixels arranged in the column direction (Y-axis direction) along a data line direction can share the same data line 102. One horizontal period is a time obtained by dividing one frame period by the total number of pixel lines L(1) to L(N).

The power supply 140 generates the constant voltages (or direct current (DC) voltages) for driving the pixel array and the display panel driving circuit of the display panel 100 using a DC-DC converter. The DC-DC converter can include a charge pump, a regulator, a buck converter, a boost converter, and the like. The power supply 140 can adjust the level of the input voltage from a host system 200 to output constant voltages, such as a gamma reference voltage, a data driving voltage, a gate-low voltage, a gate-high voltage, a pixel driving voltage, a pixel ground voltage (hereinafter referred to as "ground voltage"), a pixel reference voltage (hereinafter referred to as "reference voltage"), and the like. The gamma reference voltage and the data driving voltage are supplied to the data driver 110. A dynamic range of the data voltage output from the data driver 110 is determined according to a voltage range of the gamma reference voltage. The dynamic range of the data voltage is the range of voltages between the maximum voltage and the minimum voltage of the data voltage. The data driving voltage is the voltage supplied to a VDD terminal of an output buffer in each of the channels of the data driver 110 to drive the output buffer.

The gate-high voltage and the gate-low voltage are supplied to a level shifter 150 and the gate driver 120. The constant voltages such as the pixel driving voltage, the ground voltage, the reference voltage, and the like are supplied to the pixels 101 through the power lines commonly connected to the pixels 101. The reference voltage can be interpreted as the initialization voltage. The pixel driving voltage can be supplied from a main power source of the host system 200 to the display panel 100. In this situation, the power supply 140 does not need to output the pixel driving voltage.

The display panel driving circuit writes the pixel data of the input image to the pixels of the display panel 100 under the control of the timing controller 130. The display panel driving circuit includes the data driver 110 and the gate driver 120.

The display panel driving circuit can further include a touch sensor driver for driving touch sensors. The touch sensor driver is omitted from FIG. 1. The data driver 110 and the touch sensor driver can be integrated into one drive IC (Integrated Circuit). The timing controller 130, the power supply 140, the level shifter 150, the data driver 110, and the touch sensor deriver can be further integrated into the drive IC.

The data driver 110 receives the pixel data of the input image received as a digital signal from the timing controller 130 and outputs the data voltage. The data driver 110 converts the pixel data of an input image into a gamma compensation voltage using a digital-to-analog converter (DAC) to output the data voltage. The gamma reference voltage is divided into a grayscale-specific gamma compensation voltage by a voltage divider circuit in the data driver 110 and is supplied to the DAC. The DAC generates the data voltage as the gamma compensation voltage corresponding to the grayscale value of the pixel data. The data voltages output from the DAC are output to the data lines 102 through output buffers in the respective data output channels of the data driver 110.

The gate driver 120 can be formed on the display panel 100 together with a TFT array of the pixel array and the wires. The gate driver 120 can be disposed in the non-display area NA outside the display area AA in the display panel 100, or at least a portion thereof can be disposed in the display area AA.

The gate driver 120 can be disposed in either a left non-display area NA or a right non-display area NA outside the display area AA in the display panel 100 so that the gate signal can be supplied to the gate lines 103 in a single feeding method. In the single feeding method, the gate signal is applied to one ends of the gate lines. The gate driver 120 can be disposed in the left non-display area NA and the right non-display area NA in the display panel 100 to apply the gate signal to the gate lines 103 in a double feeding method. In the double feeding method, the gate signal is applied simultaneously to both ends of the gate lines 103. At least some circuits of the gate driver 120 can be disposed within the display area AA.

The gate driver 120 can include a shift register and/or an edge trigger to output and shift the pulse of the gate signal under the control of the timing controller 130. The gate driver 120 can output a plurality of gate signals with different waveforms. In this situation, the gate driver 120 can include a plurality of gate drivers that output different gate signals.

Figure 3:
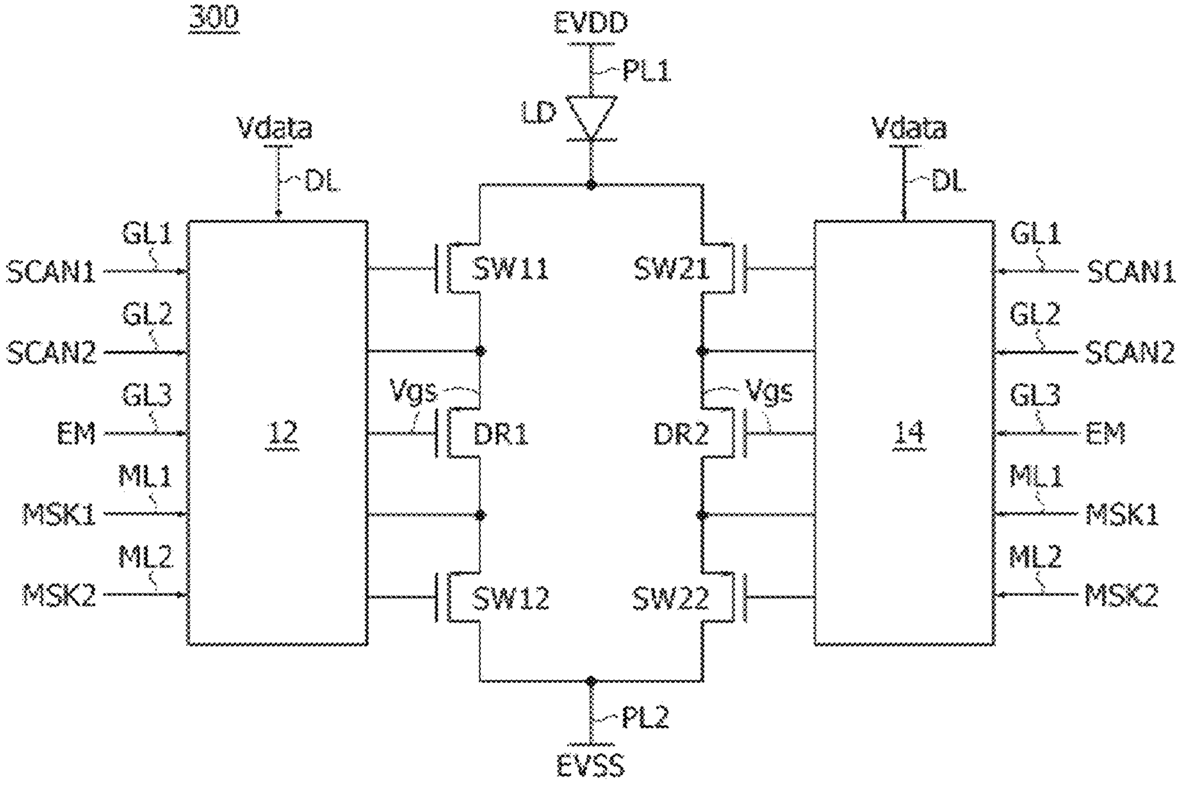
FIG. 3 is a circuit diagram illustrating a pixel circuit according to an embodiment of the present disclosure.
Figure 5:
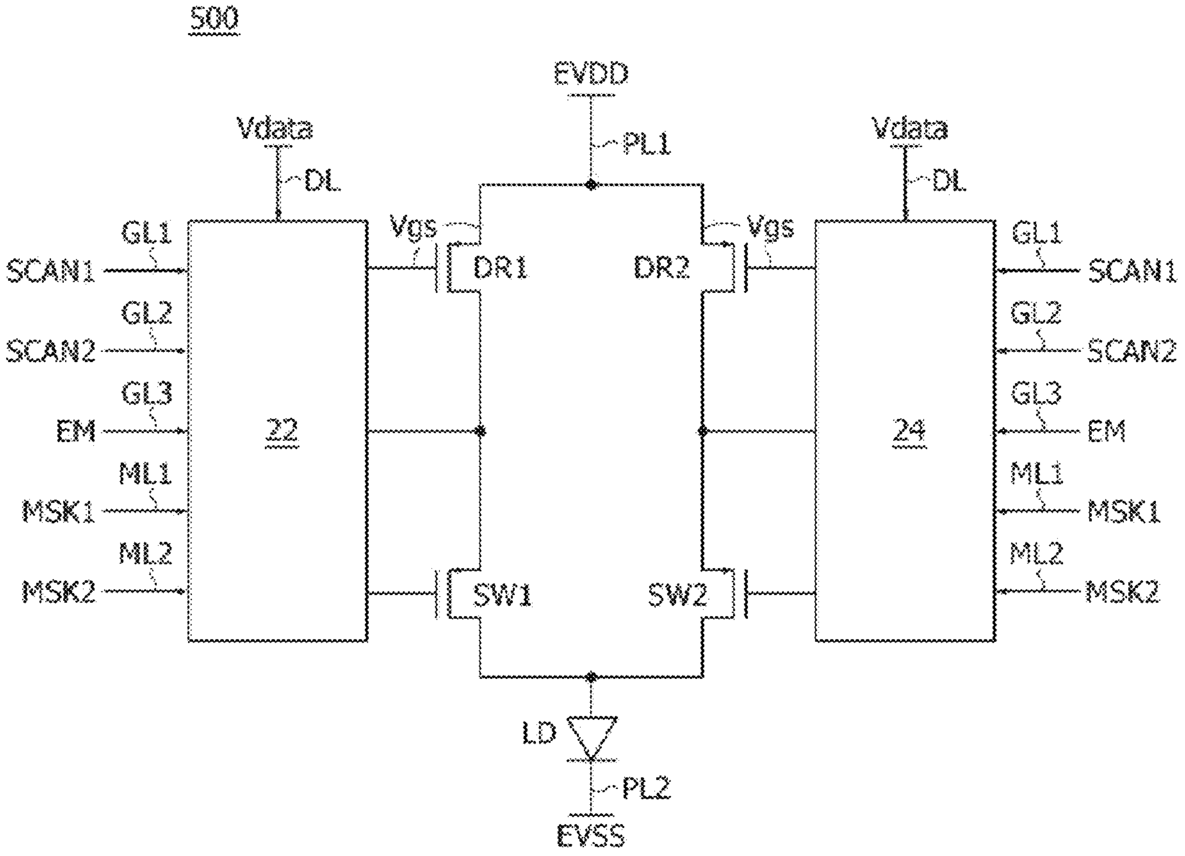
FIG. 5 is a circuit diagram illustrating a pixel circuit according to another embodiment of the present disclosure.

The gate signal can include a first scan signal SCAN1, a second scan signal SCAN2, and a light emission signal (hereinafter referred to as "EM signal") EM, as shown in FIGS. 3 and 5. In this situation, the gate driver can include a first gate driver that outputs the first scan signal SCAN1, a second gate driver that outputs the second scan signal SCAN2, and a third gate driver that outputs the EM signal.

The timing controller 130 receives the pixel data of the input image and a timing signal synchronized with the pixel data from the host system 200. The timing signal can include a vertical synchronization signal Vsync, a horizontal synchronization signal Hsync, and a data enable signal DE. The vertical sync signal Vsync indicates one frame period including a pulse generated once every frame period. Pulses of the horizontal synchronization signal Hsync and the data enable signal DE can be one horizontal period (1H). The timing controller 130 can determine one frame period (or vertical period) and a horizontal period by counting the data enable signal DE. In this situation, the vertical synchronization signal Vsync and the horizontal synchronization signal Hsync can be omitted.

The timing controller 130 can control the operation timings of the data driver 110 and the gate driver 120 based on the timing signals Vsync, Hsync, and DE received from the host system 200. A gate timing control signal includes a start pulse and a clock for controlling the timing of operation of the gate driver 120. The gate timing control signal output from the timing controller 130 can be input to the shift register of the gate driver 120 through the level shifter 150. The level shifter 150 can receive the gate timing control signal and generate a clock to provide it to the gate driver 120. The input signal to the level shifter 150 is a signal of a digital signal voltage level. The clock output from the level shifter 150 can swing between the gate-high voltage and the gate-low voltage. A data timing control signal generated from the timing controller 130 is transmitted to the data driver 110.

Figure 10:
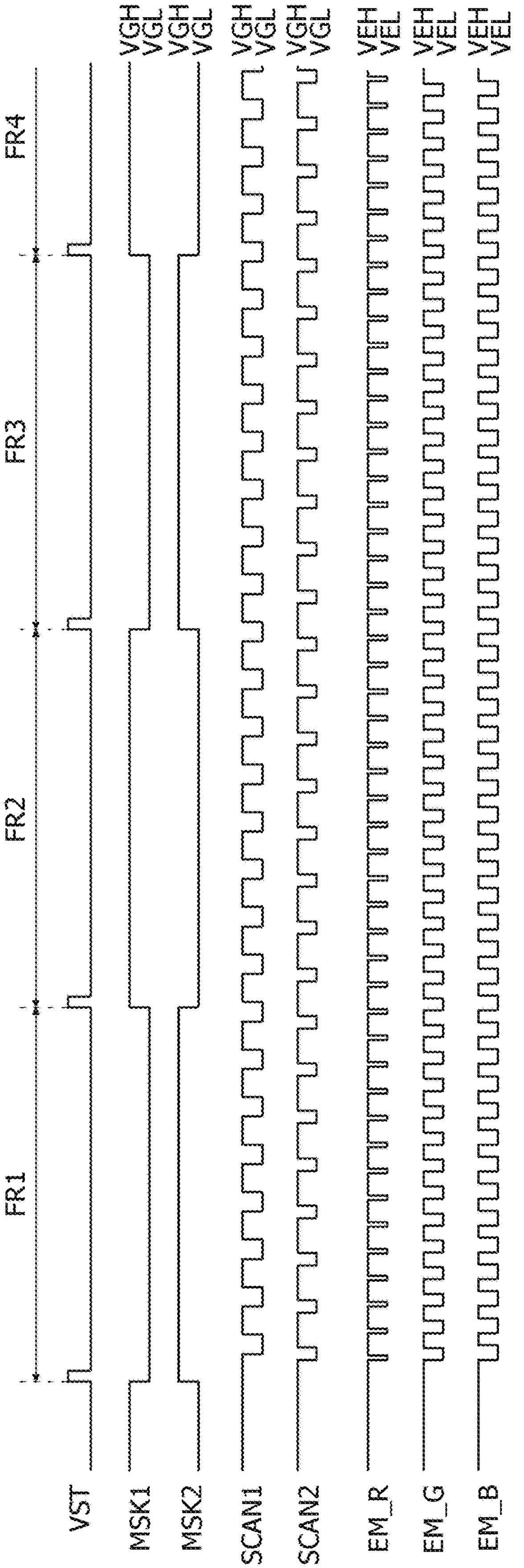
FIG. 10 is a waveform diagram illustrating an example of color-specific emission signals and mask signals according to an embodiment of the present disclosure.

The timing controller 130 can output the first and second mask signals that control the pixel circuits. The first and second mask signals can be fed to the pixel circuits of the sub-pixels by shifting their voltages to the gate-high voltages and the gate-low voltages through the level shifter 150. The timing controller 130 can determine which frame period is the current frame period by counting the rising edge or the falling edge of the pulses in the start pulse of the timing signal Vsync, Hsync, and DE or the gate timing signal. The timing controller 130 can determine whether the frame period is an odd-numbered frame period (or first frame period) or an even-numbered frame period (or second frame period) to output the first and second mask signals as signals of an inverted phase to each other as shown in FIG. 10, and can invert the first and second mask signals every frame period.

The host system 200 can scale an image signal from a video source to match the resolution of the display panel 100, and can transmit the scaled image signal to the timing controller 130 together with the timing signal.

Figure 2A:
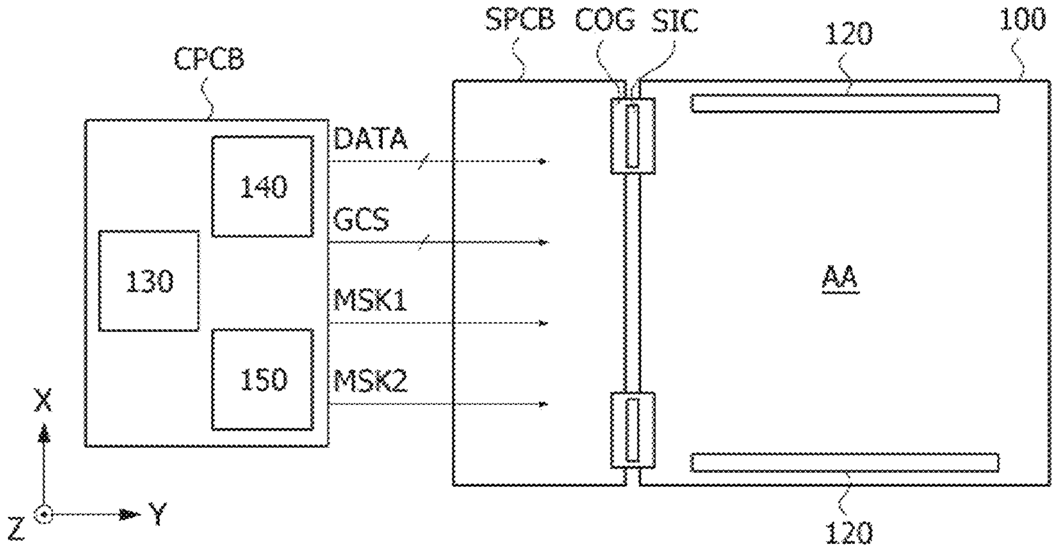
FIGS. 2A and 2B are drawings schematically illustrating the signal path between a control board and a source board according to an embodiment of the present disclosure.
Figure 2B:
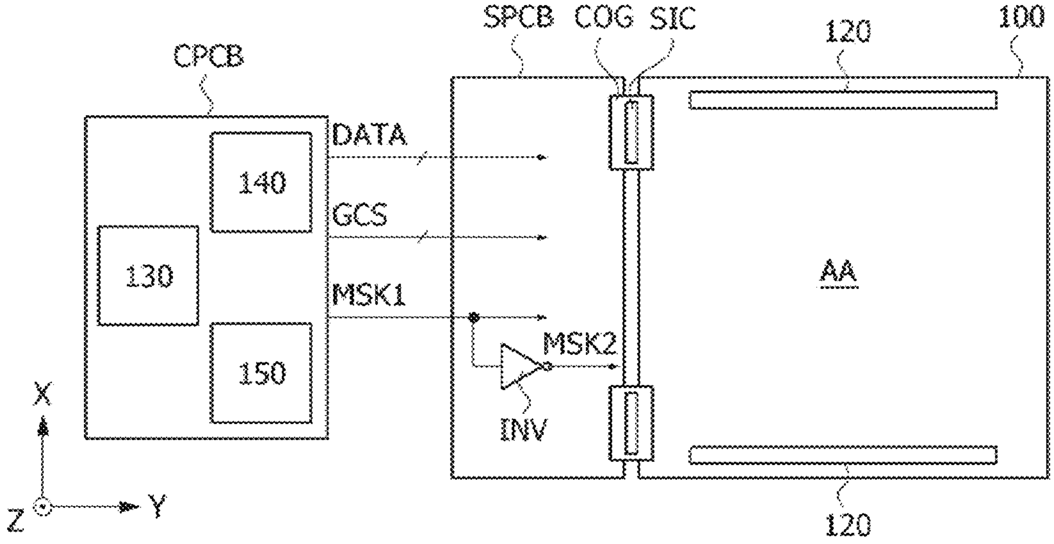

FIGS. 2A and 2B are drawings schematically illustrating the signal path between a control board and a source board.

Referring to FIGS. 2A and 2B, the timing controller 130, the level shifter 150, and the power supply 140 can be mounted on a control board (CPCB). The data driver 110 can be integrated into one or more source drive ICs (SIC). The source drive IC SIC can be mounted on a flexible COF (chip on films) and electrically connected between a source PCB SPCB and the display panel 100 during a COF bonding process. Each of the source drive ICs SIC can further include a touch sensor driver for driving the touch sensors.

The control board CPCB can be electrically connected to the source PCB SPCB through a connector, and a flexible circuit such as a flexible circuit board FFC, a flexible flat cable FPCB, or the like.

The pixel data of the input image output from the timing controller 130 is transmitted to the source drive IC SIC through a data signal wire disposed on the source board SPCB. The pixel data includes red data to be filled in the red sub-pixels, green data to be filled in the green sub-pixels, and blue data to be filled in the blue sub-pixels. The source drive IC SIC converts the received pixel data DATA to a data voltage and outputs it. The data voltage is supplied to the data lines of the display panel 100.

As shown in FIG. 2A, the gate timing control signal GCS and the first and second mask signals MSK1 and MSK2 output from the timing controller 130 are transmitted to the display panel 100 through dummy wires separated from the source drive IC SIC on the COG film through signal wires formed on the source board SPCB. The gate timing control signal GCS is sent to the gate driver 120 disposed on the display panel 100. The first and second mask signals MSK1 and MSK2 can be commonly input to the sub-pixels through the dummy wires on the COG film and the mask signal lines on the display panel 100.

The second mask signal MSK2 can be generated as an inverted phase signal with respect to the first mask signal MSK1, as shown in FIG. 10. The timing controller 130 can output the first mask signal MSK1, and the first mask signal MSK1 can be inverted by an inverting circuit INV mounted on the source board SPCB to be inverted into the second mask signal MSK2. In this situation, the first mask signal MSK1 can be output from the control board CPCB, and the first and second mask signals MSK1 and MSK2 can be output from the source board SPCB. The first and second mask signals MSK1 and MSK2 can be commonly input to the sub-pixels through the dummy wires on the COG film and the mask signal lines on the display panel 100.

Figure 4:
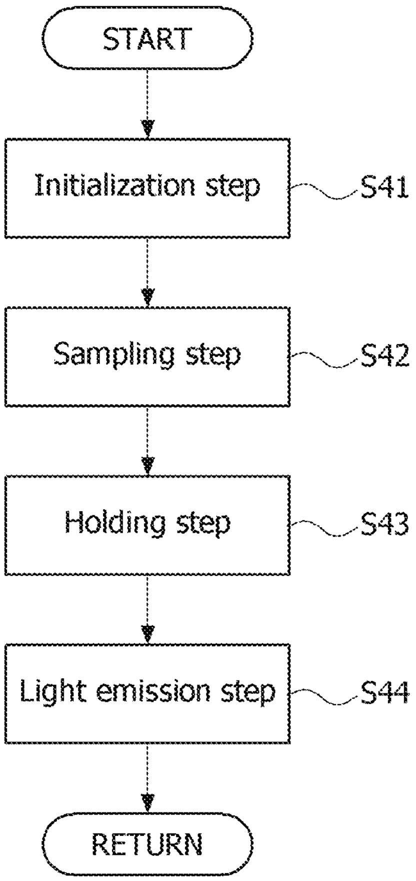
FIG. 4 is a flow diagram illustrating a method of driving the pixel circuit shown in FIG. 3 according to an embodiment of the present disclosure.

FIG. 3 is a circuit diagram illustrating a pixel circuit according to one embodiment of the present disclosure. FIG. 4 is a flow diagram illustrating a method of driving the pixel circuit shown in FIG. 3.

Referring to FIGS. 3 and 4, the pixel circuit 300 includes a light-emitting element LD, a first driving transistor DR1, a second driving transistor DR2, first EM switch transistors SW11 and SW12, second EM switch transistors SW21 and SW22, a first compensation circuit 12, and a second compensation circuit 14.

The first driving transistor DR1 can be connected between a first-first EM switch transistor SW11 and a first-second EM switch transistor SW12. The first driving transistor DR1 generates a current according to the gate-source voltage Vgs set by the first compensation circuit 12 to drive the light-emitting element LD.

The second driving transistor DR2 can be connected between a second-first EM switch transistor SW21 and a second-second EM switch transistor SW22. The second driving transistor DR2 generates a current according to the gate-source voltage Vgs set by the second compensation circuit 14 to drive the light-emitting element LD.

The light-emitting element LD can include an anode electrode, a cathode electrode, and a light-emitting layer. An anode electrode of the light-emitting element LD can be connected to a first power line PL1 to which the pixel driving voltage EVDD is applied. A cathode electrode of the light-emitting element LD can be connected to first electrodes of the first-first and second-first EM switch transistors SW11 and SW21. The light-emitting element LD can be, but is not limited to, a light-emitting element such as an OLED, mini LED, micro LED, or the like. The mini LED or micro LED can have a vertical structure in which electrodes are arranged above and below a semiconductor chip on which the light-emitting element LD is integrated. The semiconductor chip in which the light-emitting element LD is integrated can be implemented in a lateral structure or a flip chip structure.

The first EM switch transistors SW11 and SW12 can include a first-first EM switch transistor SW11 and a first-second EM switch transistor SW12. The first-first EM switch transistor SW11 is connected between the light-emitting element LD and the first driving transistor DR1 and is turned on/off under the control of the first compensation circuit 12. When the first-first EM switch transistor SW11 is turned on, a current path can be formed between the light-emitting element LD and the first driving transistor DR1.

The first-second EM switch transistor SW12 is connected between the first driving transistor DR1 and a second power line PL2, to which a ground voltage EVSS is applied, and is turned on/off under the control of the first compensation circuit 12. When the first-second EM switch transistor SW12 is turned on, a current path can be formed between the first driving transistor DR1 and the ground voltage EVSS. When the first-first EM switch element SW11, the first driving transistor DR1, and the first-second EM switch element SW12 are all turned on, a current path is formed between the pixel driving voltage EVDD and the ground voltage EVSS so that the light-emitting element LD can emit light based on the amount of current (or current density) determined by the gate-source voltage Vgs of the first driving transistor DR1.

The second EM switch transistors SW21 and SW22 can include a second-first EM switch transistor SW21 and a second-second EM switch transistor SW22. The second-first EM switch transistor SW21 is connected between the light-emitting element LD and the second driving transistor DR2 and is turned on/off under the control of the second compensation circuit 14. When the second-first EM switch transistor SW21 is turned on, a current path can be formed between the light-emitting element LD and the second driving transistor DR2.

The second-second EM switch transistor SW22 is connected between the second driving transistor DR2 and the second power line PL2, to which the ground voltage EVSS is applied, and is turned on/off under the control of the second compensation circuit 14. When the second-second EM switch transistor SW22 is turned on, a current path can be formed between the second driving transistor DR2 and the ground voltage EVSS. When the second-first EM switch element SW21, the second driving transistor DR2, and the second-second EM switch element SW22 are all turned on, a current path is formed between the pixel driving voltage EVDD and the ground voltage EVSS so that the light-emitting element LD can emit light based on the amount of current (or current density) determined by the gate-source voltage Vgs of the second driving transistor DR2.

The first and second compensation circuits 12 and 14 include a data line DL to which a data voltage Vdata of pixel data is applied, a first gate line GL1 to which a first scan signal SCAN1 is applied, a second gate line GL2 to which a second scan signal SCAN2 is applied, a third gate line GL3 to which an EM signal EM is applied, a first mask signal line ML1 to which a first mask signal MSK1 is applied, a second mask signal line ML2 to which a second mask signal MSK2 is applied, the first power line PL1 to which the pixel driving voltage EVDD is applied (e.g., high power voltage), the second power line PL2 to which the ground voltage EVSS is applied (e.g., low power voltage or ground), and a third power line PL3 to which a reference voltage Vref is applied. The power lines PL1, PL2, and PL3 and mask signal lines ML1, and ML2 can be commonly connected to the pixel circuits of all pixels.

Figure 9:
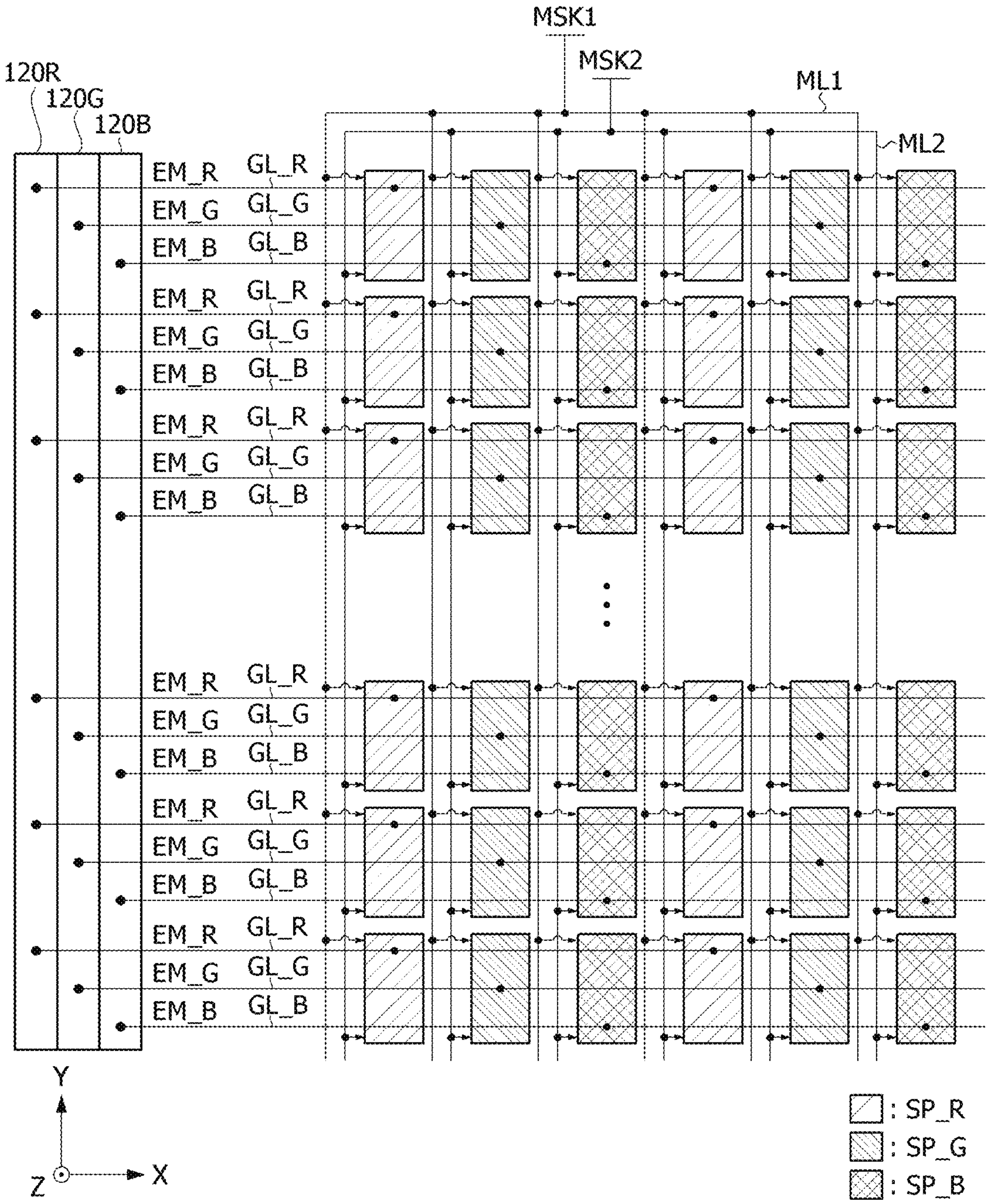
FIG. 9 is a drawing illustrating an example of a wiring structure for applying color-specific emission signals and mask signals to sub-pixels according to an embodiment of the present disclosure.

The duty ratio of the EM signal can be set independently for each color of the light-emitting element disposed in each of the sub-pixels. The third gate line GL3 can be divided into a first EM line GL_R, a second EM line GL_G, and a third EM line GL_B, as shown in FIG. 9. For example, the duty ratios for different colored sub-pixels can be controlled differently and independent from each other. Since different colored sub-pixels can have different needs, this individual control can improve image quality and extend the lifespan of the device.

The pixel driving voltage EVDD can be a constant voltage selected between 8V and 13V, and the ground voltage EVSS and the reference voltage Vref can be constant voltages selected between −2V and 1V. The reference voltage Vref can be, but is not limited to, a constant voltage equal to or higher than the ground voltage EVSS. The data voltage Vdata can be, but is not limited to, a dynamic range voltage between 0V and SVDD. SVDD is a data driving voltage for driving the output buffer in the data driver 110. The data driving voltage SVDD can be, but is not limited to, a constant voltage selected between 12V and 18V. The gate-high voltage (VGH, VEH) of the gate signals SCAN1, SCAN2, and EM and the mask signals MSK1 and MSK2 can be a constant voltage selected between 10 V and 13 V, and the gate-low voltage (VGL, VEL) can be a constant voltage selected between −13 V and −10 V, but are not limited thereto. The gate-high voltage VEH of the EM signal EM can be set to the same or different voltage than the gate-high voltage VGH of the scan signals SCAN1 and SCAN2. The gate-low voltage VEL of the EM signal EM can be set to the same or different voltage than the gate-low voltage VGL of the scan signals SCAN1 and SCAN2. Hereinafter, the gate-low voltage VGL, VEL is referred to as the gate-on voltage, and the gate-high voltage VGH is referred to as the gate-off voltage.

The first compensation circuit 12 can charge a first data voltage Vdata during a first driving period, and transmit the EM signal EM to the EM switch transistors SW11 and SW12 during a second driving period to cause the light-emitting element LD to emit light. The second compensation circuit 14 can transmit the EM signal EM to the EM switch transistors SW21 and SW22 during the first driving period to cause the light-emitting element LD to emit light, and can charge a second data voltage Vdata during the second driving period. Here, each of the first driving period and the second driving period can be a predetermined period of time, for example, an I-frame period (where I is a natural number). The first data voltage Vdata can be supplied to a data line DL commonly connected to the first and second compensation circuits 12 and 14 for a first predetermined period of time. The second data voltage Vdata can be supplied to a data line DL commonly connected to the first and second compensation circuits 12 and 14 for a second predetermined period of time (e.g., the first and second data voltages can be sequentially supplied via data line DL one after the other).

The first compensation circuit 12 can include a plurality of mask switch transistors that transmit the first and second mask signals MSK1 and MSK2 to different nodes within the first compensation circuit 12. The mask switch transistors of the first compensation circuit 12 can be, but are not limited to, the switch transistors T11, T12, and T13 shown in FIGS. 19A to 26B. The second compensation circuit 14 can include a plurality of mask switch transistors that transmit the first and second mask signals MSK1 and MSK2 to different nodes within the second compensation circuit 14. The mask switch transistors of the second compensation circuit 14 can be, but are not limited to, the switch transistors T21, T22, and T23 shown in FIGS. 19A to 26B.

In response to the first and second mask signals MSK1 and MSK2, during the first driving period, the mask switch transistors of the first compensation circuit 12 can form a path through which the first data voltage is charged and can block a current path between the first driving transistor DR1 and the light-emitting element LD. In response to the first and second mask signals MSK1 and MSK2, during the second driving period, the mask switch transistors of the first compensation circuit 12 can block a path through which the first data voltage is charged and can form a current path between the first driving transistor DR1 and the light-emitting element LD. In response to the first and second mask signals MSK1 and MSK2, during the first driving period, the mask switch transistors of the second compensation circuit 14 can block a path through which the second data voltage is charged and can form a current path between the second driving transistor DR2 and the light-emitting element LD. In response to the first and second mask signals MSK1 and MSK2, during the second driving period, the mask switch transistors of the second compensation circuit 14 can form a path through which the second data voltage is charged and can block a current path between the second driving transistor DR2 and the light-emitting element LD.

Each of the first and second compensation circuits 12 and 14 is driven in an initialization step S41, a sampling step S42, a holding step S43, and a light emission step S44 as viewed on the time axis as shown in FIG. 4. In the initialization step S41, the main nodes and capacitors of the first and second compensation circuits 12 and 14 are initialized, and the gate-source voltage Vgs of the first driving transistor DR1 is initialized. In the sampling step S42 where the pixel data is written, the capacitors of the first and second compensation circuits 12 and 14 are charged with the data voltage compensated for the threshold voltage of the driving transistors DR1 and DR2. At this time, the gate-source voltage Vgs of the driving transistors DR1 and DR2 is set. During the holding step S43, the voltage charged to the capacitor is maintained. In the light emission step S44, the first-first and first-second EM switch elements SW11 and SW12 are turned on under the control of the first compensation circuit 12 to cause the light-emitting element LD to emit light. In the light emission step S44, the second-first and second-second EM switch elements SW21 and SW22 are turned on under the control of the second compensation circuit 14 to cause the light-emitting element LD to emit light.

The timing controller 130 can control one of the first and second compensation circuits 12 and 14 in the initialization step S41, the sampling step S42, and the holding step S43 by using the first and second mask signals MSK1 and MSK2, while controlling the other in the light emission step S44. The timing controller 130 can inversely control the first and second compensation circuits 14 and 12 at intervals of a predetermined period of time. Here, the predetermined period of time can be an I-frame period. In the following embodiments, the predetermined period of time is exemplified as, but is not limited to, one frame period. For example, the predetermined period of time can decrease as the refresh rate of the display panel 100 increases.

The first compensation circuit 12 can be driven in the initialization step S41, the sampling step S42, and the holding step S43 for the first frame period, at which time the second compensation circuit 14 can be driven in the light emission step S44. Subsequently, the second compensation circuit 14 is driven in the initialization step S41, the sampling step S42, and the holding step S43 during the second frame period, at which time the first compensation circuit 12 can be driven in the light emission step S44. Accordingly, the pixel circuit 300 can simultaneously perform at least one of the initialization step S41, the sampling step S42, and the holding step S43, and the light emission step S44 using the first and second compensation circuits 12 and 14, thereby causing the light-emitting element LD to emit light not only in the light emission step S44, but also in the initialization step S41, the sampling step S42, and the holding step S43. The first frame period is an odd-numbered frame period, and the second frame period can be an even-numbered frame period, but are not limited thereto. In other words, the light-emitting element LD can be driven to emit light in an alternating manner by switching between the first compensation circuit 12 and the second compensation circuit 14.

The light-on interval and light-off interval of the light-emitting element LD can be determined by the duty ratio of the EM signal. The maximum luminous efficiency region of the light-emitting element LD can be different for each color of the sub-pixels (e.g., different colored sub-pixels can have different needs and different characteristics). In embodiments of the present disclosure, in order to drive each of the red light-emitting element, the green light-emitting element, and the blue light-emitting element in the corresponding maximum luminous efficiency region, the data voltage of the maximum luminous efficiency region of each light-emitting element for each different color can be separately set independently from each other. Furthermore, according to embodiments of the present disclosure, the excess luminance caused by the data voltage set as the maximum luminous efficiency for each color can be reduced by appropriately reducing the light-on interval of the light-emitting element LD, and thus the color coordinates and white balance of the image reproduced on the display panel 10 can be adjusted to target values, and thus a finer granularity of control can be provided and image quality can be improved.

The ratio of the light-on interval to the light-off interval of the light-emitting element LD can be adjusted by the light-on duty ratio of the EM signal EM distinguished for each different color. In one cycle of the EM signal EM, the longer the duration of the gate-on voltage VEL is, the more the light-on duty ratio of the EM signal EM increases, thereby increasing the light-on interval of the light-emitting element LD, whereas the shorter the duration of the gate-on voltage VEL is, the more the light-on duty ratio of the EM signal EM decreases, thereby decreasing the light-on interval of the light-emitting element LD.

Figure 6:
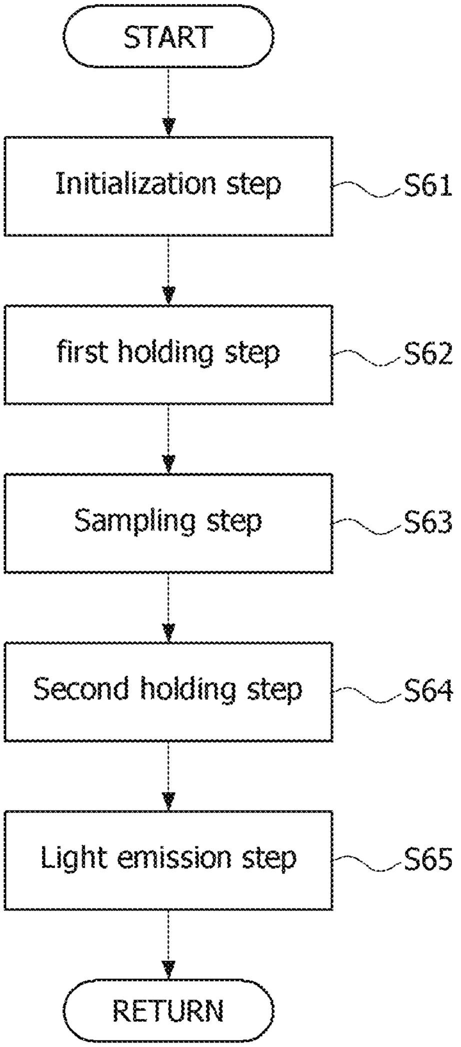
FIG. 6 is a flow diagram illustrating a method of driving the pixel circuit shown in FIG. 5 according to an embodiment of the present disclosure.

FIG. 5 is a circuit diagram illustrating a pixel circuit according to another embodiment of the present disclosure. FIG. 6 is a flow diagram illustrating a method of driving the pixel circuit shown in FIG. 5. In this embodiment, descriptions that are redundant to the forgoing embodiments can be omitted.

Referring to FIGS. 5 and 6, the pixel circuit 500 includes a light-emitting element LD, a first driving transistor DR1, a second driving transistor DR2, a first EM switch transistor SW12, a second EM switch transistor SW2, a first compensation circuit 22, and a second compensation circuit 24.

The first driving transistor DR1 can be connected between a first power line PL1, to which the pixel driving voltage EVDD is applied, and the first EM switch transistor SW1. The first driving transistor DR1 generates a current according to the gate-source voltage Vgs set by the first compensation circuit 22 to drive the light-emitting element LD.

The second driving transistor DR2 can be connected between the first power line PL1 and the second switch transistor SW2. The second driving transistor DR2 generates a current according to the gate-source voltage Vgs set by the second compensation circuit 24 to drive the light-emitting element LD.

An anode electrode of the light-emitting element LD can be connected to the first and second EM switch transistors SW1 and SW2. A cathode electrode of the light-emitting element LD can be connected to a second power line PL2 to which the ground voltage EVSS is applied.

The first EM switch transistor SW1 is connected between the light-emitting element LD and the first driving transistor DR1 and is turned on/off under the control of the first compensation circuit 12. When the first EM switch transistor SW1 is turned on, a current path can be formed between the light-emitting element LD and the second driving transistor DR2. The second EM switch transistor SW2 is connected between the light-emitting element LD and the second driving transistor DR2 and is turned on/off under the control of the second compensation circuit 14. When the second EM switch transistor SW2 is turned on, a current path can be formed between the light-emitting element LD and the second driving transistor DR2.

The first compensation circuit 22 can charge the first data voltage Vdata during the first driving period, and transfer the EM signal EM to the EM switch transistor SW11 during the second driving period to cause the light-emitting element LD to emit light. The second compensation circuit 24 can transmit the EM signal EM to the EM switch transistor SW2 during the first driving period to cause the light-emitting element LD to emit light, and charge the second data voltage Vdata during the second driving period. Thus, the first compensation circuit 22 and the second compensation circuit 24 can take turns driving the light-emitting element LD to emit light in an alternating manner.

The first compensation circuit 22 can include a plurality of mask switch transistors that transmit the first and second mask signals MSK1 and MSK2 to different nodes within the first compensation circuit 22. The mask switch transistors of the first compensation circuit 22 can be, but are not limited to, the switch transistors T31, T32, and T33 shown in FIGS. 33A to 40B. The second compensation circuit 24 can include a plurality of mask switch transistors that transmit the first and second mask signals MSK1 and MSK2 to different nodes within the second compensation circuit 24. The mask switch transistors of the second compensation circuit 24 can be, but are not limited to, the switch transistors T41, T42, and T43 shown in FIGS. 33A to 40B.

In response to the first and second mask signals MSK1 and MSK2, during the first driving period, the mask switch transistors of the first compensation circuit 22 can form a path through which the first data voltage is charged and can block a current path between the first driving transistor DR1 and the light-emitting element LD. In response to the first and second mask signals MSK1 and MSK2, during the second driving period, the mask switch transistors of the first compensation circuit 22 can block a path through which the first data voltage is charged and can form a current path between the first driving transistor DR1 and the light-emitting element LD. In response to the first and second mask signals MSK1 and MSK2, during the first driving period, the mask switch transistors of the second compensation circuit 24 can block a path through which the second data voltage is charged and can form a current path between the second driving transistor DR2 and the light-emitting element LD. In response to the first and second mask signals MSK1 and MSK2, during the second driving period, the mask switch transistors of the second compensation circuit 24 can form a path through which the second data voltage is charged and can block a current path between the second driving transistor DR2 and the light-emitting element LD.

Each of the first and second compensation circuits 22 and 24 is driven in an initialization step S61, a first holding step S62, a sampling step S63, a second holding step S64, and a light emission step S65 as viewed on the time axis as shown in FIG. 6. The pixel data can be written to the pixel circuit in the sampling step S63.

The timing controller 130 can control one of the first and second compensation circuits 22 and 24 in the initialization step S61, the first holding step S62, the sampling step S63, and the second holding step S64 using the first and second mask signals MSK1 and MSK2, while controlling the other one of the two compensation circuits in the light emission step S65. The timing controller 130 can inversely control the first and second compensation circuits 12 and 14 at intervals of a predetermined period of time.

Figure 7:
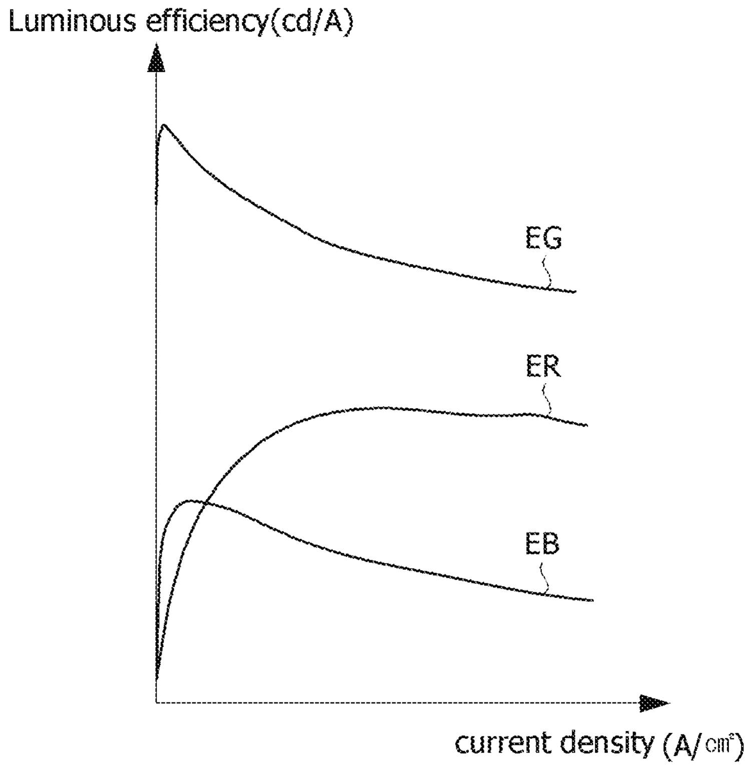
FIG. 7 is a diagram illustrating the difference in luminous efficiency of a red light-emitting element, a green light-emitting element, and a blue light-emitting element according to an embodiment of the present disclosure.

FIG. 7 is a diagram illustrating differences in luminous efficiency of a red light-emitting element, a green light-emitting element, and a blue light-emitting element.

Figure 8:
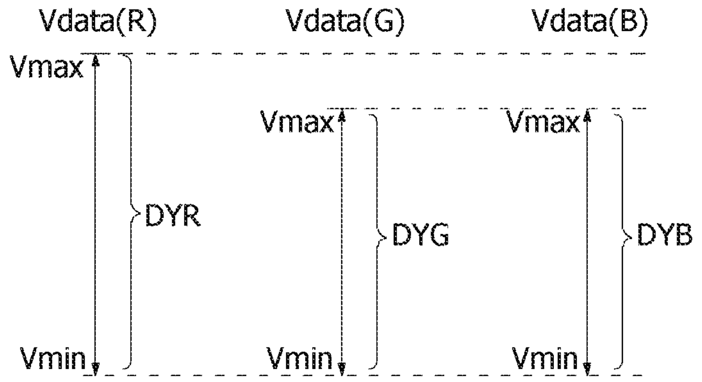
FIG. 8 is a diagram illustrating an example of a color-specific data voltage according to an embodiment of the present disclosure.

Referring to FIG. 7, the red light-emitting element, the green light-emitting element, and the blue light-emitting element can have different luminous efficiencies (cd/A) depending on the current density (A/cm2). For example, the luminous efficiency of the red light-emitting element (ER) can be driven to maximum luminous efficiency at a higher current density compared to those of the green and blue light-emitting elements. In contrast, the luminous efficiency of green light-emitting element (EG) and the luminous efficiency of blue light-emitting element (EB) can emit light to maximum luminous efficiency at a relatively low current density. The current density of the light-emitting elements is determined by the amount of current generated from the driving transistors DR1 and DR2 by the gate-source voltage Vgs of the driving transistors DR1 and DR2. The gate-source voltage Vgs of the driving transistors DR1 and DR2 can be controlled by the data voltage Vdata applied to the gate electrodes of the driving transistors DR1 and DR2. As the data voltage Vdata increases, the current density of the light-emitting element can increase. To increase the luminous efficiency of each of the red light-emitting element, the green light-emitting element, and the blue light-emitting element, the data voltage can be distinguished for each color as shown in FIG. 8. In other words, the data voltage can be differently adjusted for each of the red light-emitting element, the green light-emitting element, and the blue light-emitting element so that the sub-pixels can each operate at or near their own corresponding maximum luminous efficiency.

The color-specific luminous efficiency characteristics of the light-emitting elements are not limited to FIG. 7. For example, the color-specific luminous efficiency characteristics of a light-emitting elements can vary depending on the manufacturer or material properties of the light-emitting elements. In embodiments of the present disclosure, each of the light-emitting elements is driven to maximum luminous efficiency with respect to the color-specific luminous efficiency characteristics of the light-emitting element, but the deterioration in image quality caused by the driving to the maximum luminous efficiency can be minimized by using EM signals distinguished for each color. For example, the EM signals for each of the different color sub-pixels can be differently and independently set so that deterioration in image quality for each of the different colors can be prevented or minimized.

FIG. 8 is a diagram illustrating an example of a color-specific data voltage according to one embodiment of the present disclosure.

Referring to FIG. 8, the data voltage output from the data driver 110 can include at least a red data voltage Vdata(R), a green data voltage Vdata(G), and a blue data voltage Vdata(B). The red data voltage Vdata(R) can be applied to the red sub-pixel. The green data voltage Vdata(G) can be applied to the green sub-pixel. The blue data voltage Vdata (B) can be applied to the blue sub-pixel.

The maximum voltage Vmax of the red data voltage Vdata(R) can be set to a voltage higher than the maximum voltage Vmax of the green and blue data voltages Vdata(G) and Vdata(B). The minimum voltage Vmin of the red data voltage Vdata(R) can be set to a voltage equal to or higher than the minimum voltage Vmin of the green and blue data voltages Vdata(G) and Vdata(B). The dynamic range DYR of the red data voltage Vdata(R), that is, the voltage range between the minimum voltage Vmin and the maximum voltage Vmax, can be greater than the dynamic ranges DYG and DYB of the green and blue data voltages Vdata(G), Vdata(B). The dynamic range of the data voltages DYR, DYG, and DYB is the voltage range between the minimum voltage Vmin and the maximum voltage Vmax (e.g., DYR>DYG, and DYR>DYB).

The maximum voltage Vmax of the blue data voltage Vdata(B) can be set to a voltage equal to or higher than the maximum voltage Vmax of the green data voltage Vdata(G). The minimum voltage Vmin of the blue data voltage Vdata (B) can be set to a voltage equal to or higher than the minimum voltage Vmin of the green data voltage Vdata(G).

When driving each of the red light-emitting element, the green light-emitting element, and the blue light-emitting element in the maximum luminous efficiency region, excess luminance can occur in a certain color, which can cause the color coordinates and white balance to deviate from target values (e.g., a certain color may become washed out or experience an undesirable color shift). Embodiments of the present disclosure can optimize the color coordinates and white balance by individually controlling the ratio of the light-on interval of each of the red light-emitting element, the green light-emitting element, and the blue light-emitting element according to the duty ratio of the EM signal distinguished for color.

FIG. 9 is a drawing illustrating an example of a wiring structure for applying color-specific EM signals and mask signals to sub-pixels.

Referring to FIG. 9, the gate driver 120 can include a first EM driver 120R that outputs a first EM signal EM_R, a second EM driver 120G that outputs a second EM signal EM_G, and a third EM driver 120B that outputs a third EM signal EM_B.

The first EM driver 120R can output the first EM signal EM_R to the first EM lines GL_R connected to the red sub-pixels SP_R while shifting the pulse of the first EM signal EM_R. Each of the first EM lines GL_R can be arranged one for each of the pixel lines L1 to L(N), or can be connected to two or more pixel lines by a common wire. The second EM driver 120G can output the second EM signal EM_G to the second EM lines GL_G connected to the green sub-pixels SP_G while shifting the pulse of the second EM signal EM_G. Each of the second EM lines GL_G can be arranged one for each of the pixel lines L1 to L(N), or can be connected to two or more pixel lines by common wiring. The third EM driver 120B can output the third EM signal EM_B to the third EM lines GL_B connected to the blue sub-pixels SP_B while shifting the pulses of the third EM signal EM_B. Each of the third EM lines GL_B can be arranged one for each of the pixel lines L(1) to L(N), or can be connected to two or more pixel lines by common wiring.

Each of a first mask signal line ML1 and a second mask signal line ML2 can be commonly connected to the red, green, and blue sub-pixels SP_R, SP_G, and SP_B. The first mask signal line ML1 supplies the first mask signal MSK1 to the sub-pixels SP_R, SP_G, and SP_B. The second mask signal line ML2 supplies the second mask signal MSK2 to the sub-pixels SP_R, SP_G, and SP_B.

Figure 11:
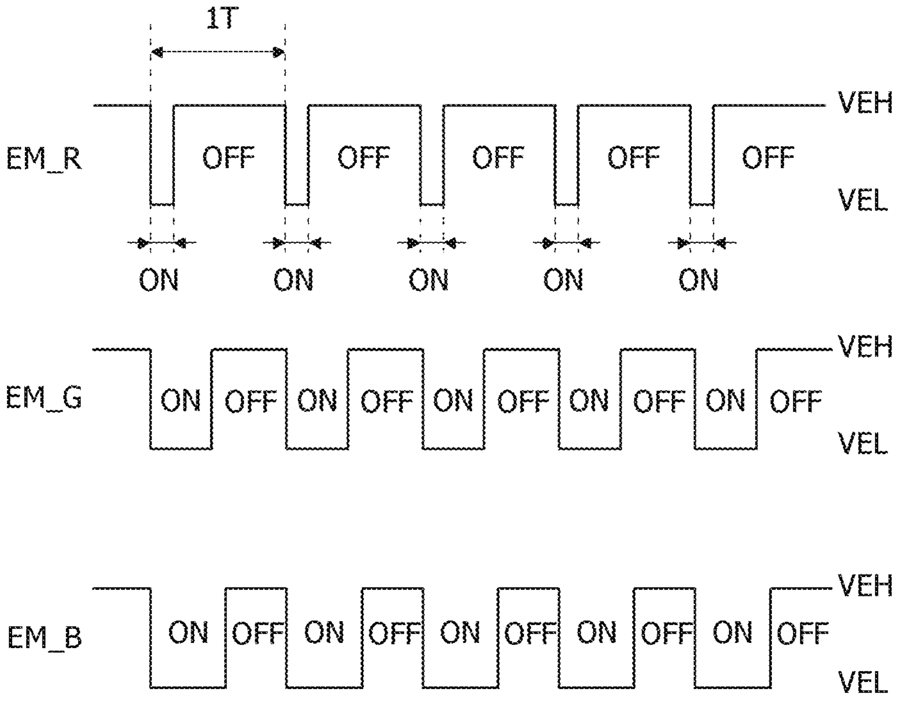
FIG. 11 is an enlarged waveform diagram illustrating the color-specific emission signals shown in FIG. 10 according to an embodiment of the present disclosure.

FIG. 10 is a waveform diagram illustrating an example of color-specific emission signals and mask signals. In FIG. 10, 'VST' represents the start pulse of a gate timing control signal GCS. The start pulse can indicate a first frame period, including a pulse generated once when a frame period begins in the first frame period. FIG. 11 is an enlarged waveform diagram illustrating the color-specific emission signals shown in FIG. 10.

Referring to FIGS. 10 and 11, the light-on duty ratio of the first EM signal EM_R can be smaller than those of the second EM signal EM_G and the third EM signal EM_B. The light-on duty ratio is the ratio of the light-on interval (ON) of the EM signals EM_R, EM_G, and EM_B within one pulse period (1T). The light-on interval (ON) of the EM signals EM_R, EM_G, and EM_B is the duration of gate-on voltage VEL, and the light-off interval (OFF) is the duration of the gate-off voltage VEH. Since the EM signals EM_R, EM_G, and EM_B are independent for each color, the light-on duty ratio of the light-emitting element can be freely controlled for each of the different colors. For example, the light-on duty ratio of the third EM signal EM_B can be controlled to be greater than that of the first EM signal EM_R and less than that of the second EM signal EM_G. For example, the red sub-pixel can be controlled to emit light for the least amount of time during one frame, the blue sub-pixel can be controlled to emit light for the most amount of time during the one frame, and the green sub-pixel can be controlled to emit light for a medium amount of time during the one frame (e.g., less than the blue sub-pixel, but more than the red sub-pixel).

The first mask signal MSK1 and the second mask signal MSK1 can be generated as pulses of zero phase to each other. For example, during the odd-numbered frame periods FR1 and FR3, the first mask signal MSK1 can be the gate-on voltage VGL and the second mask signal MSK2 can be the gate-off voltage VGH. During the even-numbered frame periods FR2 and FR4, the first mask signal MSK1 can be the gate-off voltage VGH and the second mask signal MSK2 can be the gate-on voltage VGL.

The first and second mask signals MSK1 and MSK2 can selectively block the initialization step, the sampling step, the holding step, and the light emission step of the compensation circuits 12, 14, 22, and 24 shown in FIGS. 3 and 5. For example, during the first frame period FR1, the first mask signal MSK1 can cause the first compensation circuits 12 and 22 to operate in the initialization step, the sampling step, and the holding step, and can cause the second compensation circuits 14 and 24 to operate in the light emission step. During the second frame period FR2, the second mask signal MSK2 can cause the first compensation circuits 12 and 22 to operate in the light emission step, and can cause the second compensation circuits 14 and 24 to operate in the initialization step, the sampling step, and the holding step.

Figure 12:
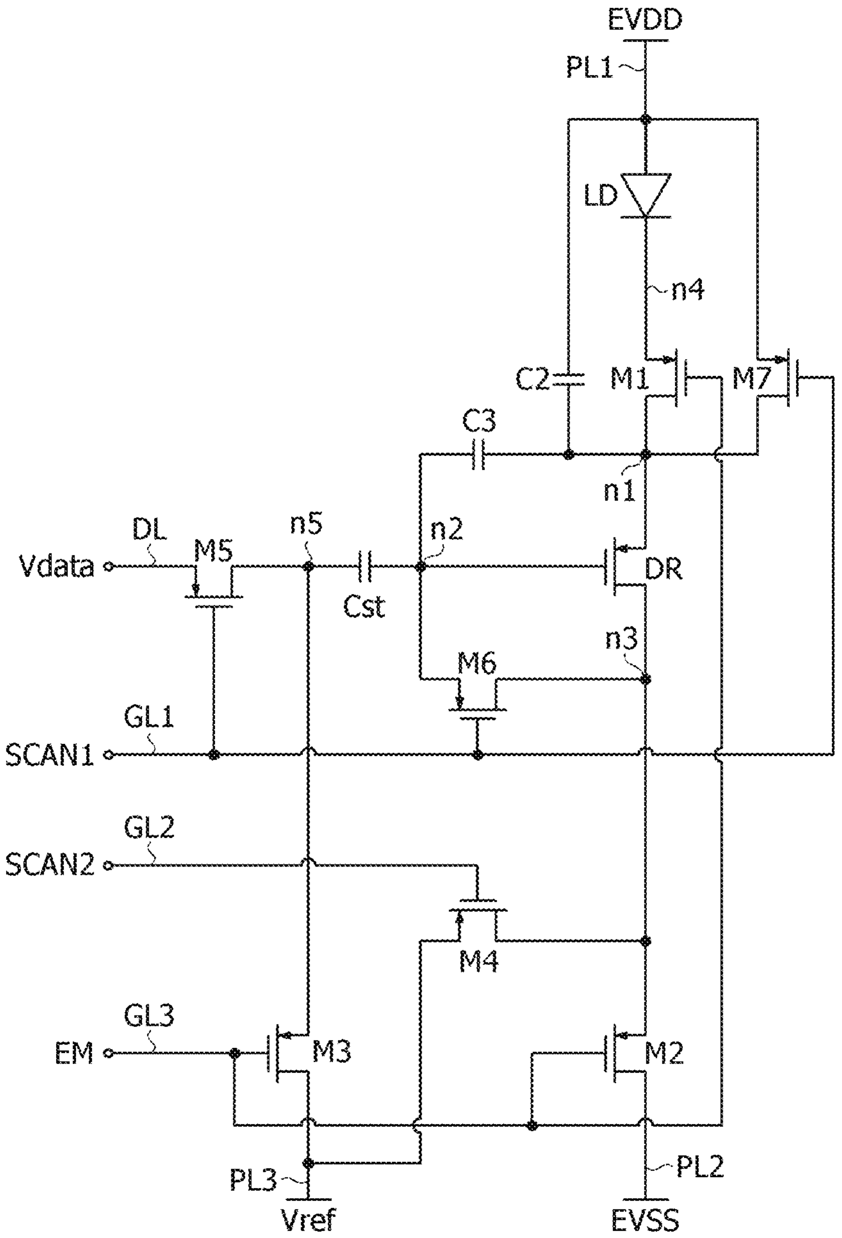
FIG. 12 is a circuit diagram illustrating an example that is applicable to the pixel circuit illustrated in FIG. 3 according to an embodiment of the present disclosure.

FIG. 12 is a circuit diagram illustrating an example that is applicable to the pixel circuit 300 shown in FIG. 3. The pixel circuit shown in FIG. 12 is applicable to each of the compensation circuits 12 and 14 shown in FIG. 3. In this pixel circuit, the switch elements that switches the mask signal are omitted.

Referring to FIG. 12, the pixel circuit includes a driving element DR that drives a light-emitting element LD, a plurality of switch transistors M1 to M7, and a capacitor Cst. The pixel circuit can further include second and third capacitors C2 and C3. The transistors DR and M1 to M7 in the pixel circuit can be p-channel transistors, but are not limited thereto.

An anode electrode of the light-emitting element LD can be connected to a first power line PL1 to which the pixel driving voltage EVDD is applied. A cathode electrode of the light-emitting element LD can be connected to a fourth node n4.

The driving transistor DR can include a first electrode connected to a first node n1, a gate electrode connected to a second node n2, and a second electrode connected to a third node n3. The driving transistor DR corresponds to the driving transistors DR1 and DR2 shown in FIG. 3. The first capacitor C1 (e.g., $C_{st}$) can be connected between the second node n2 and a fifth node n5.

First and second switch transistors M1 and M2 are turned on in response to the gate-on voltage VEL of the EM signal EM and turned off in response to the gate-off voltage VEH of the EM signal EM. When the first switch transistor M1 is turned on, the fourth node n4 can be electrically connected to the first node n1. When the second switch transistor M2 is turned on, the third node n3 can be electrically connected to a second power line PL2 to which the ground voltage EVSS is applied.

The first switch transistor M1 includes a first electrode connected to the fourth node n4, a gate electrode connected to a third gate line GL3 to which the EM signal EM is applied, and a second electrode connected to the first node n1. The first switch transistor M1 corresponds to the first-first EM switch transistor SW11 and the second-first EM switch transistor SW21 shown in FIG. 3. The second switch transistor M2 includes a first electrode connected to the third node n3, a gate electrode connected to the third gate line GL3, and a second electrode connected to the second power line PL2. The second switch transistor M2 corresponds to the first-second EM switch transistor SW12 and the second-second EM switch transistor SW22 shown in FIG. 3. For example, the pixel circuit shown in FIG. 12 can be the inner components included as part of each of the first compensation circuit 12 and the second compensation circuit 14 shown in FIG. 3.

A third switch transistor M3 is turned on in response to the gate-on voltage VEL of the EM signal EM and turned off in response to the gate-off voltage VEH of the EM signal EM. When the third switch transistor M3 is turned on, the fifth node n5 can be electrically connected to a third power line PL3 to which the reference voltage Vref is applied. The third switch transistor M3 includes a first electrode connected to the fifth node n5, a gate electrode connected to the third gate line GL3, and a second electrode connected to the third power line PL3.

A fourth switch transistor M4 is turned on in response to the gate-on voltage VGL of the second scan signal SCAN2 and turned off in response to the gate-off voltage VGH of the second scan signal SCAN2. When the fourth switch transistor M4 is turned on, the third node n3 can be electrically connected to the third power line PL3 to which the reference voltage Vref is applied. The fourth switch transistor M4 includes a first electrode connected to the third power line PL3, a gate electrode connected to the second gate line GL2 to which the second scan signal SCAN2 is applied, and a second electrode connected to the third node n3.

A fifth switch transistor M5 is turned on in response to the gate-on voltage VGL of the first scan signal SCAN1 and turned off in response to the gate-off voltage VGH of the first scan signal SCAN1. When the fifth switch transistor M5 is turned on, a data line DL to which the data voltage Vdata is applied can be electrically connected to the fifth node n5. The fifth switch transistor M5 includes a first electrode connected to the data line DL, a gate electrode connected to a first gate line GL1 to which the first scan signal SCAN1 is applied, and a second electrode connected to the fifth node n5.

A sixth switch transistor M6 is turned on in response to the gate-on voltage VGL of the first scan signal SCAN1 and turned off in response to the gate-off voltage VGH of the first scan signal SCAN1. When the sixth switch transistor M6 is turned on, the second node n2 can be electrically connected to the third node n3. The sixth switch transistor M6 includes a first electrode connected to the second node n2, a gate electrode connected to the first gate line GL1, and a second electrode connected to the third node n3.

A seventh switch transistor M7 is turned on in response to the gate-on voltage VGL of the first scan signal SCAN1 and turned off in response to the gate-off voltage VGH of the first scan signal SCAN1. When the seventh switch transistor M7 is turned on, the first power line PL1 can be electrically connected to the first node n1. The seventh switch transistor M7 includes a first electrode connected to the first power line PL1, a gate electrode connected to the first gate line GL1, and a second electrode connected to the first node n1.

The second capacitor C2 can be connected between the first power line PL1 and the first node n1. The third capacitor C3 can be connected between the first node n1 and the second node n2.

The pixel circuit shown in FIG. 12 can be driven in the initialization step, the sampling step, the holding step, and the light emission step, as shown in FIG. 4. The initialization step can be divided into a first initialization step and a second initialization step, as shown in FIGS. 13A to 14B. The operation of this pixel circuit will be described with reference to FIGS. 13A to 17B, assuming that the sub-pixels are disposed in an (n)th pixel line (where n is a natural number). In FIGS. 13A to 17B, "1H" represents one horizontal period.

Figure 13A:
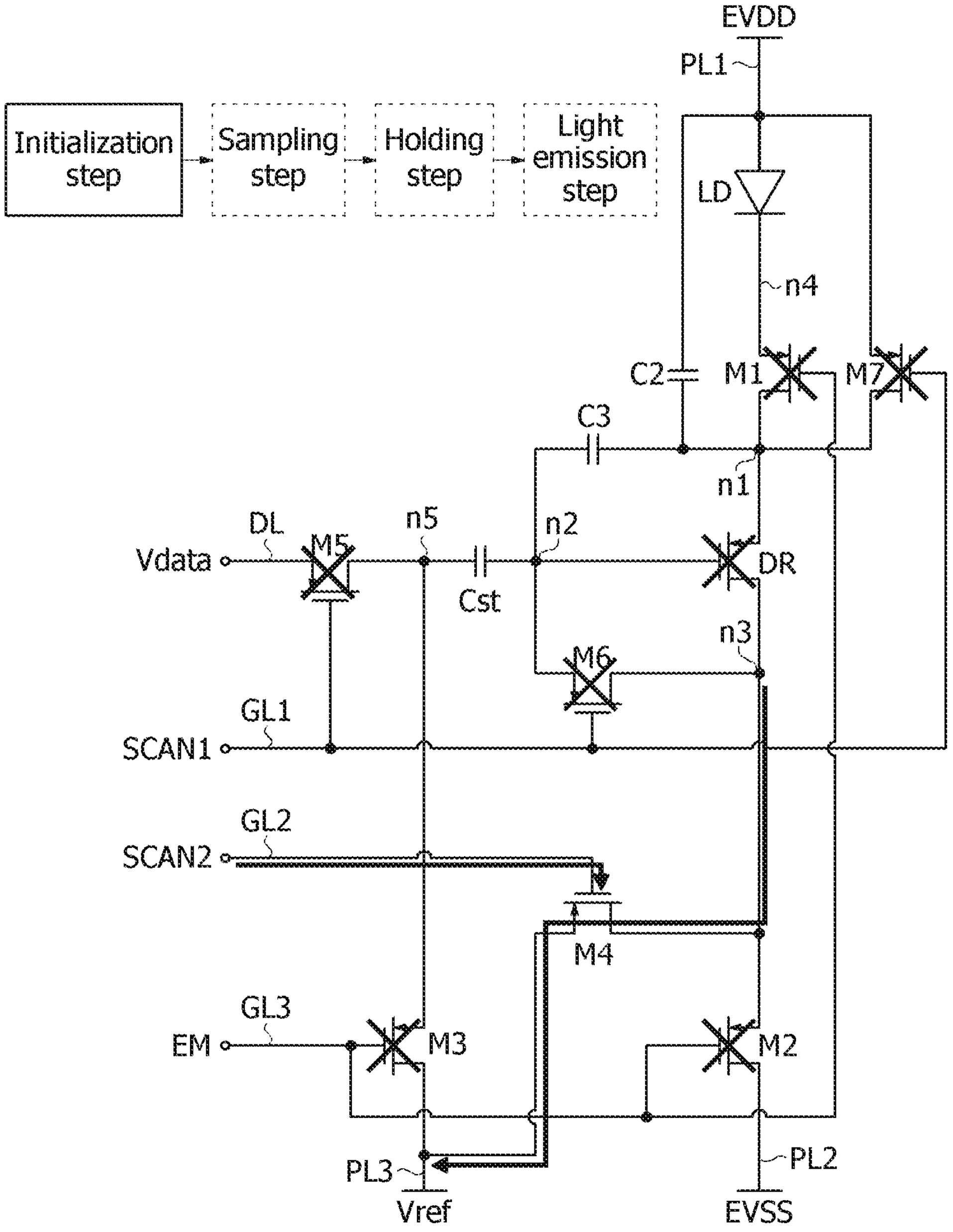
FIGS. 13A and 13B are diagrams illustrating a first initialization step of the pixel circuit shown in FIG. 12 according to an embodiment of the present disclosure.
Figure 13B:
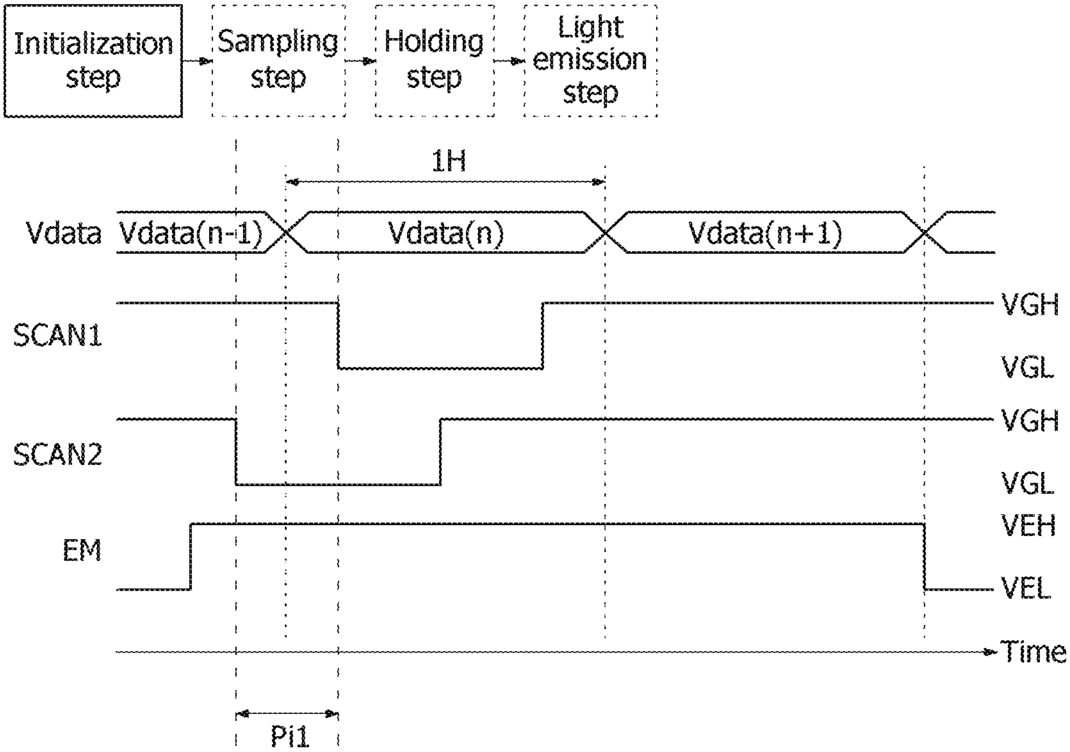

FIGS. 13A and 13B are drawings illustrating the first initialization step of the pixel circuit shown in FIG. 12.

Referring to FIGS. 13A and 13B, the first initialization step is performed during a first period Pi1. During the first period Pi1, the voltage of the second scan signal SCAN2 can be the gate-on voltage VGL, and the voltages of the first scan signal SCAN1 and the EM signal EM can be the gate-off voltage VGH, VEH. Accordingly, during the first period Pi1, the fourth switch transistor M4 is turned on, while the other switch transistors M1, M2, M3, M5, M6, and M7 are in the off-state. During the first period Pi1, the driving transistor DR is in the off-state.

During the first period Pi1, the voltage of the third node n3 is initialized to the reference voltage Vref. During the first period Pi1, the other nodes n1, n2, n4, and n5 are floated. During the first period Pi1, the voltage of the second node n2 can be maintained at the voltage charged in the light emission step of a preceding frame, and the voltage of the fifth node n5 can be maintained at the reference voltage Vref charged in the light emission step of the preceding frame. During the first period Pi1, a data voltage Vdata(n−1) of a preceding pixel line, e.g., an (n−1)th pixel line, can be applied to the data line DL.

Figure 14A:
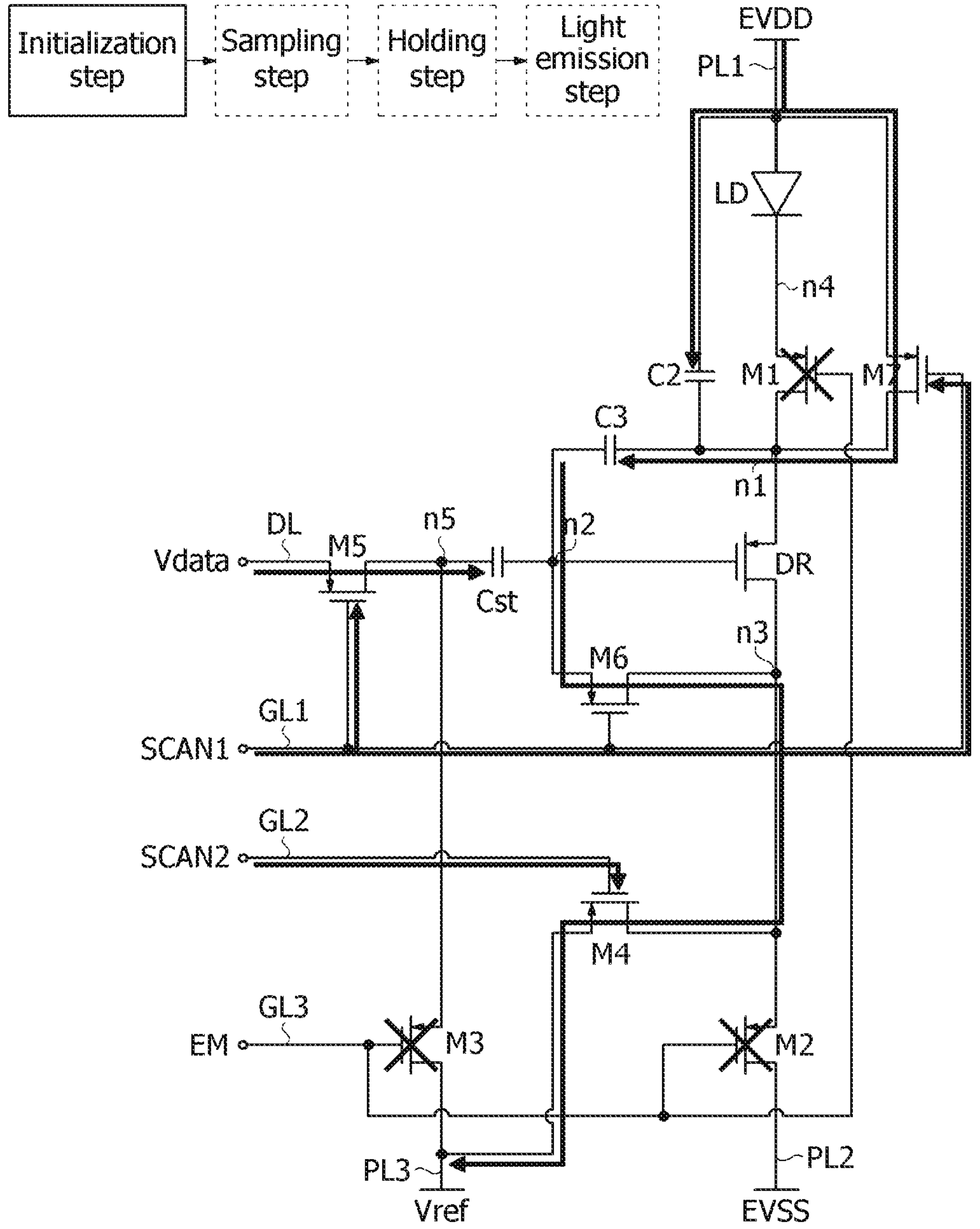
FIGS. 14A and 14B are diagrams illustrating a second initialization step of the pixel circuit shown in FIG. 12 according to an embodiment of the present disclosure.
Figure 14B:
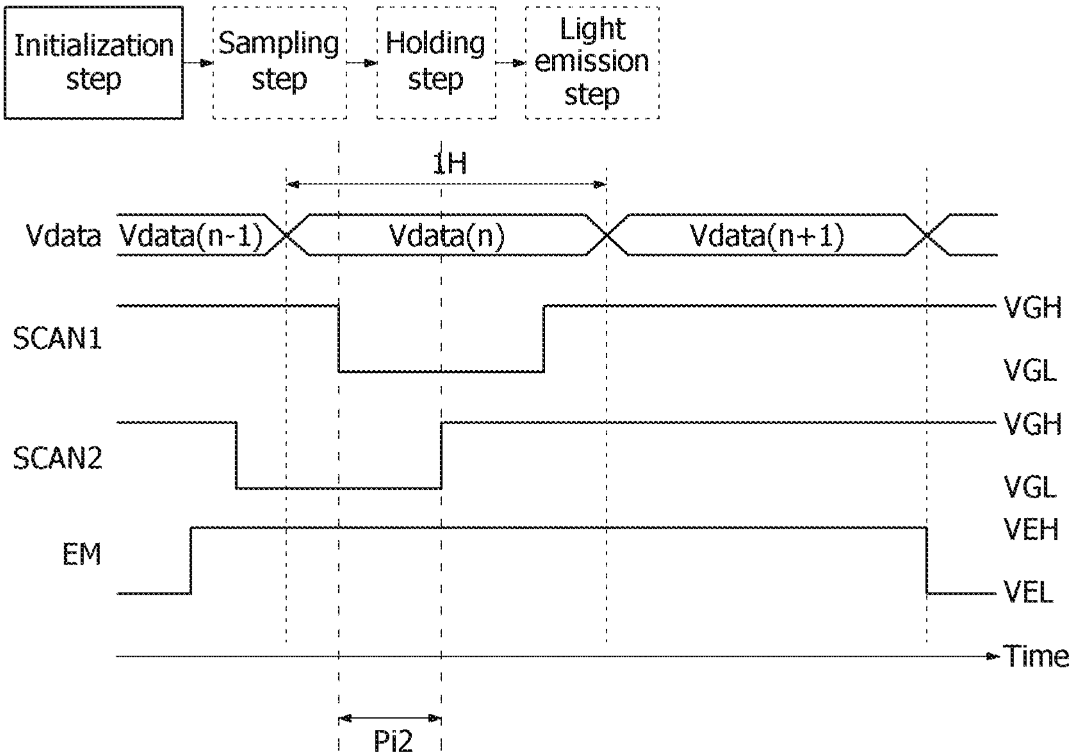

FIGS. 14A and 14B are drawings illustrating the second initialization step of the pixel circuit shown in FIG. 12.

Referring to FIGS. 14A and 14B, the second initialization step is performed during a second period Pi2. During the second period Pi2, the voltage of the first scan signal SCAN1 and the second scan signal SCAN2 can be the gate-on voltages VGL and the voltage of the EM signal EM can be the gate-off voltage VGH, VEH. Accordingly, during the second period Pi2, the fifth, sixth, and seventh switch transistors M5, M6, and M7 are turned on, and the fourth switch transistor M4 is in the on-state. On the other hand, during the second period Pi2, the first, second, and third switch transistors M1, M2, and M3 are in the off-state. During the second period Pi2, the voltage of the first node n1 rises, causing the driving transistor DR to turn on.

During the second period Pi2, a data voltage Vdata(n) is applied to the data line DL. This data voltage Vdata(n) is applied to the fifth node n5 through the fifth switch transistor M5. During the second period Pi2, the reference voltage Vref is applied to the second and third nodes n2 and n3 through the fourth and sixth transistors M4 and M6. Accordingly, during the second period Pi2, the voltage of the second node n2 is initialized to the reference voltage Vref, and the voltage of the fifth node n5 is the data voltage Vdata(n).

Figure 15A:
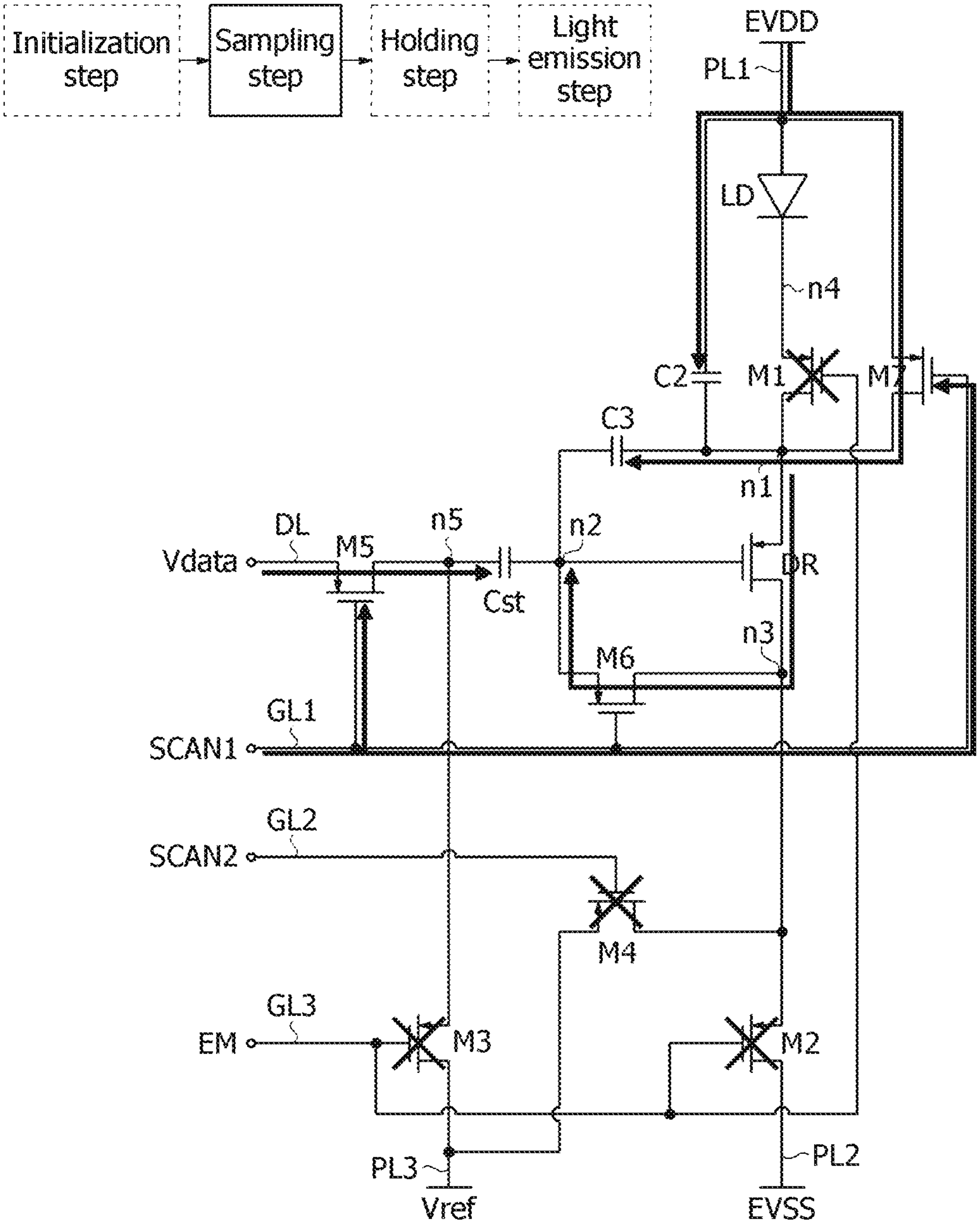
FIGS. 15A and 15B are diagrams illustrating a sampling step of the pixel circuit shown in FIG. 12 according to an embodiment of the present disclosure.
Figure 15B:
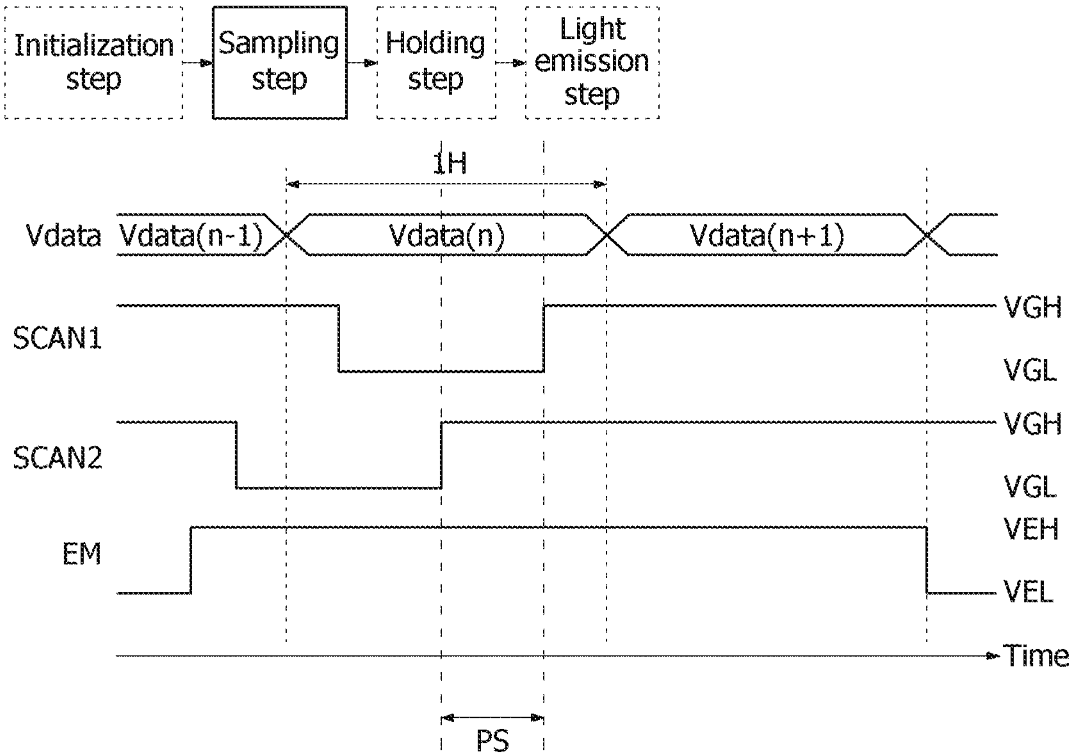

FIGS. 15A and 15B are drawings illustrating the sampling step of the pixel circuit shown in FIG. 12.

Referring to FIGS. 15A and 15B, the sampling step is performed during a third period Ps. During the third period Ps, the voltage of the first scan signal SCAN1 can be the gate-on voltage VGL, and the voltage of the second scan signal SCAN2 and the EM signal EM can be the gate-off voltage VGH, VEH. Accordingly, during the third period Ps, the fifth, sixth, and seventh switch transistors M5, M6, and M7 are in the on-state, and the fourth switch transistor M4 is in the off-state. During the third period Ps, the first, second, and third switch transistors M1, M2, and M3 are in the off-state. During the third period Ps, the voltage of the second node n2 increases to a voltage EVDD+Vth. Here, 'Vth' represents the threshold voltage of the driving element DR. The driving transistor DR is turned off when the gate-source voltage Vgs becomes less than the threshold voltage. During the third period Ps, the voltage of the fifth node n5 is the data voltage Vdata. The first capacitor Cst is charged with a difference voltage between the voltage of the fifth node n5 and the voltage of the second node n2.

Figure 16A:
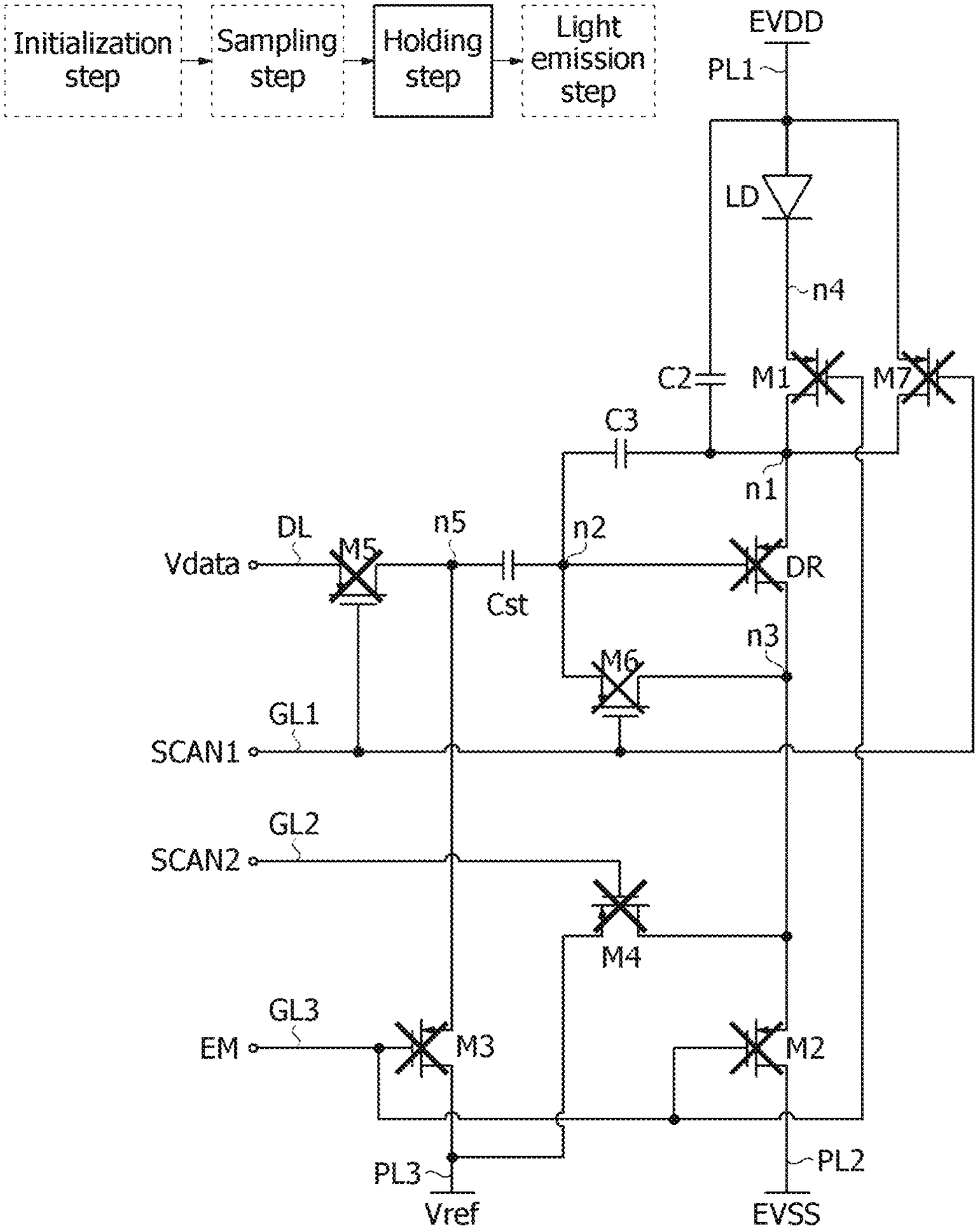
FIGS. 16A and 16B are diagrams illustrating a holding step of the pixel circuit shown in FIG. 12 according to an embodiment of the present disclosure.
Figure 16B:
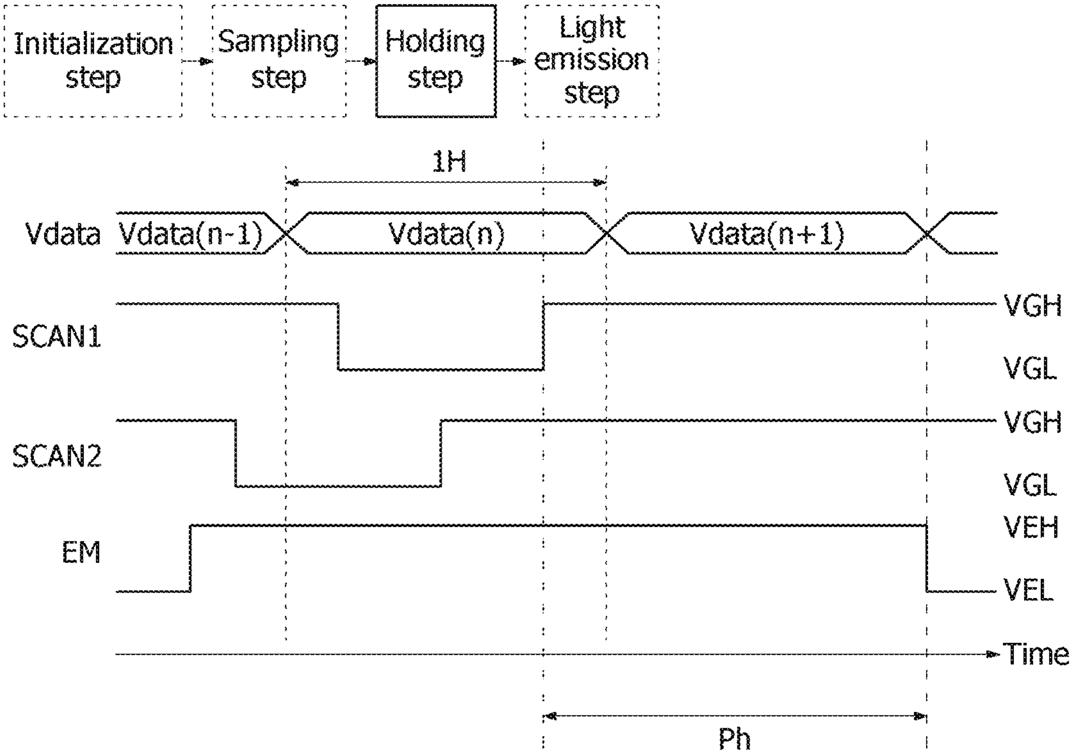

FIGS. 16A and 16B are diagrams illustrating the holding step of the pixel circuit shown in FIG. 12.

Referring to FIGS. 16A and 16B, the holding step is performed during a fourth period Ph. During the fourth period Ph, the voltage of the first scan signal SCAN1, the second scan signal SCAN2, and the EM signal EM can be the gate-off voltage VGH, VEH. Accordingly, during the fourth period Ph, since the first to seventh switch transistors M1 to M7 are in the off-state, the first to fourth nodes n1 to n4 are floated, and therefore the voltage across the first capacitor Cst remains at its previous state.

Figure 17A:
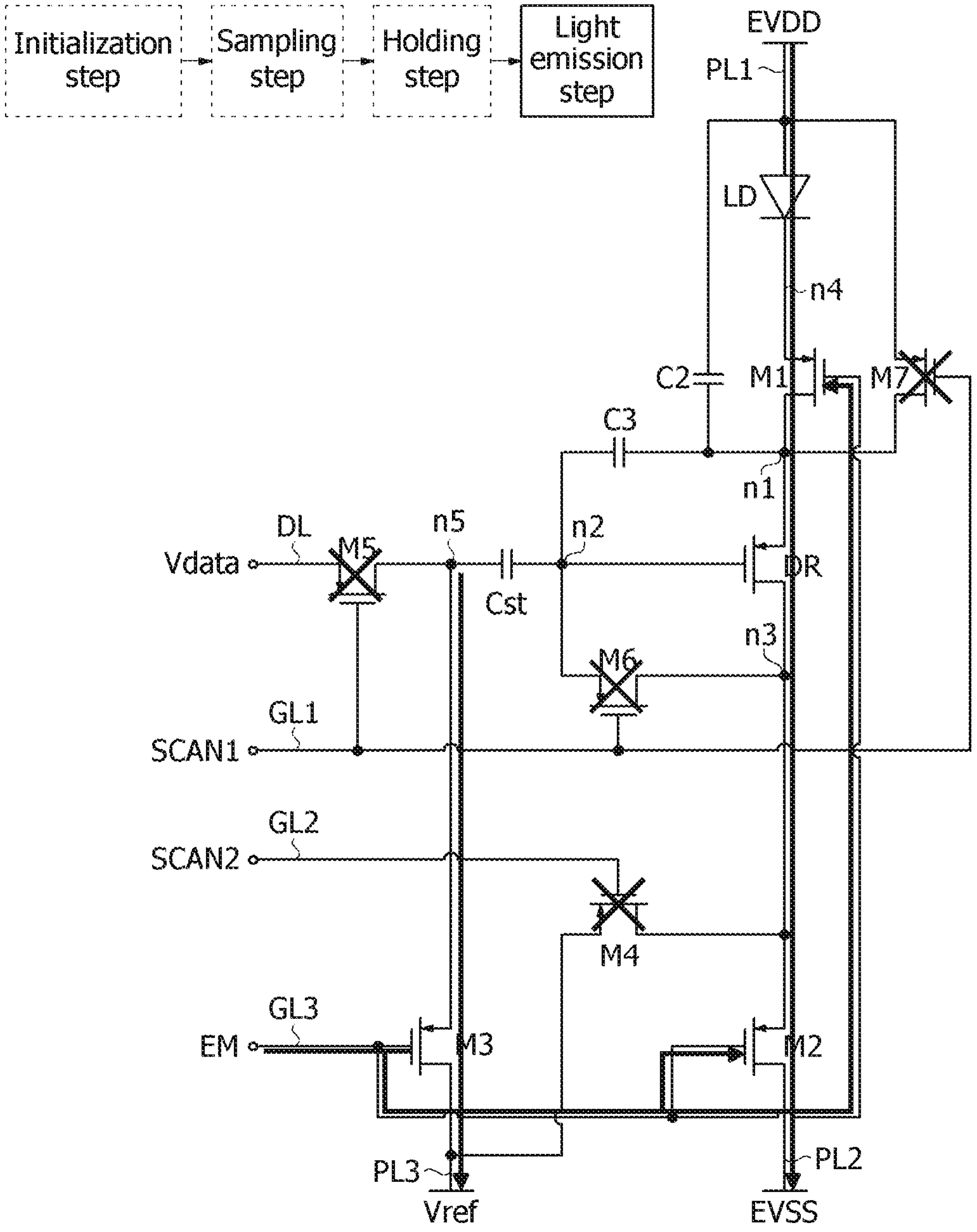
FIGS. 17A and 17B are diagrams illustrating a light emission step of the pixel circuit shown in FIG. 12 according to an embodiment of the present disclosure.
Figure 17B:
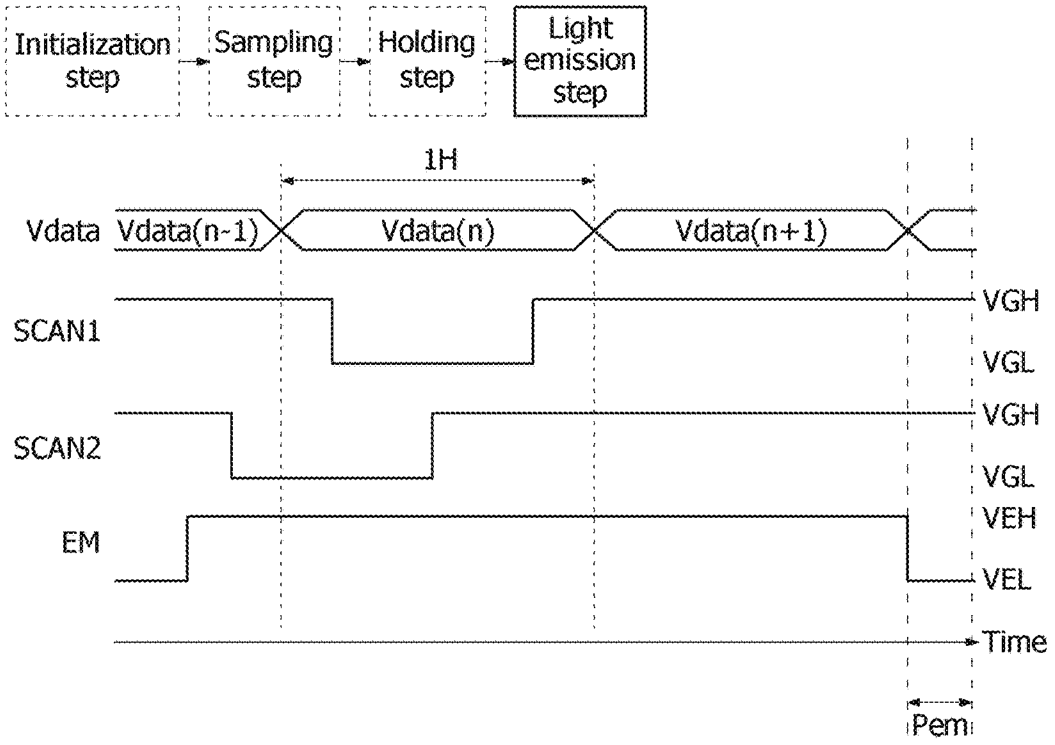

FIGS. 17A and 17B are drawings illustrating the light emission step of the pixel circuit shown in FIG. 12.

Referring to FIG. 17A and FIG. 17B, the light emission step is performed during a fifth period Pem. During the fifth period Pem, the voltage of the EM signal EM can be the gate-on voltage VEL and the voltage of the first scan signal SCAN1 and the second scan signal SCAN2 can be the gate-off voltage VGH. Accordingly, during the fifth period Pem, the first, second, and third switch transistors M1, M2, and M3 are turned on, while the other switch transistors M4, M5, M6, and M7 are in the off-state. During the fifth period Pem, the driving transistor DR generates current according to the gate-source voltage Vgs to drive the light-emitting element LD. The light-emitting element LD emits light based on the current ILD from the driving transistor DR during the fifth period Pem. The current ILD flowing through the light-emitting element LD is as follows.

$$
\begin{aligned}
I_{LD} &= \frac{1}{2}\mu C_{ox}\frac{W}{L}(V_{gs} - V_{th})^2 \\
&= \frac{1}{2}\mu C_{ox}\frac{W}{L}(V_s - V_g + V_{th})^2 \\
&= \frac{1}{2}\mu C_{ox}\frac{W}{L}(EVDD - (EVDD + V_{th} - (V_{data} - V_{ref})) + V_{th})^2 \\
&= \frac{1}{2}\mu C_{ox}\frac{W}{L}(EVDD - EVDD - V_{th} + V_{data} - V_{ref} + V_{th})^2 \\
&= \frac{1}{2}\mu C_{ox}\frac{W}{L}(V_{data} - V_{ref})^2
\end{aligned}
$$

Where $V_s$ denotes the source voltage of the driving transistor DR or the voltage of the first node n1, and $V_g$ denotes the gate voltage of the driving transistor DR or the voltage of the second node n2. Also, $$\mu C_{ox}\frac{W}{L}$$

denotes a constant value that is determined by the mobility μ, channel capacity $C_{ox}$, channel width W, channel length L, and the like of the driving transistor DR. $V_t$h denotes the threshold voltage of the driving element DR.

As can be seen above, the light-emitting element LD can be driven without being affected by the change in the threshold voltage Vth by compensating the threshold voltage Vth of the driving transistor DR in the light emission step, and without being affected by the RC delay or IR drop of the pixel driving voltage EVDD.

Figure 18:
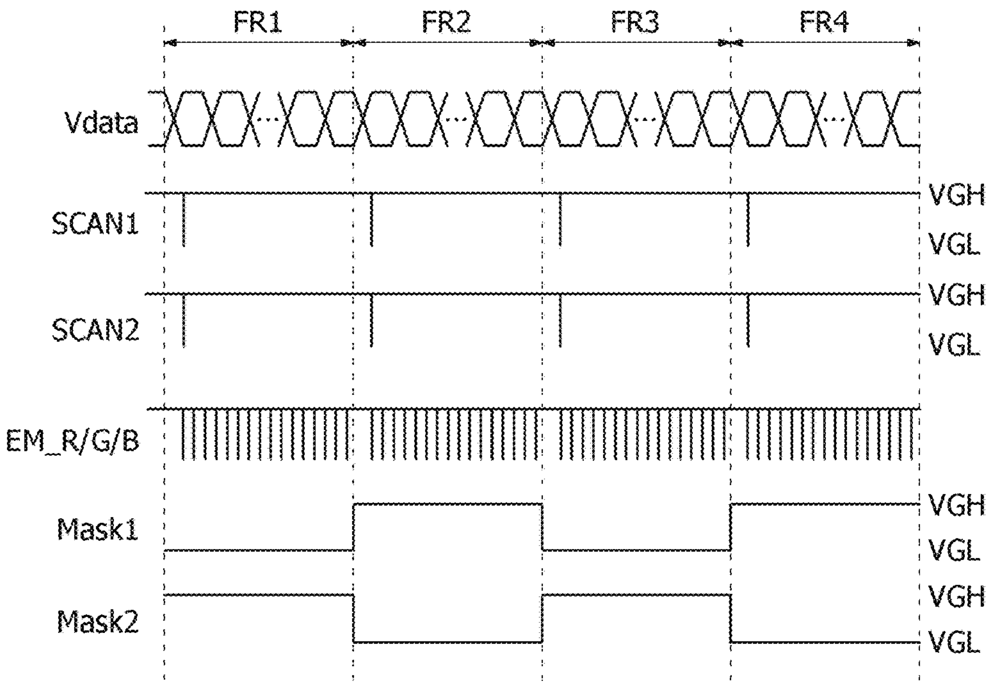
FIG. 18 is a waveform diagram illustrating gate signals and mask signals during a first frame period to a fourth frame period according to an embodiment of the present disclosure.

FIG. 18 is a waveform diagram illustrating gate signals and mask signals during a first frame period to a fourth frame period.

Referring to FIG. 18, the first mask signal MSK1 can be the gate-on voltage VGL during the odd-numbered frame periods FR1 and FR3 and the gate-off voltage VGH during the even-numbered frame periods FR2 and FR4. The second mask signal MSK2 can be the gate-off voltage VGH during the odd-numbered frame periods FR1 and FR3 and the gate-on voltage VGL during the even-numbered frame periods FR2 and FR4. In FIG. 18, EM_R/G/B denotes the color-specific EM signals EM_R, EM_G, and EM_B. The color-specific EM signals EM_R EM_G, and EM_B can include an EM signal EM_R input to the red sub-pixels SP_R, an EM signal EM_G input to the green sub-pixels SP_G, and an EM signal EM_B input to the blue sub-pixels SP_B, as shown in FIG. 9. The operation of the pixel circuit will be described under the assumption that the first and second mask signals MSK1 and MSK2 have the same example as in FIG. 18.

FIGS. 19A to 22B are diagrams illustrating the operation of the pixel circuit 300 shown in FIG. 3 in detail during the first frame period FR1. FIGS. 23A to 26B are diagrams illustrating the operation of the pixel circuit 300 shown in FIG. 2 in detail during the second frame period FR2. In these embodiments, first and second compensation circuits 12 and 14 are examples implemented based on the pixel circuit shown in FIG. 12, but are not limited thereto. In these embodiments, redundant descriptions will be omitted for the components that are substantially the same as the pixel circuit described and illustrated in FIG. 12.

Figure 19A:
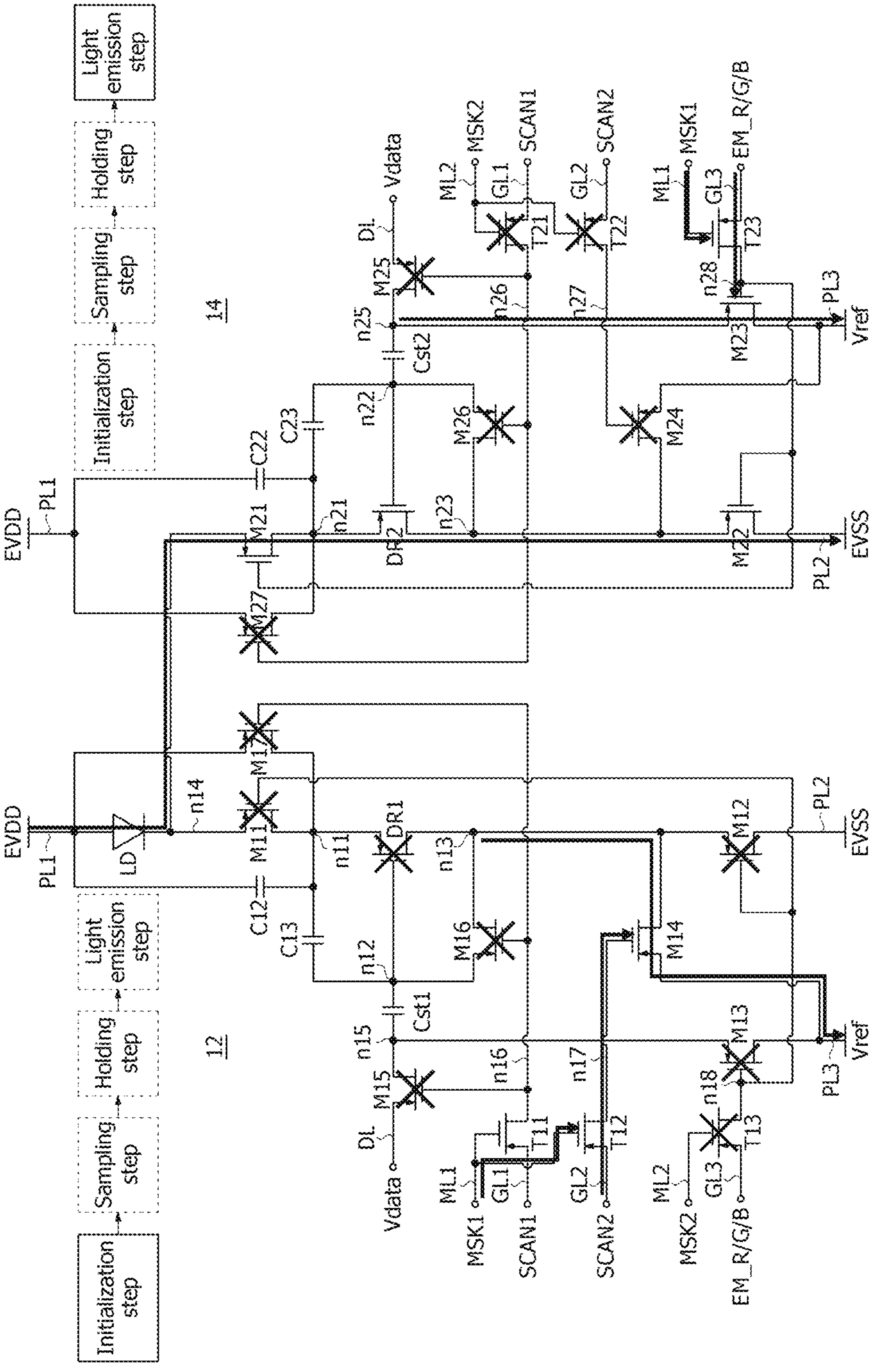
FIGS. 19A and 19B are diagrams illustrating in detail a first initialization step and a light emission step of the pixel circuit shown in FIG. 3 during a first frame period according to an embodiment of the present disclosure.

Referring to FIGS. 19A, the pixel circuit 300 includes a light-emitting element LD, a first driving transistor DR1, a second driving transistor DR2, a plurality of EM switch transistors M11, M12, M21, and M24, the first compensation circuit 12, and the second compensation circuit 14. For example, both of the first compensation circuit 12 and the second compensation circuit 14 are connected to the light-emitting element LD and both compensation circuits can have substantially the same internal circuit configuration, except that the connections regarding the first and second mask signals MSK1 and MSK2 are flipped. In this way, the light-emitting element LD can be driven to emit light in an alternating manner by switching between the first compensation circuit 12 and the second compensation circuit 14. For example, while the initialization, sampling and holding operations are being performed for the first compensation circuit 12, the light-emitting element LD can be controlled to emit light by the second compensation circuit 14, and vice-versa.

An anode electrode of the light-emitting element LD can be connected to a first power line PL1 to which the pixel driving voltage EVDD is applied. A cathode electrode of the light-emitting element LD can be connected to a first-fourth node n14.

The first driving transistor DR1 can include a first electrode connected to a first-first node n11, a gate electrode connected a first-second node n12, and a second electrode connected to a first-third node n13. The second driving element DR2 can include a first electrode connected to a second-first node n21, a gate electrode connected to a second-second node n22, and a second electrode connected to a second-third node n23.

The EM switch transistors M11, M12, M21, and M24 include first-first and first-second switch transistors M11 and M12 connected to the first compensation circuit 12, and second-first and second-second switch transistors M21 and M22 connected to the second compensation circuit 14.

The first compensation circuit 12 can include a plurality of switch transistors M13 to M17 and T11 to T13, and a first-first capacitor Cst1. The first compensation circuit 12 can further include first-second and first-third capacitors C12 and C13.

First-first to first-seventh switch transistors M11 to M17 correspond to the first to seventh switch transistors M1 to M7 shown in FIG. 12, respectively. The first-first capacitor Cst1 can be connected between the first-second node n12 and a first-fifth node n15. The first-second capacitor C12 can be connected between a first power line PL1 and the first-first node n11. The first-third capacitor C13 can be connected between the first-first node n11 and the first-second node n12.

Each of the first-first, first-second, and first-third switch transistors M11, M12, and M13 is turned on in response to the gate-on voltage VEL of the color-specific EM signals EM_R, EM_G, and EM_B input through a first-tenth switch transistor T13 and turned off in response to the gate-off voltage VEH of the color-specific EM signals EM_R, EM_G, and EM_B. The first-first switch transistor M11 includes a first electrode connected to the first-fourth node n14, a gate electrode connected to a first-eighth node n18 to which the color-specific EM signals EM_R, EM_G, and EM_B are input, and a second electrode connected to the first-first node n11. The first-second switch transistor M12 includes a first electrode connected to the first-third node n13, a gate electrode connected to the first-eighth node n18 to which the color-specific EM signals EM_R, EM_G, and EM_B are input, and a second electrode to which the ground voltage EVSS is applied. The first-third switch transistor M13 includes a first electrode connected to a the first-fifth node n15, a gate electrode connected to the first-eighth node n18 to which the color-specific EM signals EM_R, EM_G, and EM_B are input, and a second electrode to which the reference voltage Vref is applied. For example, sub-pixels of different colors can receive EM signals that have different duty cycles.

The first-fourth switch transistor M14 is turned on in response to the gate-on voltage VGL of the second scan signal SCAN2 input through a first-ninth switch transistor T12 and turned off in response to the gate-off voltage VGH of the second scan signal SCAN2. The first-fourth switch transistor M14 includes a first electrode to which the reference voltage Vref is applied, a gate electrode connected to a first-seventh node n17 to which the second scan signal SCAN2 is applied, and a second electrode connected to the first-third node n13.

Each of the first-fifth, first-sixth, and first-seventh switch transistors M15, M16, and M17 is turned on in response to the gate-on voltage VGL of the first scan signal SCAN1 input through a first-eighth switch transistor T11, and turned off in response to the gate-off voltage VGH of the first scan signal SCAN1. The first-fifth switch transistor M15 includes a first electrode to which the data voltage Vdata is applied, a gate electrode connected to a first-sixth node n16 to which the first scan signal SCAN1 is applied, and a second electrode connected to the first-fifth node n15. The first-sixth switch transistor M16 includes a first electrode connected to the first-second node n12, a gate electrode connected to the first-sixth node n16, and a second electrode connected to the first-third node n13. The first-seventh switch transistor M17 includes a first electrode connected to a first power line PL1, a gate electrode connected to the first-sixth node n16, and a second electrode connected to the first-first node n11.

The first-eighth and first-ninth switch transistors T11 and T12 are each turned on in response to the gate-on voltage VGL of the first mask signal MSK1 and turned off in response to the gate-off voltage VGH of the first mask signal MSK1. When the first-eighth and first-ninth switch transistors T11 and T12 are turned on, the scan signals SCAN1 and SCAN2 can be transmitted to the corresponding gate electrodes of the first-fourth to first-seventh switch transistors M14, M15, M16, and M17, allowing the initialization step, the sampling step, and the holding step to be performed normally. On the other hand, when the first-eighth and first-ninth switch transistors T11 and T12 are turned off, the initialization step, the sampling step, and the holding step are not performed because the scan signals SCAN1 and SCAN2 are not transmitted to the corresponding gate electrodes of the first-fourth to first-seventh switch transistors M14, M15, M16, and M17. In other words, the first mask signal MSK1 can block or allow the scan signals SCAN1 and SCAN2 in the first compensation circuit 12, and the second mask signal MSK2 can block or allow the corresponding color-specific EM signal (e.g., EM_R, EM_G, or EM_B) in the first compensation circuit 12.

The first-eighth switch transistor T11 includes a first electrode connected to the first gate line GL1 to which the first scan signal SCAN1 is applied, a gate electrode connected to a first mask signal line ML1 to which the first mask signal MSK1 is applied, and a second electrode connected to the first-sixth nodes n16. The first-ninth switch transistor T12 includes a first electrode connected to a second gate line GL2 to which the second scan signal SCAN2 is applied, a gate electrode connected to the first mask signal line ML1, and a second electrode connected to the first-seventh node n17.

The first-tenth switch transistor T13 is turned on in response to the gate-on voltage VGL of the second mask signal MSK2 and turned off in response to the gate-off voltage VGH of the second mask signal MSK2. When the first-tenth switch transistor T13 is turned on, the color-specific EM signals EM_R, EM_G, and EM_B can be transmitted to the gate electrodes of the first-first to first-third switch transistors M11, M12, and M13, allowing the light emission step to be performed normally. On the other hand, when the first-tenth switch transistor T13 is turned off, the color-specific EM signals EM_R, EM_G, and EM_B are not transmitted to the gate electrodes of the first-first to first-third switch transistors M11, M12, and M13, and thus the light emission step is not performed (e.g., the color-specific EM signal is blocked by control of the second mask signal MSK2).

The first-tenth switch transistor T13 includes a first electrode connected to a third gate line GL3 to which the color-specific EM signals EM_R, EM_G, and EM_B are applied, a gate electrode connected to the second mask signal line ML2 to which the second mask signal MSK2 is applied, and a second electrode connected to the first-eighth node n18.

The second compensation circuit 14 can include a plurality of switch transistors M23 to M27 and T21 to T23, and a second-first capacitor Cst2. The second compensation circuit 14 can further include second-second and second-third capacitors C22 and C23.

Second-first to second-seventh switch transistors M21 to M27 correspond to the first to seventh switch transistors M1 to M7 shown in FIG. 12, respectively. The second-first capacitor Cst2 can be connected between the second-second node n22 and a second-fifth node n25. The second-second capacitor C22 can be connected between the first power line PL1 and the second-first node n21. The second-third capacitor C23 can be connected between the second-first node n21 and the second-second node n22.

Each of the second-first, second-second, and second-third switch transistors M21, M22, and M23 is turned on in response to the gate-on voltage VEL of the color-specific EM signals EM_R, EM_G, and EM_B input through the second-tenth switch transistor T23 and turned off in response to the gate-off voltage VEH of the color-specific EM signals EM_R, EM_G, and EM_B. The second-first switch transistor M21 includes a first electrode connected to the first-fourth node n14, a gate electrode connected to a second-eighth node n28 to which the color-specific EM signals EM_R, EM_G, EM_B are input, and a second electrode connected to the second-first node n21. The second-second switch transistor M22 includes a first electrode connected to the second-third node n23, a gate electrode connected to the second-eighth node n28 to which the color-specific EM signals EM_R, EM_G, and EM_B are input, and a second electrode to which the ground voltage EVSS is applied. The second-third switch transistor M23 includes a first electrode connected to the second-fifth node n25, a gate electrode connected to the second-eighth node n28 to which the color-specific EM signals EM_R, EM_G, and EM_B are input, and a second electrode to which the reference voltage Vref is applied.

The second-fourth switch transistor M24 is turned on in response to the gate-on voltage VGL of the second scan signal SCAN2 input through a second-ninth switch transistor T22 and turned off in response to the gate-off voltage VGH of the second scan signal SCAN2. The second-fourth switch transistor M24 includes a first electrode to which the reference voltage Vref is applied, a gate electrode connected to a second-seventh node n27 to which the second scan signal SCAN2 is applied, and a second electrode connected to the second-third node n23.

Each of the second-fifth, second-sixth, and second-seventh switch transistors M25, M26, and M27 is turned on in response to the gate-on voltage VGL of the first scan signal SCAN1 input through a second-eighth switch transistor T21 and turned off in response to the gate-off voltage VGH of the first scan signal SCAN1. The second-fifth switch transistor M25 includes a first electrode to which the data voltage Vdata is applied, a gate electrode connected to a second-sixth node n26 to which the first scan signal SCAN1 is applied, and a second electrode connected to the second-fifth node n25. The second-sixth switch transistor M26 includes a first electrode connected to the second-second node n22, a gate electrode connected to the second-sixth node n26, and a second electrode connected to the second-third node n23. The second-seventh switch transistor M27 includes a first electrode connected to the first power line PL1, a gate electrode connected to the second-sixth node n26, and a second electrode connected to the second-first node n21.

The second-eighth and second-ninth switch transistors T21 and T22 are each turned on in response to the gate-on voltage VGL of the second mask signal MSK2 and turned off in response to the gate-off voltage VGH of the second mask signal MSK2. When the second-eighth and second-ninth switch transistors T21 and T22 are turned on, the scan signals SCAN1 and SCAN2 can be transmitted to the corresponding gate electrodes of the second-fourth to second-seventh switch transistors M24, M25, M26, and M27, allowing the initialization step, the sampling step, and the holding step to be performed normally. On the other hand, when the second-eighth and second-ninth switch transistors T21 and T22 are turned off, the initialization step, the sampling step, and the holding step are not performed because the scan signals SCAN1 and SCAN2 are not transmitted to the corresponding gate electrodes of the second-fourth to second-seventh switch transistors M24, M25, M26, and M27. For example, the second mask signal MSK2 can block or allow the scan signals SCAN1 and SCAN2 in the second compensation circuit 14, and the first mask signal MSK1 can block or allow the corresponding color-specific EM signal (e.g., EM_R, EM_G, or EM_B) in the second compensation circuit 14. In other words, the connections regarding the first mask signal line ML1 and the second mask signal line ML2 in the second compensation circuit 14 are flipped relative to the connections regarding the first mask signal line ML1 and the second mask signal line ML2 in the first compensation circuit 12.

The second-eighth switch transistor T21 includes a first electrode connected to the first gate line GL1 to which the first scan signal SCAN1 is applied, a gate electrode connected to the second mask signal line ML2 to which the second mask signal MSK2 is applied, and a second electrode connected to the second-sixth nodes n26. The second-ninth switch transistor T22 includes a first electrode connected to a second gate line GL2 to which the second scan signal SCAN2 is applied, a gate electrode connected to the second mask signal line ML2, and a second electrode connected to the second-seventh node n27.

The second-tenth switch transistor T23 is turned on in response to the gate-on voltage VGL of the first mask signal MSK1 and turned off in response to the gate-off voltage VGH of the first mask signal MSK1. When the second-tenth switch transistor T23 is turned on, the color-specific EM signals EM_R, EM_G, and EM_B can be transmitted to the gate electrodes of the second-first to second-third switch transistors M21, M22, and M23, allowing the light emission step to be performed normally. On the other hand, when the second-tenth switch transistor T23 is turned off, the color-specific EM signals EM_R, EM_G, and EM_B are not transmitted to the gate electrodes of the second-first to second-third switch transistors M21, M22, and M23, and thus the light emission step is not performed (e.g., the color-specific EM signal is blocked by control of the first mask signal MSK1).

The second-tenth switch element T23 includes a first electrode connected to a third gate line GL3 to which the color-specific EM signals EM_R, EM_G, and EM_B are applied, a gate electrode connected to the first mask signal line ML1 to which the first mask signal MSK1 is applied, and a second electrode connected to the second-eighth node n28.

The color-specific EM signals EM_R, EM_G, and EM_B can be set independently for each color of the light-emitting elements as shown in FIGS. 10 and 11.

In the pixel circuit 300 illustrated in FIG. 3, the first compensation circuit 12 can perform a first initialization step, a second initialization step, a holding step, and a sampling step in one horizontal period (1H) during the odd-numbered frame periods FR1 and FR3 as shown in FIGS. 19A to 22B. The second compensation circuit 14 can perform a light emission step during the odd-numbered frame periods FR1 and FR3, including a first initialization step, a second initialization step, a holding step, and a sampling step during the odd-numbered frame periods FR1 and FR3, as shown in FIGS. 19A to 22B.

As shown in FIG. 18, the voltage of the first mask signal MSK1 can be the gate-on voltage VGL during the odd-numbered frame periods FR1 and FR3, and the voltage of the second mask signal MSK2 can be the gate-off voltage VGH during the odd-numbered frame periods FR1 and FR3. In this situation, as shown in FIGS. 19A to 22B, the first-eighth and first-ninth switch transistors T11 and T12 in the first compensation circuit 12 can be turned on in response to the gate-on voltage VGL of the first mask signal MSK1 during the odd-numbered frame period FR1 and FR3, while the first-tenth switch transistor T13 can be turned off. During the odd-numbered frame periods FR1 and FR3, the second-tenth switch transistor T23 in the second compensation circuit 14 can be turned on in response to the gate-on voltage VGL of the first mask signal MSK1, while the second-eighth and second-ninth switch transistors T21 and T22 can be turned off.

Figure 19B:
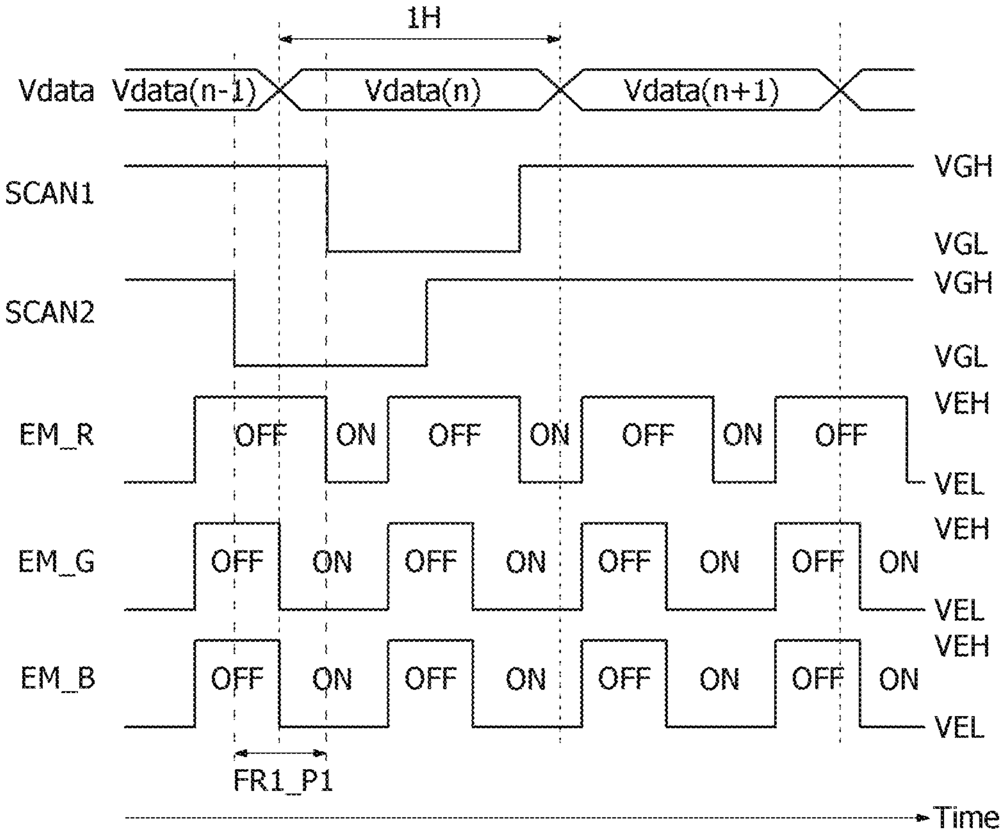

FIGS. 19A and 19B are diagrams illustrating in detail the first initialization step and the light emission step of the pixel circuit 300 shown in FIG. 3 during the first frame period FR1.

Referring to FIGS. 18, 19A, and 19B, the first compensation circuit 12 can perform the first initialization step in a first period of a first frame period FR1_P1. The second compensation circuit 14 can perform the light emission step in the first period of the first frame period FR1_P1. Accordingly, the pixel circuit 300 can simultaneously perform the first initialization step and the light emission step in the first period FR1_P1 of the first frame period via the two compensation circuits.

During the first period of the first frame period FR1_P1, the voltage of the second scan signal SCAN2 is the gate-on voltage VGL and the voltage of the first scan signal SCAN1 is the gate-off voltage VGH. The second scan signal SCAN2 can be transmitted to the gate electrode of the first-fourth switch transistor M14 through the first-ninth switch transistor T12 during the first frame period FR1. During the first period of the first frame period FR1_P1, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the second-first, second-second, and second-third switch transistors M21, M22, and M23 through the second-tenth switch transistor T23 during the first frame period FR1.

During the first period of the first frame period FR1_P1, the first-fourth, first-eighth, and first-ninth switch transistor M14, T11, and T12 in the first compensation circuit 12 are in the on-state, while the other switch transistors M11, M12, M13, M15, M16, M17, and T13 are in the off-state. During the first period of the first frame period FR1_P1, the first driving transistor DR1 is in the off-state. During the first period of the first frame period FR1_P1, the voltages of the first-third node n13 are initialized to the reference voltage Vref.

During the first period of the first frame period FR1_P1, the second-first, second-second, second-third, and second-tenth switch transistors M21, M22, M23, and T23 in the second compensation circuit 14 are in the on-state, while the other switch transistors M24, M25, M26, M27, T21, and T22 are in the off-state. During the first periods of the first frame period FR1_P1, the second driving transistor DR2 is in the on-state. The second driving transistor DR2 generates a current according to the gate-source voltage Vgs during the first periods FR1_P1 of the first frame period to drive the light-emitting element LD. The light-emitting element LD can emit light by the current from the second driving transistor DR2 in the light-on interval (ON) of the color-specific EM signals EM_R, EM_G, and EM_B during the first period FR1_P1 of the first frame period. During the light-on interval (ON), the voltage of the color-specific EM signals EM_R, EM_G, and EM_B can be the gate-on voltage VEL. Thus, while the first compensation circuit 12 is beginning initialization, the second compensation circuit 14 can control the light-emitting element LD to emit light during the first period of first frame period FR1_P1.

Figure 20A:
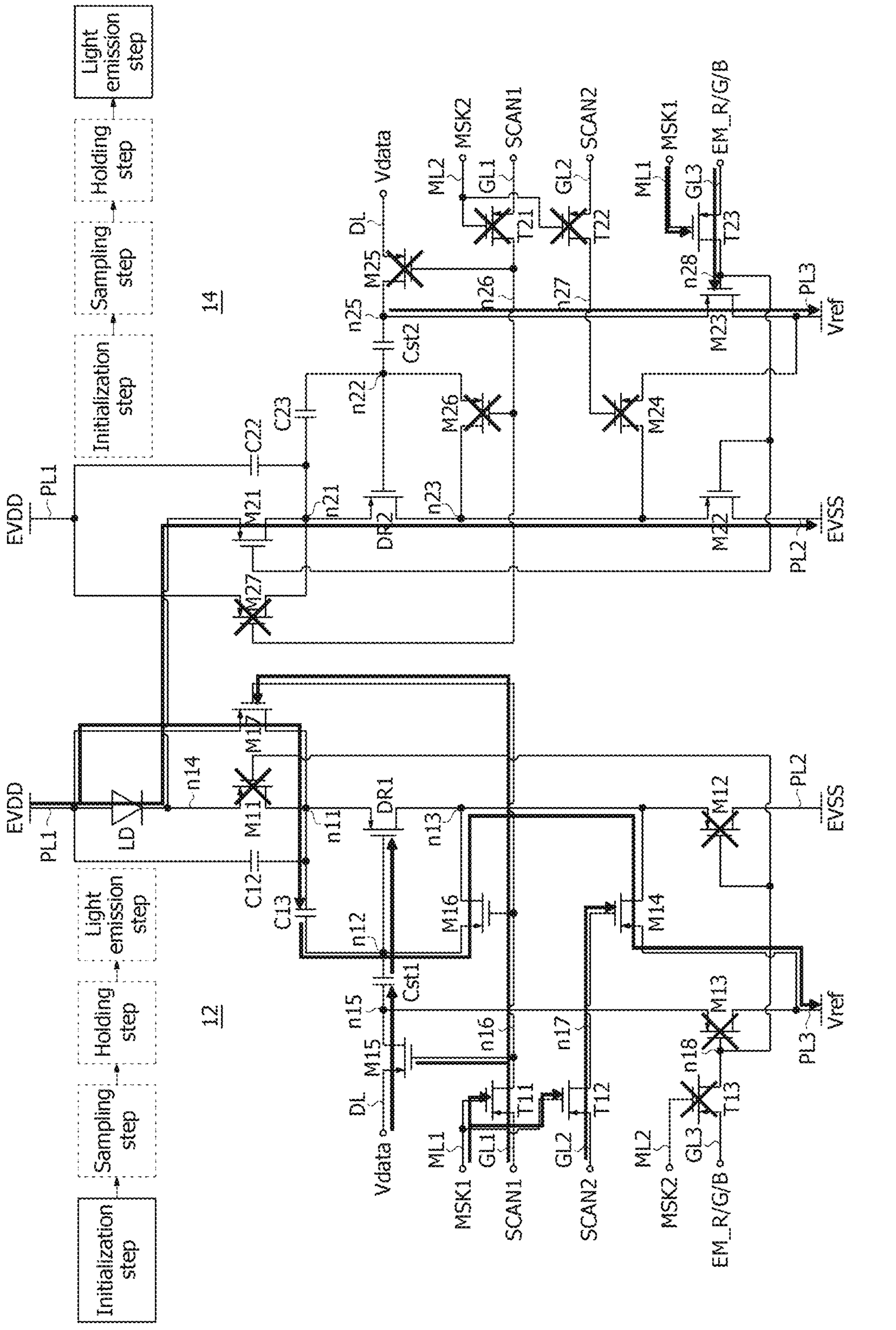
FIGS. 20A and 20B are diagrams illustrating in detail a second initialization step and a light emission step of the pixel circuit shown in FIG. 3 during a first frame period according to an embodiment of the present disclosure.
Figure 20B:
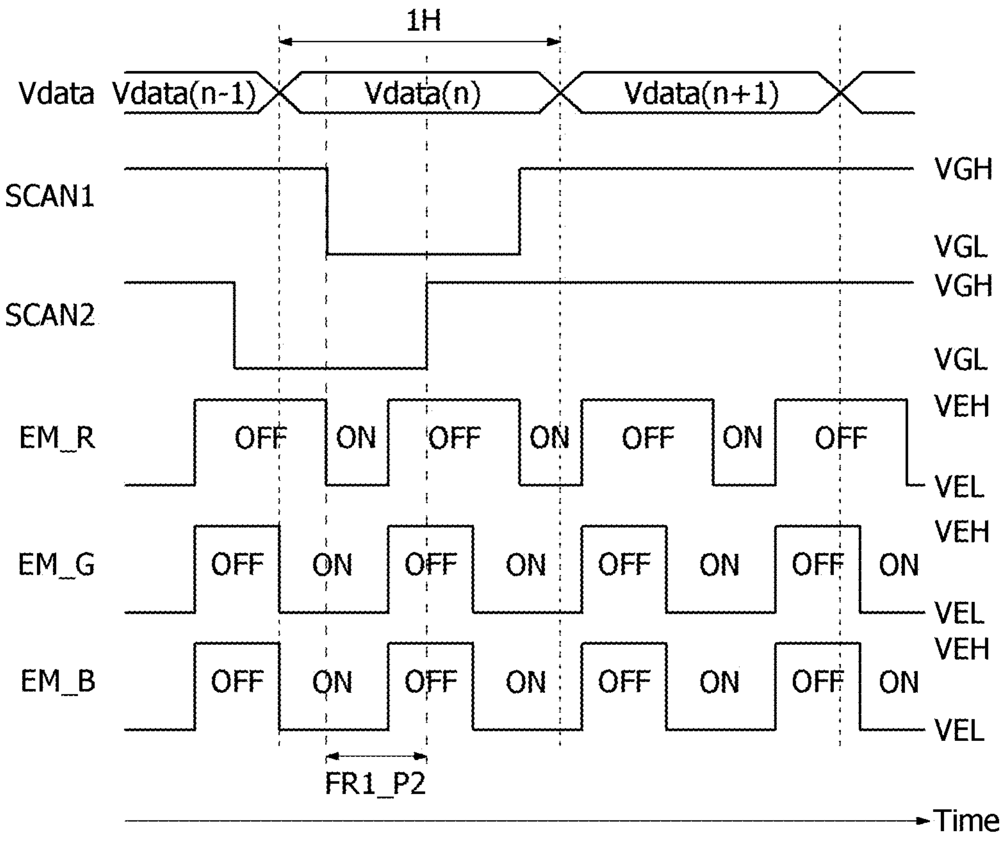

FIGS. 20A and 20B are diagrams illustrating in detail the second initialization step and the light emission step of the pixel circuit 300 shown in FIG. 3 during the first frame period FR1.

Referring to FIGS. 18, 20A, and 20B, the first compensation circuit 12 can perform the second initialization step in a second period of the first frame period FR1_P2. The second compensation circuit 14 can perform the light emission step in the second period of the first frame period FR1_P2. Accordingly, the pixel circuit 300 can simultaneously perform the second initialization step and the light emission step in the second period of the first frame period FR1_P2.

During the second period of the first frame period FR1_P2, the voltage of the first scan signal SCAN1 and the second scan signal SCAN2 is the gate-on voltage VGL. The first scan signal SCAN1 can be transmitted to the gate electrode of each of the first-fifth, first-sixth, and first-seventh switch transistors M15, M16, and M17 through the first-eighth switch transistor T11 during the first frame period FR1. The second scan signal SCAN2 can be transmitted to the gate electrode of the first-fourth switch transistor M14 through the first-ninth switch transistor T12 during the first frame period FR1. During the second period of the first frame period FR1_P2, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the second-first, second-second, and second-third switch transistors M21, M22, and M23 through the second-tenth switch transistor T23 during the first frame period FR1.

During the second period of the first frame period FR1_P2, the first-fourth, first-fifth, first-sixth, first-seventh, first-eighth, and first-ninth switch transistors M14, M15, M16, M17, T11, and T12 in the first compensation circuit 12 are in the on-state. On the other hand, the first-first, first-second, first-third, and first-tenth switch transistors M11, M12, M13, and T13 are in the off-state. During the second period of the first frame period FR1_P2, the voltage of the first-first node n11 rises to turn on the first driving transistor DR1.

During the second period of the first frame period FR1_P2, the data voltage Vdata(n) is applied to the data line DL. This data voltage Vdata(n) is applied to the first-fifth node n15 through the first-fifth switch transistor M15. During the second period of the first frame period FR1_P2, the reference voltage Vref is applied to the first-second and first-third nodes n12 and n13 through the first-fourth and first-sixth transistors M14 and M16. Accordingly, during the second period of the first frame period FR1_P2, the voltage of the first-second node n12 is initialized to the reference voltage Vref, and the voltage of the first-fifth node n15 is the data voltage Vdata(n).

During the second period of the first frame period FR1_P2, the second-first, second-second, second-third, and second-tenth switch transistors M21, M22, M23, and T23 in the second compensation circuit 14 are in the on-state, while the other switch transistors M24, M25, M26, M27, T21, and T22 are in the off-state. During the second period of the first frame period FR1_P2, the second driving transistor DR2 is in the on-state. The second driving transistor DR2 generates a current according to the gate-source voltage Vgs during the second period of the first frame period FR1_P2 to drive the light-emitting element LD. The light-emitting element LD can emit light by the current from the second driving transistor DR2 in the light-on interval (ON) of the color-specific EM signals EM_R, EM_G, and EM_B during the second period FR1_P2 of the first frame period. Thus, while the first compensation circuit 12 is still being initialized, the second compensation circuit 14 can control the light-emitting element LD to emit light during the second period of first frame period FR1_P2.

Figure 21A:
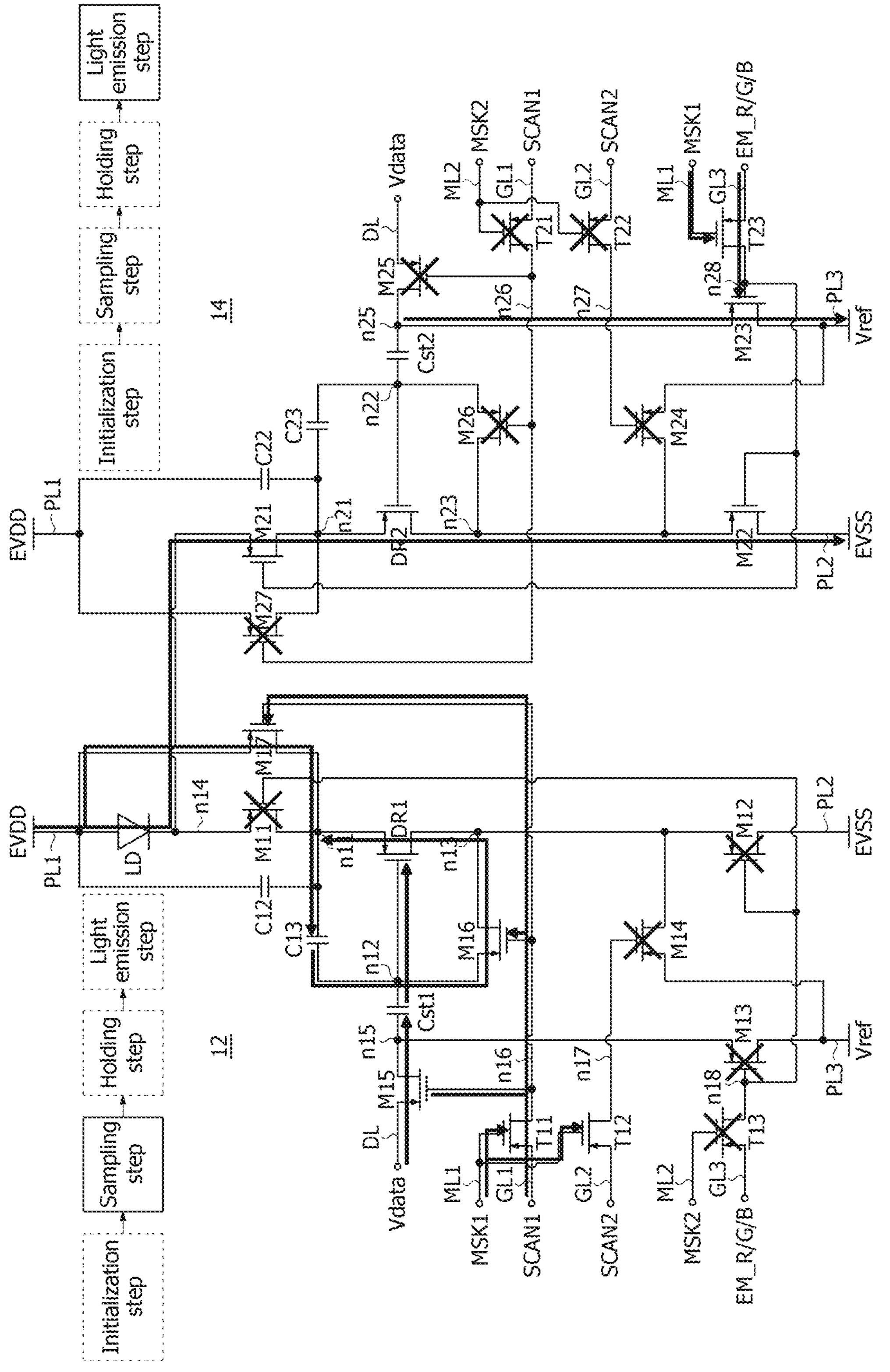
FIGS. 21A and 21B are drawings illustrating in detail a sampling step and a light emission step of the pixel circuit shown in FIG. 3 during a first frame period according to an embodiment of the present disclosure.
Figure 21B:
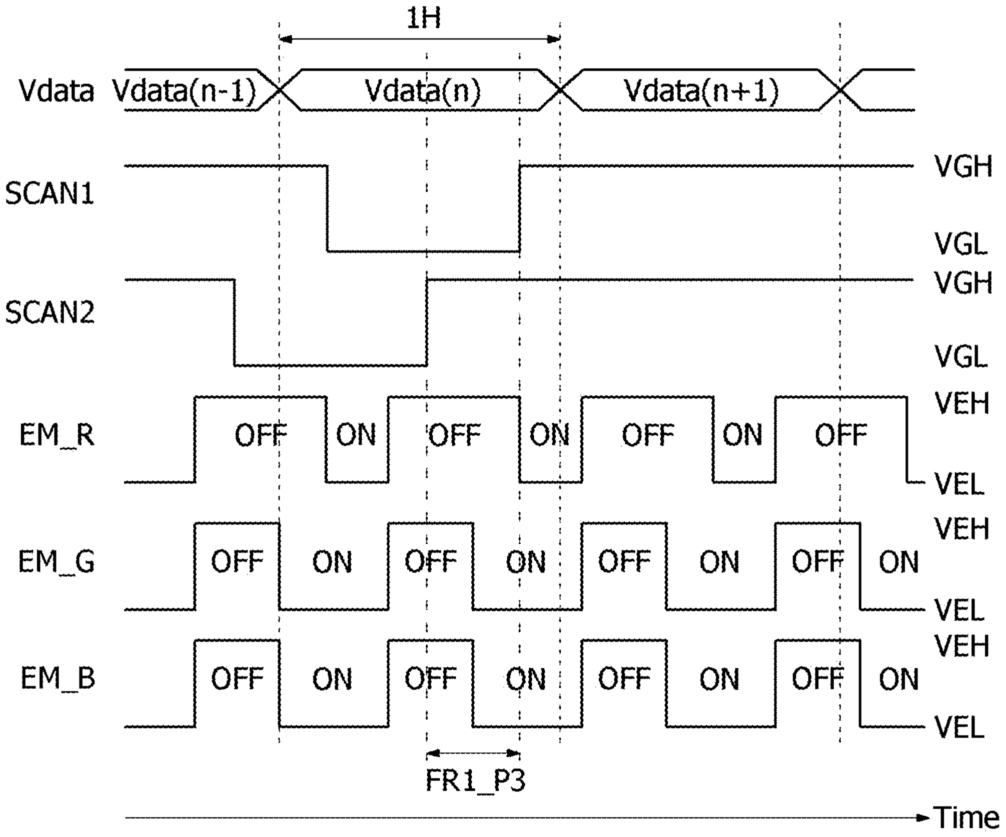

FIGS. 21A and 21B are drawings illustrating in detail the sampling step and the light emission step of the pixel circuit 300 shown in FIG. 3 during the first frame period.

Referring to FIGS. 18, 21A, and 21B, the first compensation circuit 12 can perform the sampling step in the third period of the first frame period FR1_P3. The second compensation circuit 14 can perform the light emission step in the third period of the first frame period FR1_P3. Accordingly, the pixel circuit 300 can simultaneously perform the sampling step and the light emission step in the third period of the first frame period FR1_P3.

During the third period of the first frame period FR1_P3, the voltage of the first scan signal SCAN1 is the gate-on voltage VGL and the voltage of the second scan signal SCAN2 is the gate-off voltage VGH. The first scan signal SCAN1 can be transmitted to the gate electrode of each of the first-fifth, first-sixth, and first-seventh switch transistors M15, M16, and M17 through the first-eighth switch transistor T11 during the first frame period FR1. During the third period of the first frame period FR1_P3, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the second-first, second-second, and second-third switch transistors M21, M22, and M23 through the second-tenth switch transistor T23 during the first frame period FR1.

During the third period of the first frame period FR1_P3, the first-fifth, first-sixth, first-seventh, first-eighth, and first-ninth switch transistors M15, M16, M17, T11, and T12 in the first compensation circuit 12 are in the on-state. On the other hand, the first-first, first-second, first-third, first-fourth, and first-tenth switch transistors M11, M12, M13, M14, and T13 are in the off-state. During the third period of the first frame period FR1_P3, the data voltage Vdata(n) is applied to the data line DL. During the third period of the first frame period FR1_P3, the voltage of first-second node n12 rises to a voltage EVDD+Vth. Here, 'Vth' represents the threshold voltage of the first driving transistor DR1. The first driving transistor DR1 is turned off when the gate-source voltage Vgs becomes less than the threshold voltage. During the third period of the first frame period FR1_P3, the voltage of first-fifth node n15 is the data voltage Vdata(n). The first-first capacitor Cst1 is charged with a difference voltage between the voltage of the first-fifth node n15 and the voltage of the first-second node n12.

During the third period of the first frame period FR1_P3, the second-first, second-second, second-third, and second-tenth switch transistors M21, M22, M23, and T23 in the second compensation circuit 14 are in the on-state, while the other switch transistors M24, M25, M26, M27, T21, and T22 are in the off-state. During the third period of the first frame period FR1_P3, the second driving transistor DR2 is in the on-state. The second driving transistor DR2 generates a current according to the gate-source voltage Vgs during the third periods of the first frame period FR1_P3 to drive the light-emitting element LD. The light-emitting element LD can emit light by the current from the second driving transistor DR2 in the light-on interval (ON) of the color-specific EM signals EM_R, EM_G, and EM_B during the third period of the first frame period FR1_P3. Thus, while the first compensation circuit 12 is being sampled, the second compensation circuit 14 can control the light-emitting element LD to emit light during the third period of the first frame period FR1_P3.

Figure 22A:
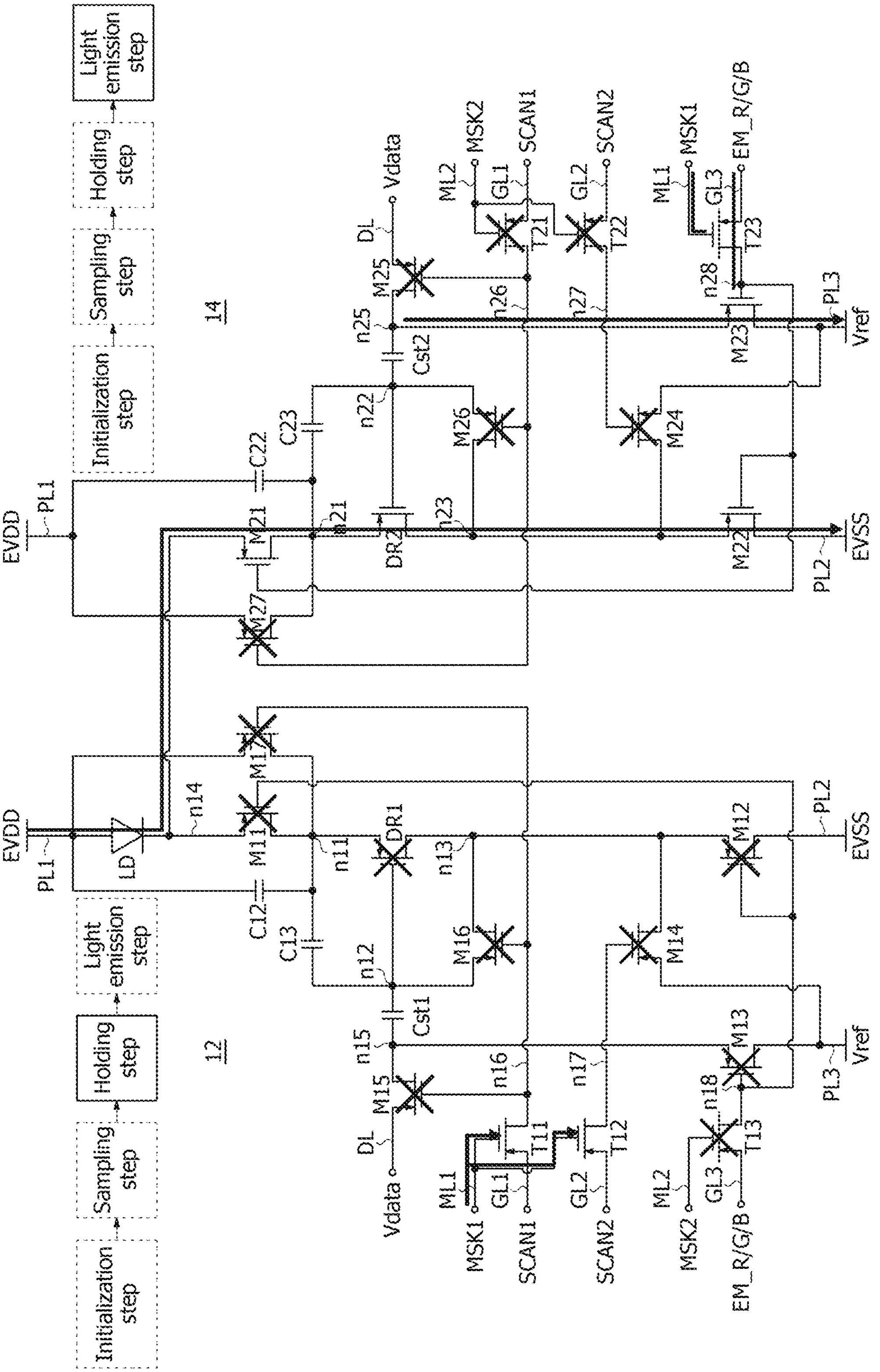
FIGS. 22A and 22B are diagrams illustrating in detail a holding step and a light emission step of the pixel circuit shown in FIG. 3 during a first frame period according to an embodiment of the present disclosure.
Figure 22B:
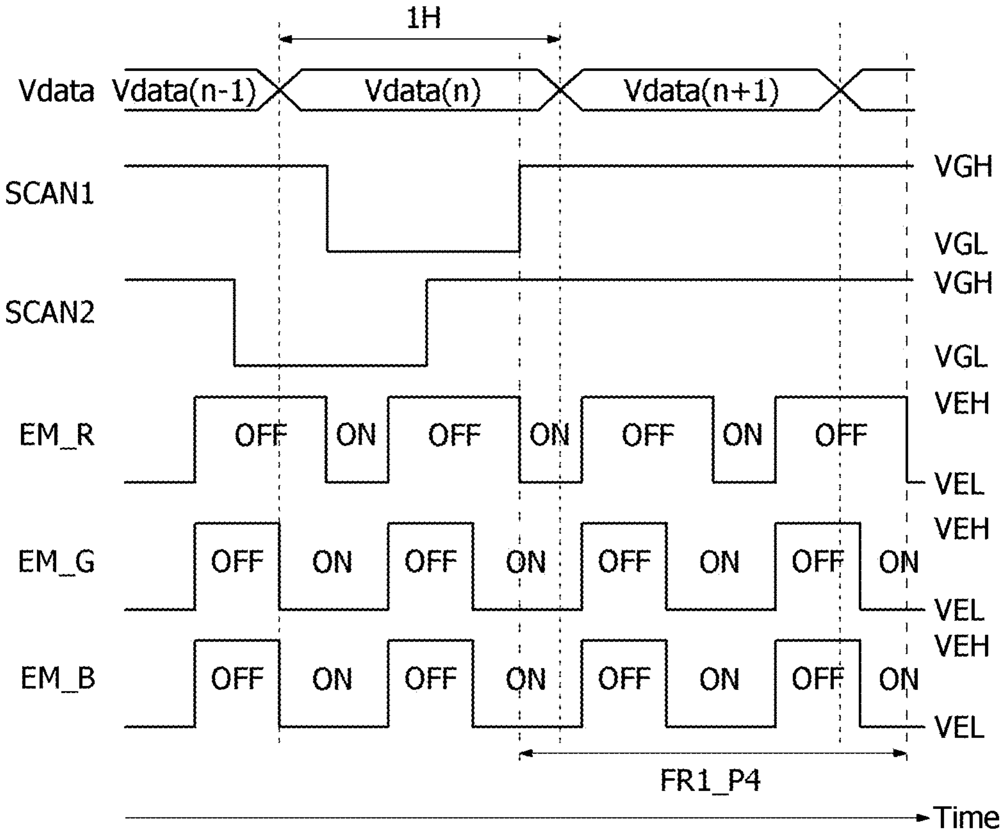

FIGS. 22A and 22B are drawings illustrating in detail the sampling step and the light emission step of the pixel circuit 300 shown in FIG. 3 during the first frame period.

Referring to FIGS. 18, 22A, and 22B, the first compensation circuit 12 can perform the holding step in the fourth period of the first frame period FR1_P4. The second compensation circuit 14 can perform the light emission step in the fourth period of the first frame period FR1_P4. Accordingly, the pixel circuit 300 can simultaneously perform the holding step and the light emission step in the fourth period FR1_P4 of the first frame period.

During the fourth period of the first frame period FR1_P4, the voltage of the first and second scan signals SCAN1 and SCAN2 is the gate-off voltage VGH. During the fourth period of the first frame period FR1_P4, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the second-first, second-second, and second-third switch transistors M21, M22, and M23 through the second-tenth switch transistor T23 during the first frame period FR1.

During the fourth period of the first frame period FR1_P4, the first-eighth and first-ninth switch transistors T11 and T12 in the first compensation circuit 12 are in the on-state. On the other hand, the other switch transistors M11 to M17, and T13 are in the off-state. During the fourth period of the first frame period FR1_P4, a data voltage of a following pixel line, e.g., an (n+1)th data voltage Vdata(n+1), can be applied to the data line DL. Since the first-first to first-seventh switch transistors M11 to M17 are in the off-state, the first-first to first-fourth nodes n11 to n14 are floated, and thus the voltage across the first-first capacitor Cst1 remains at its previous state.

During the fourth period of the first frame period FR1_P4, the second-first, second-second, second-third, and second-tenth switch transistors M21, M22, M23, and T23 in the second compensation circuit 14 are in the on-state, while the other switch transistors M24, M25, M26, M27, T21, and T22 are in the off-state. During the fourth periods of the first frame period FR1_P4, the second driving transistor DR2 is in the on-state. The second driving transistor DR2 generates a current according to the gate-source voltage Vgs during the fourth periods FR1_P4 of the first frame period to drive the light-emitting element LD. The light-emitting element LD can emit light by the current from the second driving transistor DR2 in the light-on interval (ON) of the color-specific EM signals EM_R, EM_G, and EM_B during the fourth period of the first frame period FR1_P4. Thus, while the first compensation circuit 12 is finishing up with the holding step, the second compensation circuit 14 can control the light-emitting element LD to emit light during the fourth period of the first frame period FR1_P4.

The second compensation circuit 14 can perform the first initialization step, the second initialization step, the holding step, and the sampling step in one horizontal period (1H) during the even-numbered frame periods FR2 and FR4, as shown in FIGS. 23A to 26B (e.g., now the roles of the first compensation circuit 12 and the second compensation circuit 14 are reversed or switched). The first compensation circuit 12 can perform a light emission step during the even-numbered frame periods FR2 and FR4, including the first initialization step, the second initialization step, the holding step, and the sampling step during the even-numbered frame periods FR2 and FR4, as shown in FIGS. 23A to 26B. In other words, while the first compensation circuit 12 is getting ready, the second compensation circuit 14 can control the light-emitting element LD to emit light, and then while the second compensation circuit 14 is getting ready, the first compensation circuit 12 can control the light-emitting element LD to emit light, and the process can carry on in an alternating manner.

The voltage of the second mask signal MSK2 can be the gate-on voltage VGL during the even-numbered frame periods FR2 and FR4, and the voltage of the first mask signal MSK1 can be the gate-off voltage VGH during the even-numbered frame periods FR2 and FR4. Accordingly, the second-eighth and second-ninth switch transistors T21 and T22 of the second compensation circuit 14 can be turned on in response to the gate-on voltage VGL of the second mask signal MSK2 during the even-numbered frame periods FR2 and FR4, while the second-tenth switch transistor T23 can be turned off. During the even-numbered frame periods FR2 and FR4, the first-tenth switch transistor T13 of the first compensation circuit 12 can be turned on in response to the gate-on voltage VGL of the second mask signal MSK2, while the first-eighth and first-ninth switch transistors T11 and T12 can be turned off.

Figure 23A:
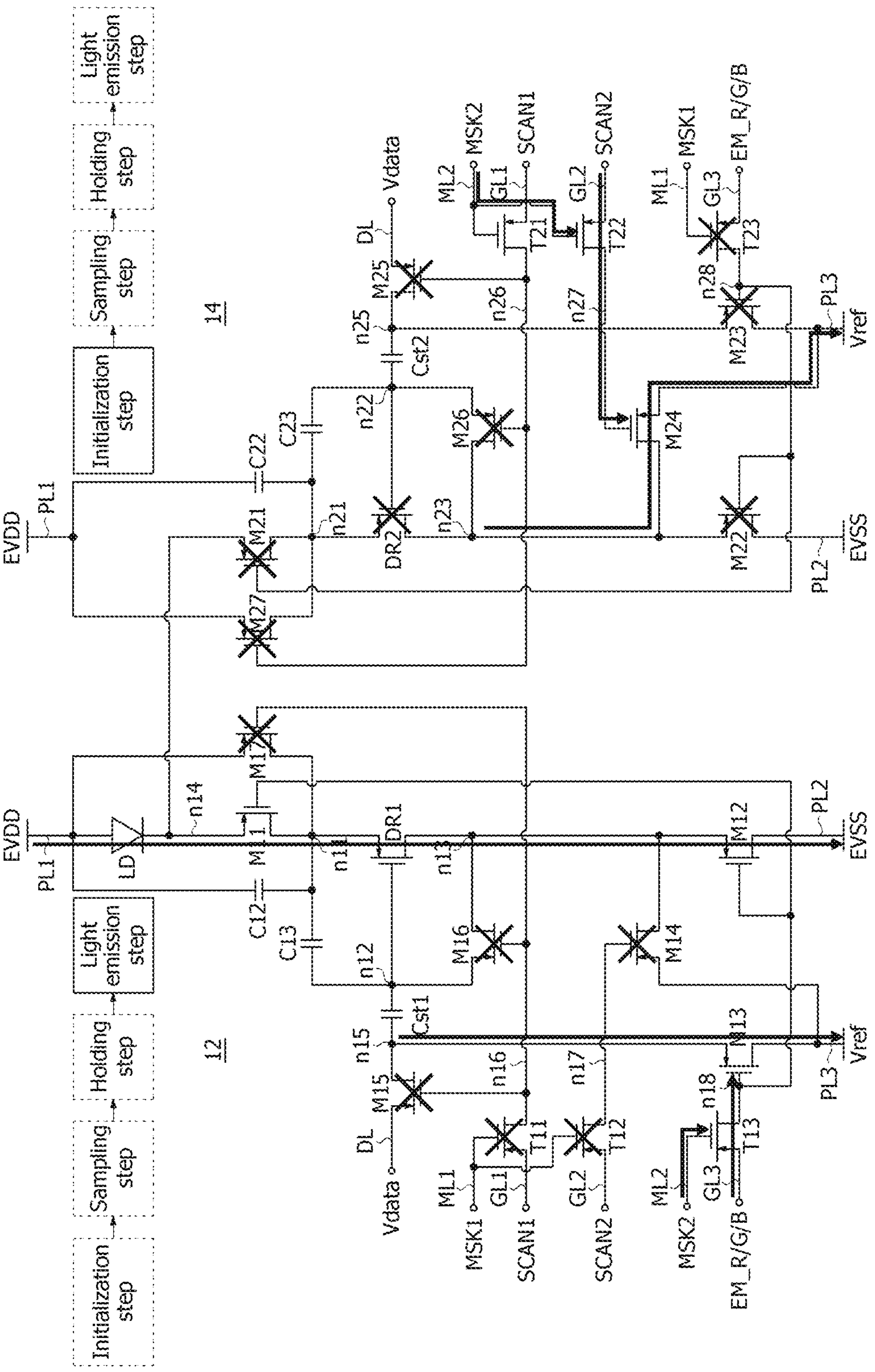
FIGS. 23A and 23B are diagrams illustrating in detail a first initialization step and a light emission step of the pixel circuit shown in FIG. 3 during a second frame period according to an embodiment of the present disclosure.
Figure 23B:
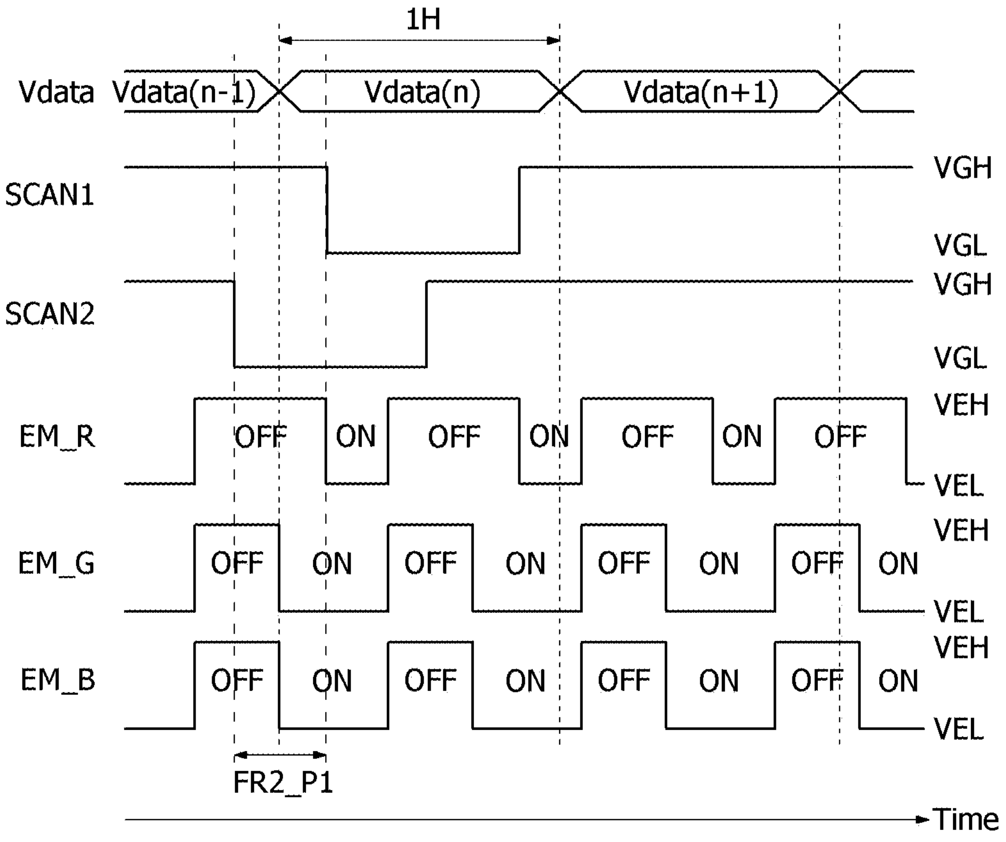

FIGS. 23A and 23B are diagrams illustrating in detail the first initialization step and the light emission step of the pixel circuit 300 shown in FIG. 3 during the second frame period FR2.

Referring to FIGS. 18, 23A, and 23B, the second compensation circuit 14 can perform the first initialization step in a first period of the second frame period FR2_P1. The first compensation circuit 12 can perform the light emission step in the first period of the second frame period FR2_P1. Accordingly, the pixel circuit 300 can simultaneously perform the first initialization step and the light emission step in the first period of the second frame period FR2_P1.

During the first period of the second frame period FR2_P1, the voltage of the second scan signal SCAN2 is the gate-on voltage VGL and the voltage of the first scan signal SCAN1 is the gate-off voltage VGH. The second scan signal SCAN2 can be transmitted to the gate electrode of the first-fourth switch transistor M24 through the second-ninth switch transistor T22 during the second frame period FR2. During the first period of the second frame period FR2_P1, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the first-first, first-second, and first-third switch transistors M11, M12, and M13 through the first-tenth switch transistor T13 during the second frame period FR2.

During the first period of the second frame period FR2_P1, the second-fourth, second-eighth, and second-ninth switch transistors M24, T21, and T22 in the second compensation circuit 14 are in the on-state, while the other switch transistors M21, M22, M23, M25, M26, M27, and T23 are in the off-state. During the first period of the second frame period FR2_P1, the second driving transistor DR2 is in the off-state. During the first period of the second frame period FR2_P1, the voltages of the second-third nodes n23 are initialized to the reference voltage Vref.

During the first period of the second frame period FR2_P1, the first-first, first-second, first-third, and first-tenth switch transistors M11, M12, M13, and T13 in the first compensation circuit 12 are in the on-state, while the other switch transistors M14, M15, M16, M17, T11, and T12 are in the off-state. During the first periods of the second frame period FR2_P1, the first driving transistor DR1 is in the on-state. The first driving transistor DR1 generates a current according to the gate-source voltage Vgs during the first period of the second frame period FR2_P1 to drive the light-emitting element LD. The light-emitting element LD can emit light by the current from the first driving transistor DR1 in the light-on interval (ON) of the color-specific EM signals EM_R, EM_G, and EM_B during the first period of the second frame period FR2_P1. For example, while the second compensation circuit 14 is beginning initialization, the first compensation circuit 12 can control the light-emitting element LD to emit light during the first period of second frame period FR2_P1.

Figure 24A:
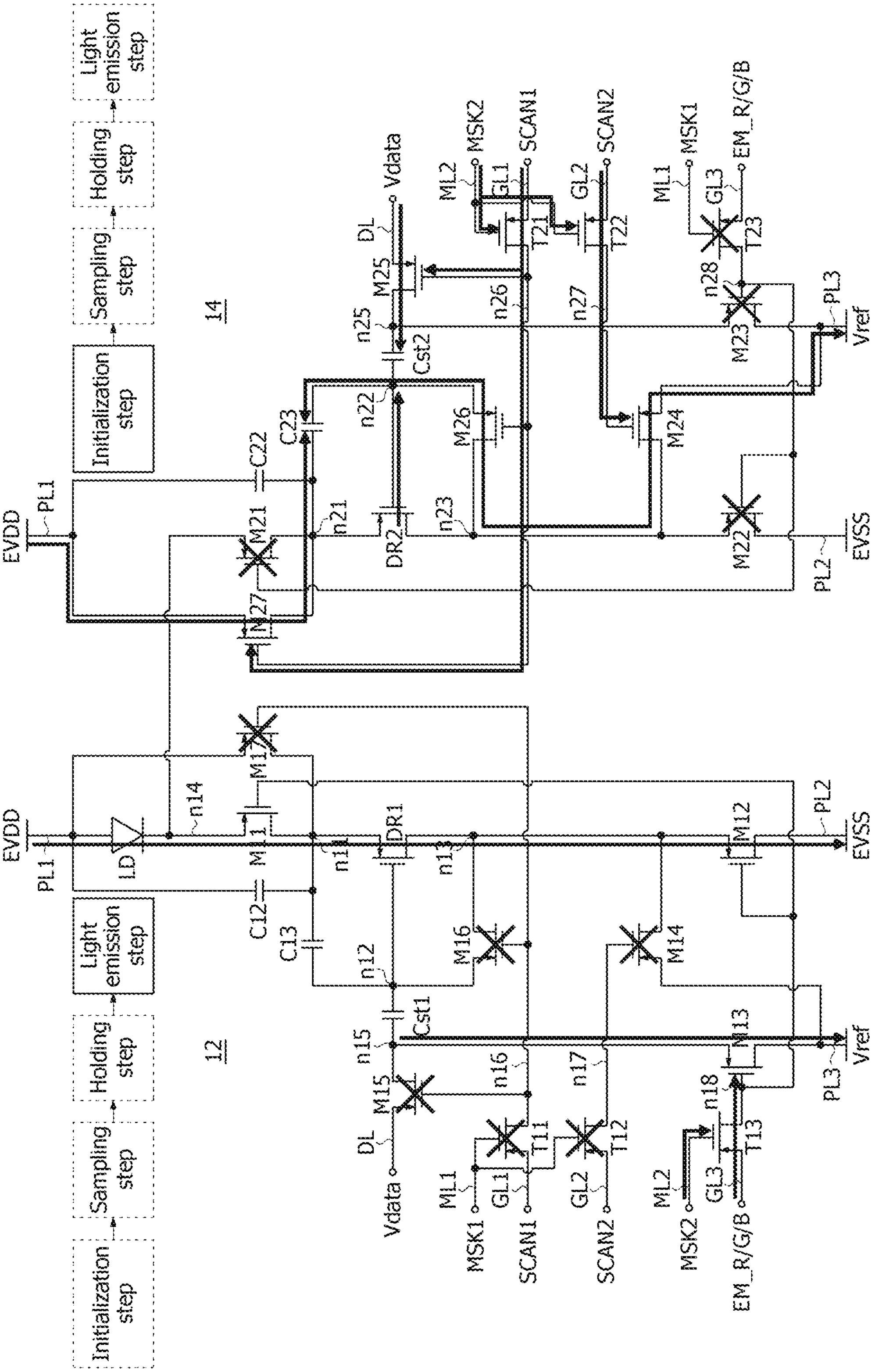
FIGS. 24A and 24B are diagrams illustrating in detail a second initialization step and a light emission step of the pixel circuit shown in FIG. 3 during a second frame period according to an embodiment of the present disclosure.
Figure 24B:
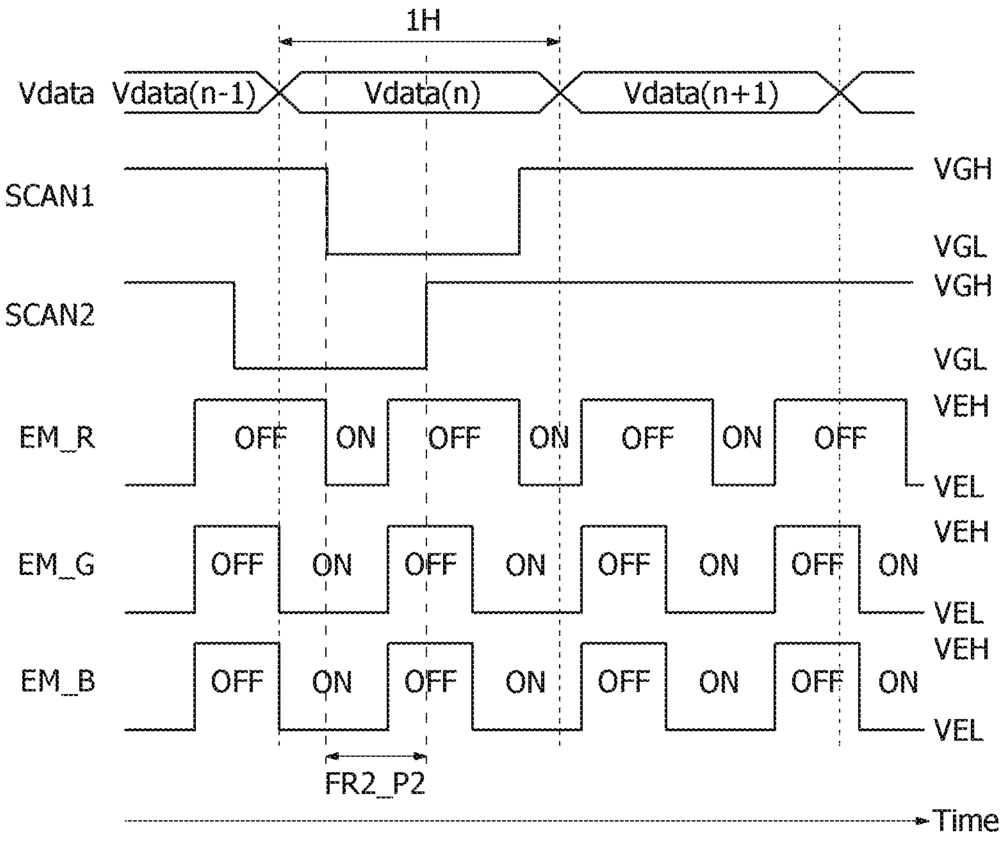

FIGS. 24A and 24B are diagrams detailing the second initialization step and the light emission step of the pixel circuit 300 shown in FIG. 3 during the second frame period FR2.

Referring to FIGS. 18, 24A, and 24B, the second compensation circuit 14 can perform the second initialization step in a second period of the second frame period FR2_P2. The first compensation circuit 12 can perform the light emission step in the second period of the second frame period FR2_P2. Accordingly, the pixel circuit 300 can simultaneously perform the second initialization step and the light emission step in the second period of the second frame period FR2_P2.

During the second period of the second frame period FR2_P2, the voltage of the first scan signal SCAN1 and the second scan signal SCAN2 is the gate-on voltage VGL. The first scan signal SCAN1 can be transmitted to the gate electrodes of the second-fifth, second-sixth, and second-seventh switch transistors M25, M26, and M27 through the second-eighth switch transistor T21 during the second frame period FR2. The second scan signal SCAN2 can be transmitted to the gate electrode of the first-fourth switch transistor M24 through the second-ninth switch transistor T22 during the second frame period FR2. During the second period of the second frame period FR2_P2, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the first-first, first-second, and first-third switch transistors M11, M12, and M13 through the first-tenth switch transistor T13 during the second frame period FR2.

During the second period of the second frame period FR2_P2, the second-fourth, second-fifth, second-sixth, second-seventh, second-eighth, and second-ninth switch transistors M24, M25, M26, M27, T21, and T22 in the second compensation circuit 14 are in the on-state. On the other hand, the second-first, second-second, second-third, and second-tenth switch transistors M21, M22, M23, and T23 are in the off-state. During the second period of the second frame period FR2_P2, the voltage of the second-first node n21 rises to turn on the second driving transistor DR2.

During the second period of the second frame period FR2_P2, the data voltage Vdata(n) is applied to the data line DL. This data voltage Vdata(n) is applied to the second-fifth node n25 through the second-fifth switch transistor M25. During the second period of the second frame period FR2_P2, the reference voltage Vref is applied to the second-second and second-third nodes n22 and n23 through the second-fourth and second-sixth transistors M24 and M26. Accordingly, during the second period of the second frame period FR2_P2, the voltage of the second-second node n22 is initialized to the reference voltage Vref, and the voltage of the second-fifth node n25 is the data voltage Vdata(n).

During the second period of the second frame period FR2_P2, the first-first, first-second, first-third, and first-tenth switch transistors M11, M12, M13, and T13 in the first compensation circuit 12 are in the on-state, while the other switch transistors M14, M15, M16, M17, T11, and T12 are in the off-state. During the second period of the second frame period FR2_P2, the first driving transistor DR1 is in the on-state. The first driving transistor DR1 generates a current according to the gate-source voltage Vgs during the second period of the second frame period FR2_P2 to drive the light-emitting element LD. The light-emitting element LD can emit light by the current from the first driving transistor DR1 in the light-on interval (ON) of the color-specific EM signals EM_R, EM_G, and EM_B during the second period of the second frame period FR2_P2. Thus, while the second compensation circuit 14 is still being initialized, the first compensation circuit 14 can control the light-emitting element LD to emit light during the second period of the second frame period FR2_P2.

Figure 25A:
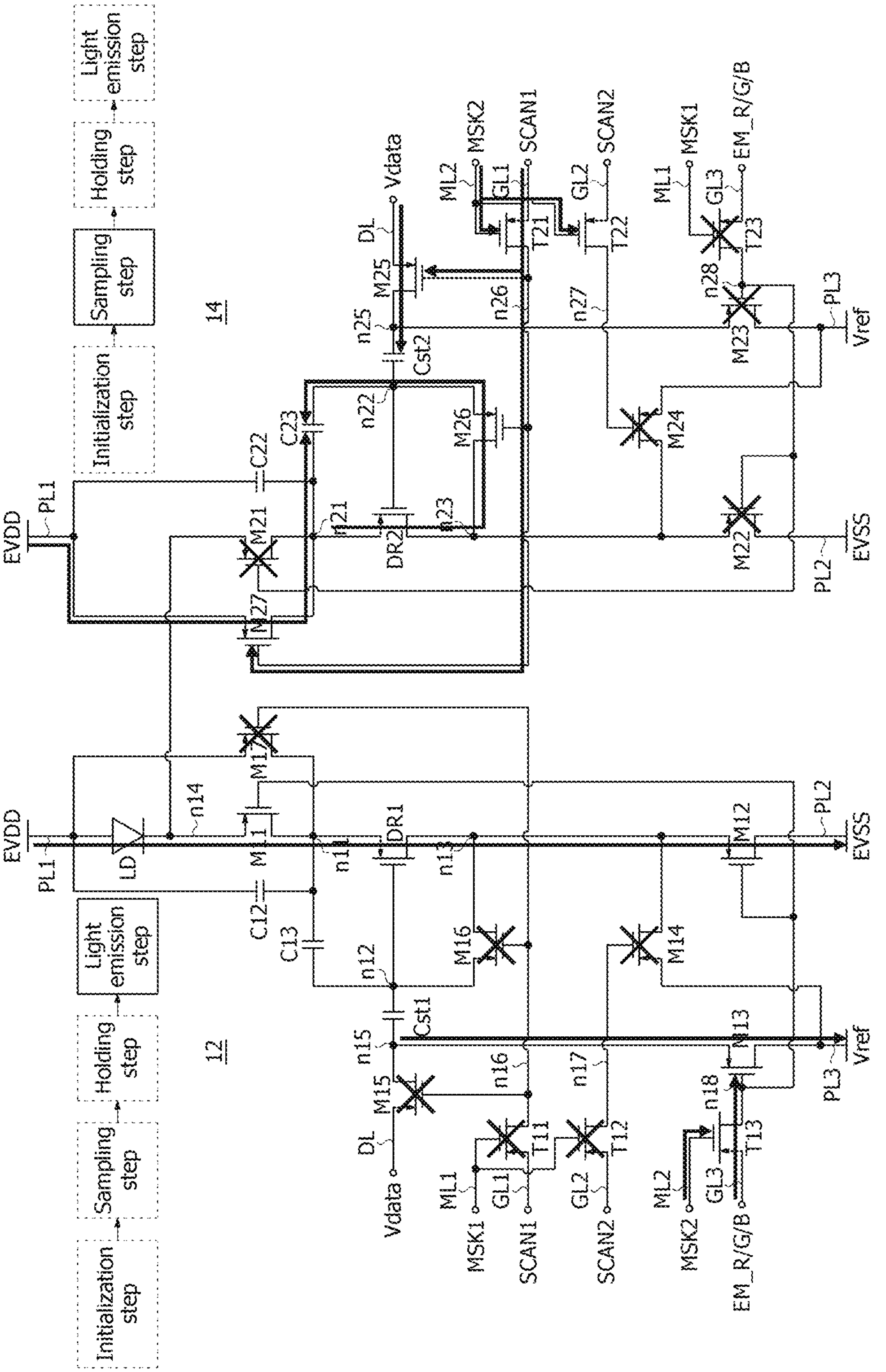
FIGS. 25A and 25B are drawings illustrating in detail a sampling step and a light emission step of the pixel circuit shown in FIG. 3 during a second frame period according to an embodiment of the present disclosure.
Figure 25B:
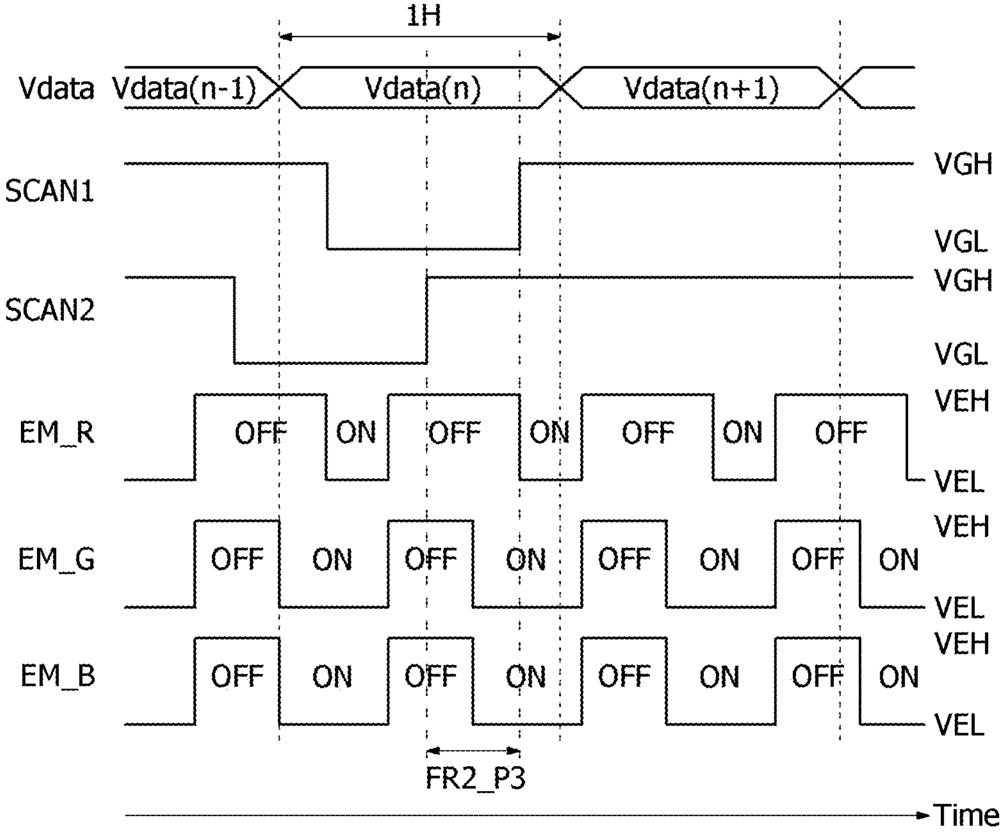

FIGS. 25A and 25B are drawings illustrating in detail the sampling step and the light emission step of the pixel circuit 300 shown in FIG. 3 during the second frame period FR2.

Referring to FIGS. 18, 25A, and 25B, the second compensation circuit 14 can perform the sampling step in the third period of the second frame period FR2_P3. The first compensation circuit 12 can perform the light emission step in the third period of the second frame period FR2_P3. Accordingly, the pixel circuit 300 can simultaneously perform the sampling step and the light emission step in the third period of the second frame period FR2_P3.

During the third period of the second frame period FR2_P3, the voltage of the first scan signal SCAN1 is the gate-on voltage VGL and the voltage of the second scan signal SCAN2 is the gate-off voltage VGH. The first scan signal SCAN1 can be transmitted to the gate electrodes of the second-fifth, second-sixth, and second-seventh switch transistors M25, M26, and M27 through the second-eighth switch transistor T21 during the second frame period FR2. During the third period of the second frame period FR2_P3, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the first-first, first-second, and first-third switch transistors M11, M12, and M13 through the first-tenth switch transistor T13 during the second frame period FR2.

During the third period of the second frame period FR2_P3, the second-fifth, second-sixth, second-seventh, second-eighth, and second-ninth switch transistors M25, M26, M27, T21, and T22 in the second compensation circuit 14 are in the on-state. On the other hand, the second-first, second-second, second-third, second-fourth, and second-tenth switch transistors M21, M22, M23, M24, and T23 are in the off-state. During the third period of the second frame period FR2_P3, the data voltage Vdata(n) is applied to the data line DL. During the third period of the second frame period FR2_P3, the voltage of first-second node n12 rises to a voltage EVDD+Vth. Here, 'Vth' represents the threshold voltage of the second driving transistor DR2. The second driving transistor DR2 is turned off when the gate-source voltage Vgs becomes less than the threshold voltage. During the third period of the second frame period FR2_P3, the voltage of second-fifth node n25 is the data voltage Vdata (n). The second-first capacitor Cst2 is charged with a difference voltage between the voltage of the second-fifth node n25 and the voltage of the second-second node n22.

During the third period of the second frame period FR2_P3, the first-first, first-second, first-third, and first-tenth switch transistors M11, M12, M13, and T13 in the first compensation circuit 12 are in the on-state, while the other switch transistors M14, M15, M16, M17, T11, and T12 are in the off-state. During the third period of the second frame period FR2_P3, the first driving transistor DR1 is in the on-state. The first driving transistor DR1 generates a current according to the gate-source voltage Vgs during the third period of the second frame period FR2_P3 to drive the light-emitting element LD. The light-emitting element LD can emit light by the current from the first driving transistor DR1 in the light-on interval (ON) of the color-specific EM signals EM_R, EM_G, and EM_B during the third period of the second frame period FR2_P3. For example, while the second compensation circuit 14 is being sampled, the first compensation circuit 12 can control the light-emitting element LD to emit light during the third period of the second frame period FR2_P3.

Figure 26A:
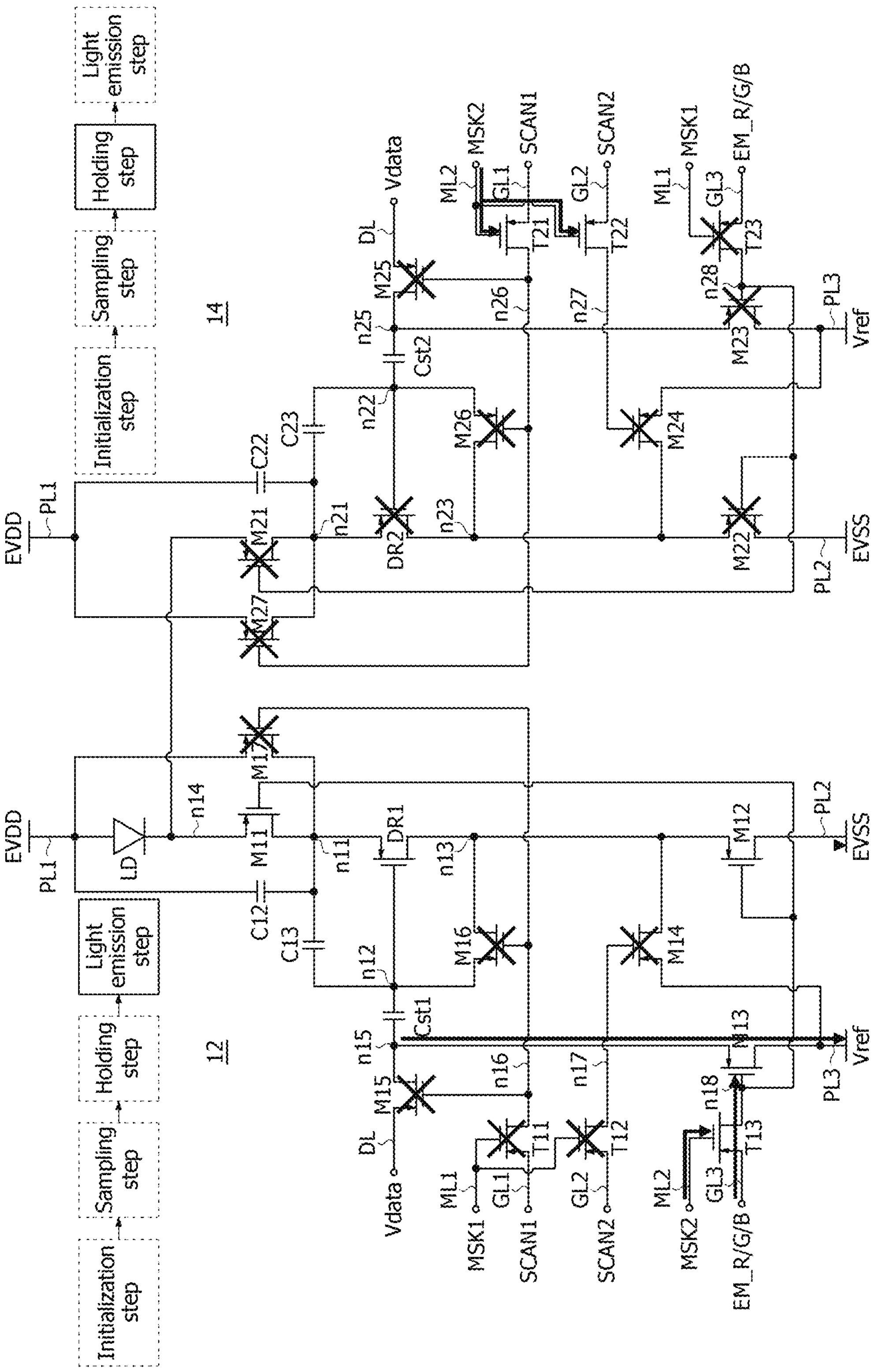
FIGS. 26A and 26B are diagrams illustrating in detail a holding step and a light emission step of the pixel circuit shown in FIG. 3 during a second frame period according to an embodiment of the present disclosure.
Figure 26B:
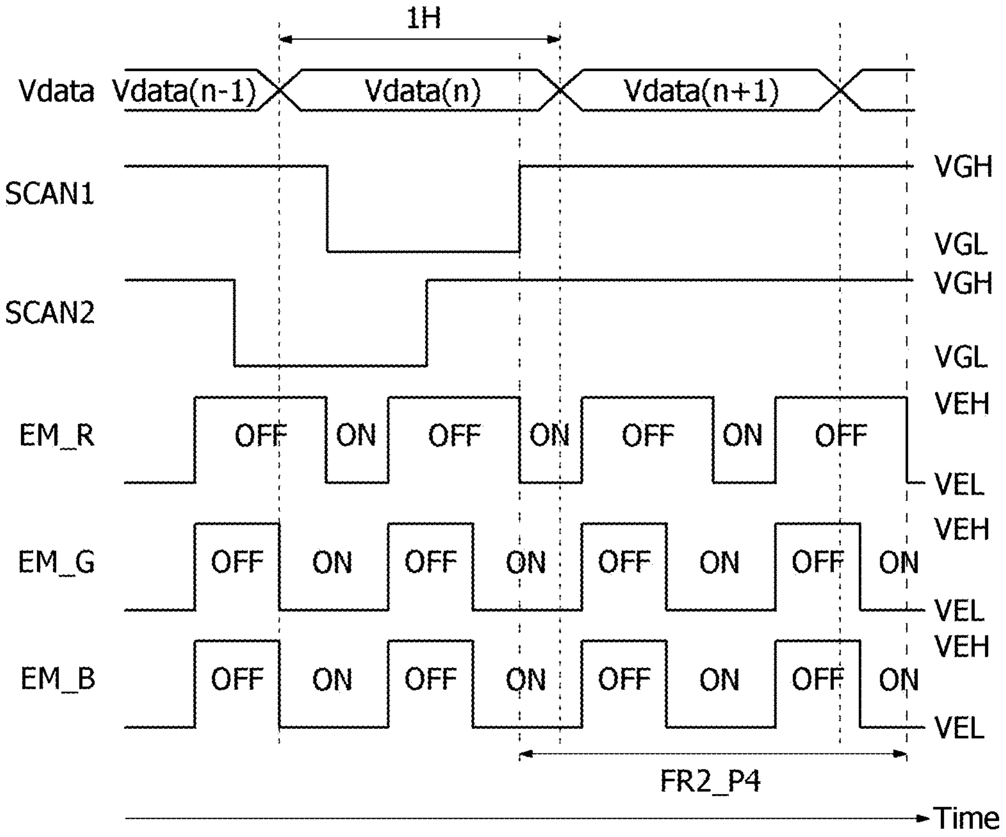

FIGS. 26A and 26B are drawings illustrating in detail the holding step and the light emission step of the pixel circuit 300 shown in FIG. 3 during the second frame period FR2.

Referring to FIGS. 18, 26A, and 26B, the second compensation circuit 14 can perform the holding step in the fourth period of the second frame period FR2_P4. The first compensation circuit 12 can perform the light emission step in the fourth period of the second frame period FR2_P4. Accordingly, the pixel circuit 300 can simultaneously perform the holding step and the light emission step in the fourth period FR2_P4 of the second frame period.

During the fourth period of the second frame period FR2_P4, the voltage of the first and second scan signals SCAN1 and SCAN2 is the gate-off voltage VGH. During the fourth period of the second frame period FR2_P4, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the first-first, first-second, and first-third switch transistors M11, M12, and M13 through the first-tenth switch transistor T13 during the second frame period FR2.

During the fourth period of the second frame period FR2_P4, the second-eighth and second-ninth switch transistors T21 and T22 in the second compensation circuit 14 are in the on-state. On the other hand, the other switch transistors M21 to M27, and T23 are in the off-state. During the fourth period of the second frame period FR2_P4, a data voltage of a following pixel line Vdata(n+1) can be applied to the data line DL. Since the second-first to the second-seventh switch transistors M21 to M27 are in the off-state, the second-first to the second-fourth nodes n21 to n24 are floated, and thus the voltage across the second-first capacitor Cst2 remains at its previous state.

During the fourth period of the second frame period FR2_P4, the first-first, first-second, first-third, and first-tenth switch transistors M11, M12, M13, and T13 in the first compensation circuit 12 are in the on-state, while the other switch transistors M14, M15, M16, M17, T11, and T12 are in the off-state. During the fourth period of the second frame period FR2_P4, the first driving transistor DR1 is in the on-state. The first driving transistor DR1 generates a current according to the gate-source voltage Vgs during the fourth period of the second frame period FR2_P4 to drive the light-emitting element LD. The light-emitting element LD can emit light by the current from the first driving transistor DR1 in the light-on interval (ON) of the color-specific EM signals EM_R, EM_G, and EM_B during the fourth period of the second frame period FR2_P4. For example, while the second compensation circuit 14 is finishing up with the holding step, the first compensation circuit 12 can control the light-emitting element LD to emit light during the fourth period of the second frame period FR2_P4. In this way, the first compensation circuit 12 and second compensation circuit 14 and a finer granularity of control can be provided for the duty cycle for each color sub-pixels, and sub-pixels having different colors can be controlled to have different duty cycles.

Figure 27:
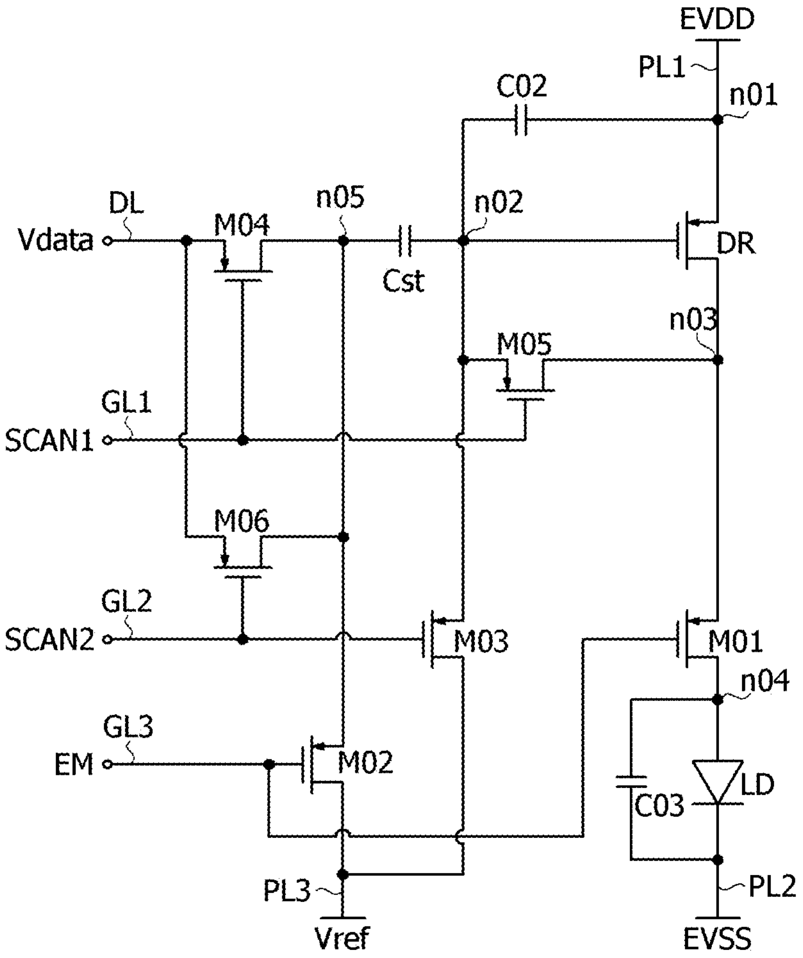
FIG. 27 is a circuit diagram illustrating an example that is applicable to the pixel circuit illustrated in FIG. 5 according to an embodiment of the present disclosure.

FIG. 27 is a circuit diagram illustrating an example that is applicable to the pixel circuit 500 shown in FIG. 5. The pixel circuit shown in FIG. 27 is applicable to the compensation circuits 22 and 24 shown in FIG. 5. In this pixel circuit, the switch elements that switches the mask signal are omitted.

Referring to FIG. 27, the pixel circuit includes a driving element DR that drives a light-emitting element LD, a plurality of switch transistors M0 to M06, and a capacitor Cst. The pixel circuit can further include second and third capacitors C02 and C03. The transistors DR and M01 to M06 in the pixel circuit can be p-channel transistors, but are not limited thereto.

An anode electrode of the light-emitting element LD can be connected to a fourth node n04. A cathode electrode of the light-emitting element LD can be connected to a second power line PL2 to which the ground voltage EVSS is applied.

The driving transistor DR can include a first electrode connected to a first node n01, a gate electrode connected to a second node n02, and a second electrode connected to a third node n03. A first power line PL1 to which the pixel driving voltage EVDD is applied can be connected to the first node n01. The driving transistor DR corresponds to the driving transistors DR1 and DR2 shown in FIG. 5. The first capacitor C1 can be connected between the second node n02 and a fifth node n05.

First and second switch transistors M01 and M02 is turned on in response to the gate-on voltage VEL of the EM signal EM and turned off in response to the gate-off voltage VEH of the EM signal EM. When the first switch element M01 is turned on, the third node n03 can be electrically connected to the fourth node n04. When the second switch transistor M02 is turned on, the fifth node n05 can be electrically connected to a third power line PL3 to which the reference voltage Vref is applied.

The first switch transistor M01 includes a first electrode connected to the third node n03, a gate electrode connected to a third gate line GL3 to which the EM signal EM is applied, and a second electrode connected to the fourth node n04. The first switch transistor M01 corresponds to the first and second EM switch transistors SW1 and SW2 shown in FIG. 5. The second switch transistor M02 includes a first electrode connected to the fifth node n05, a gate electrode connected to the third gate line GL3, and a second electrode connected to the third power line PL3.

The third and sixth switch transistors M03 and M06 are each turned on in response to the gate-on voltage VGL of the second scan signal SCAN2 and turned off in response to the gate-off voltage VGH of the second scan signal SCAN2. When the third switch transistor M03 is turned on, the second node n02 can be electrically connected to the third power line PL3 to which the reference voltage Vref is applied. When the sixth switch transistor M06 is turned on, the data line DL to which the data voltage Vdata is applied can be electrically connected to the fifth node n05.

The third switch transistor M03 includes a first electrode connected to the second node n02, a gate electrode connected to a second gate line GL2 to which the second scan signal SCAN2 is applied, and a second electrode connected to the third power line PL3. The sixth switch transistor M06 includes a first electrode connected to the data line DL, a gate electrode connected to the second gate line GL2, and a second electrode connected to the fifth node n05.

The fourth and fifth switch transistors M04 and M05 are each turned on in response to the gate-on voltage VGL of the first scan signal SCAN1 and turned off in response to the gate-off voltage VGH of the first scan signal SCAN1. When the fourth switch transistor M04 is turned on, the data line DL to which the data voltage Vdata is applied can be electrically connected to the fifth node n05. When the fifth switch transistor M05 is turned on, the second node n02 can be electrically connected to the third node n03.

The fourth switch transistor M04 includes a first electrode connected to the data line DL, a gate electrode connected to a first gate line GL1 to which the first scan signal SCAN1 is applied, and a second electrode connected to the fifth node n05. The fifth switch transistor M05 includes a first electrode connected to the second node n02, a gate electrode connected to the first gate line GL1, and a second electrode connected to the third node n03.

The second capacitor C02 can be connected between the first power line PL1 and the second node n02. The third capacitor C03 can be connected between the fourth node n04 and the second power line PL2.

Figure 28A:
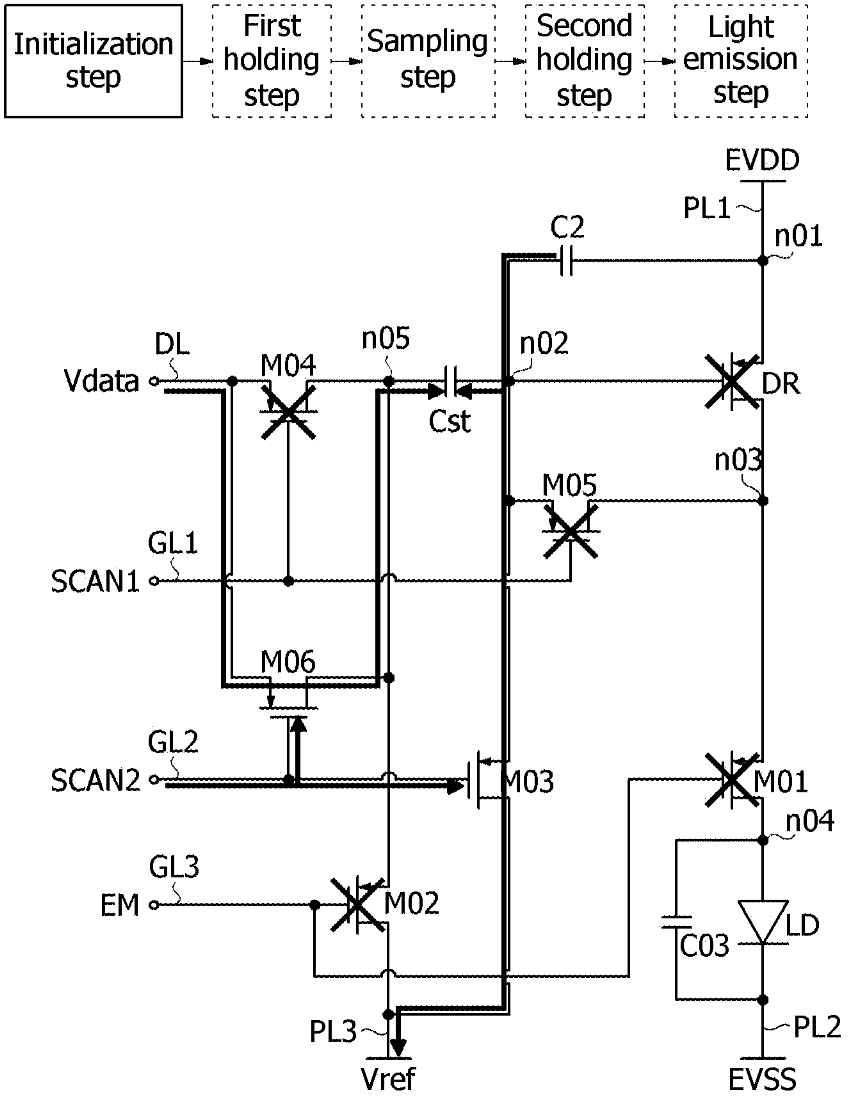
FIGS. 28A and 28B are diagrams illustrating an initialization step of the pixel circuit shown in FIG. 27 according to an embodiment of the present disclosure.
Figure 28B:
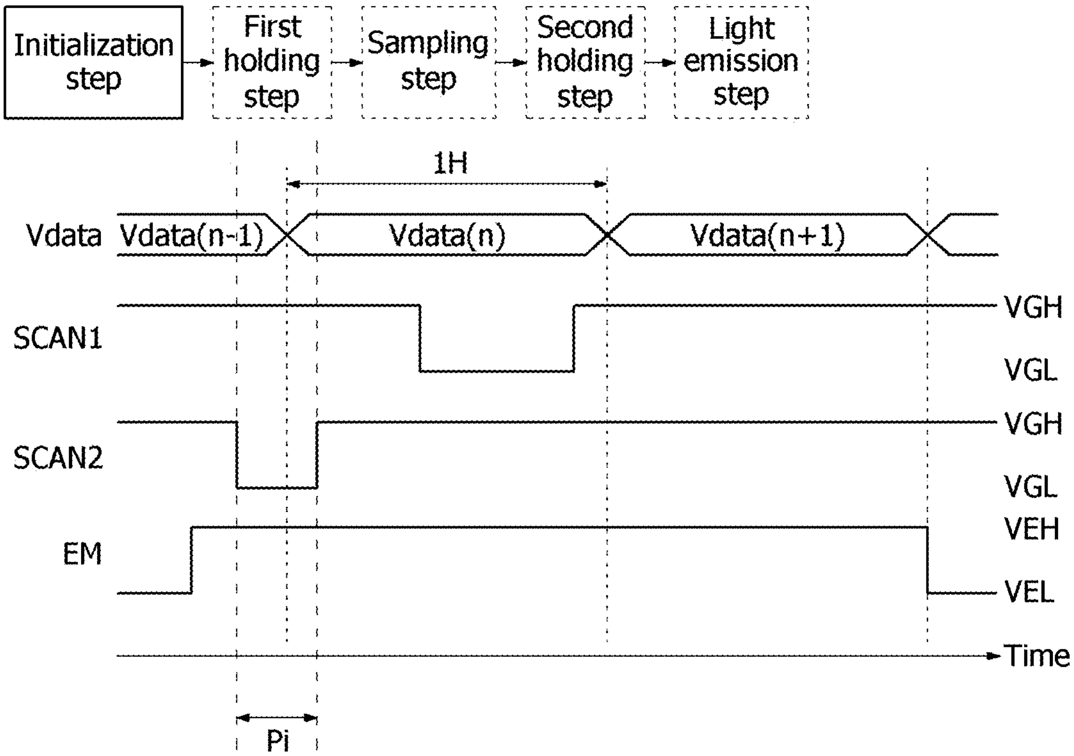

The pixel circuit shown in FIG. 27 can be driven in the initialization step, the first holding step, the sampling step, the second holding step, and the light emission step, as shown in FIG. 6. The operation of this pixel circuit will be described with reference to FIGS. 28A to 32B together, assuming that the sub-pixels are disposed in an (n)th pixel line (where n is a natural number). In FIGS. 28A to 28B, "1H" represents one horizontal period.

FIGS. 28A and 28B are diagrams illustrating the initialization step of the pixel circuit shown in FIG. 27.

Referring to FIG. 28A and FIG. 28B, the initialization step is performed during a first period Pi. During the first period Pi, the voltage of the second scan signal SCAN2 can be the gate-on voltage VGL, and the voltages of the first scan signal SCAN1 and the EM signal EM can be the gate-off voltage VGH, VEH. Accordingly, during the first period Pi, the third and sixth switch transistors M03 and M06 are turned on, while the other switch transistors M01, M02, M04, and M05 are in the off-state. During the first period Pi, the driving transistor DR is in the off-state.

During the first period Pi, the voltage of the second node n02 is initialized to the reference voltage Vref, and the voltage of the fifth node n05 is initialized to the data voltage Vdata(n−1) of a preceding pixel line.

Figure 29A:
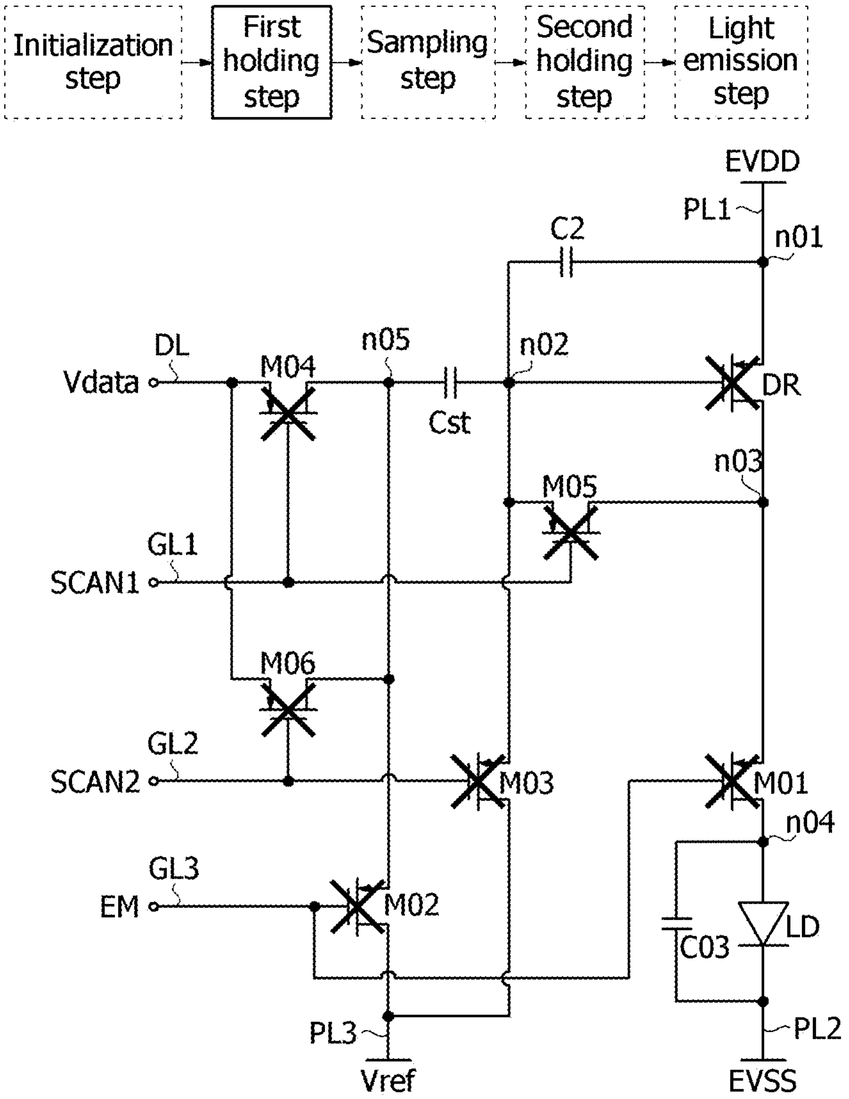
FIGS. 29A and 29B are diagrams illustrating a first holding step of the pixel circuit shown in FIG. 27 according to an embodiment of the present disclosure.
Figure 29B:
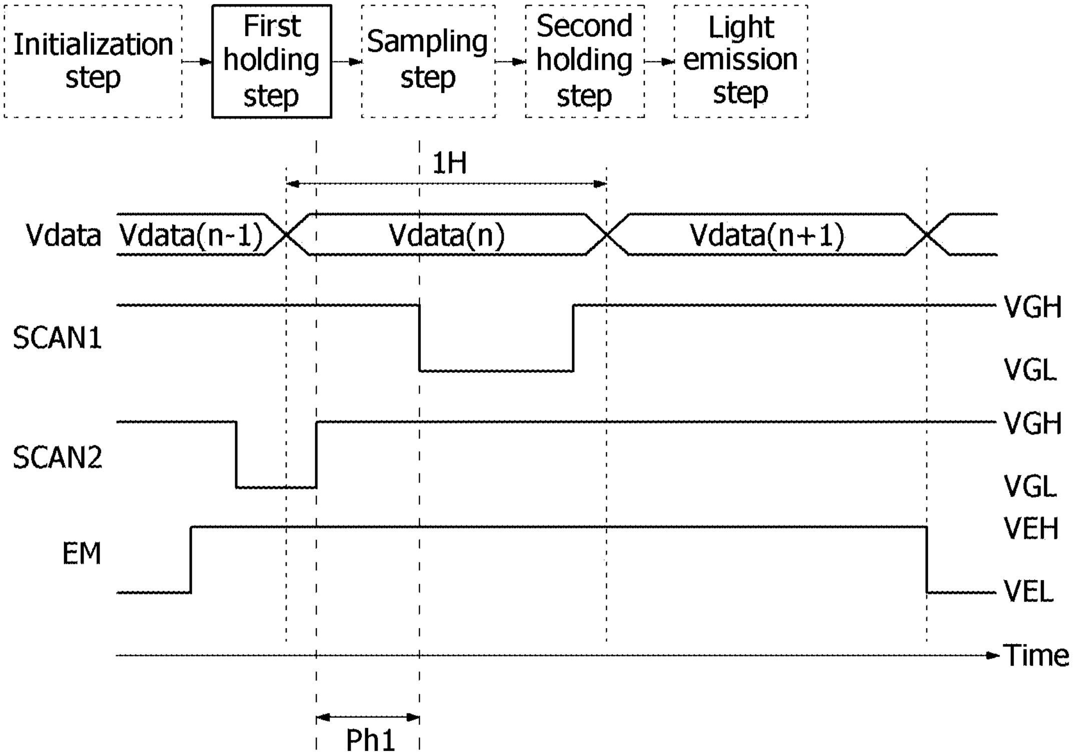

FIGS. 29A and 29B are diagrams illustrating the first holding step of the pixel circuit shown in FIG. 27.

Referring to FIGS. 29A and 29B, the first holding step is performed during a second period Ph1. During the second period Ph1 the voltage of the first scan signal SCAN1, the second scan signal SCAN2, and the EM signal EM can be the gate-off voltage VGH, VEH. Accordingly, during the second period Ph1, since the first to sixth switch transistors M01 to M06 are in the off-state, the second to fifth nodes n02 to n05 are floated, and thus the voltage across the first capacitor Cst remains at its previous state. The driving transistor DR is in the off-state during the second period Ph1.

Figure 30A:
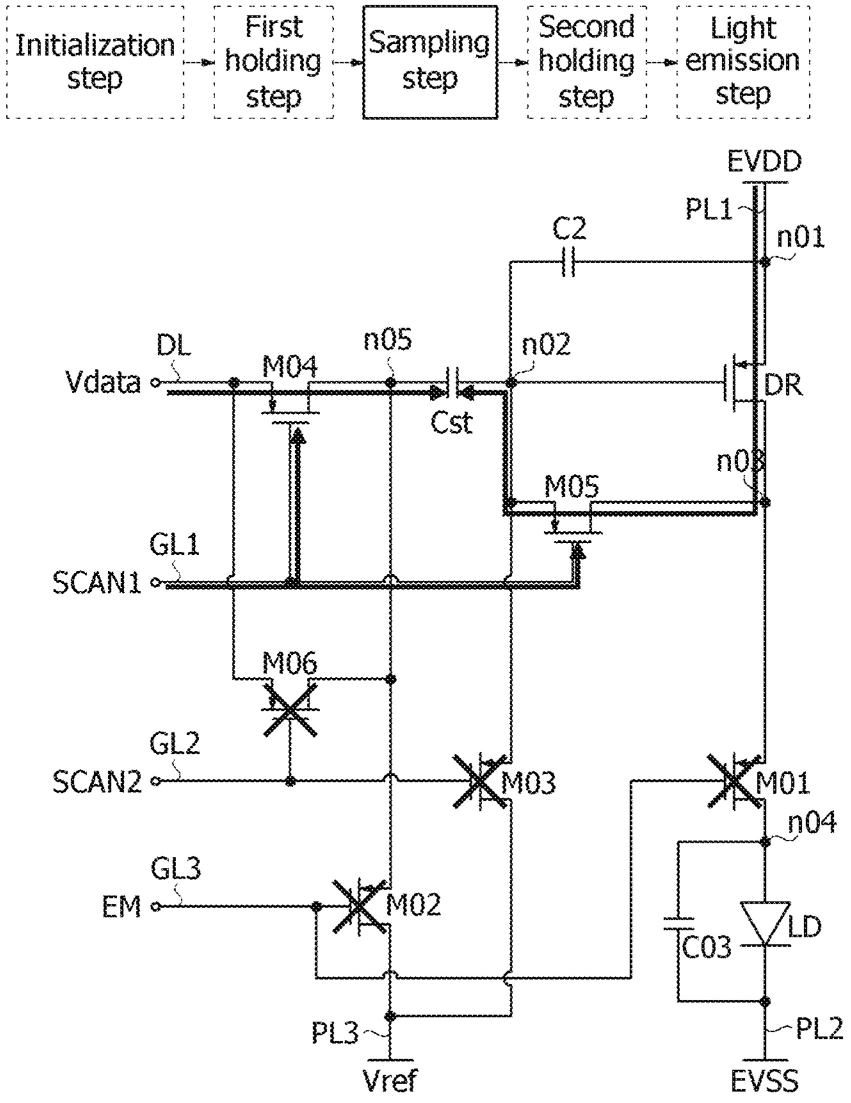
FIGS. 30A and 30B are diagrams illustrating a sampling step of the pixel circuit shown in FIG. 27 according to an embodiment of the present disclosure.
Figure 30B:
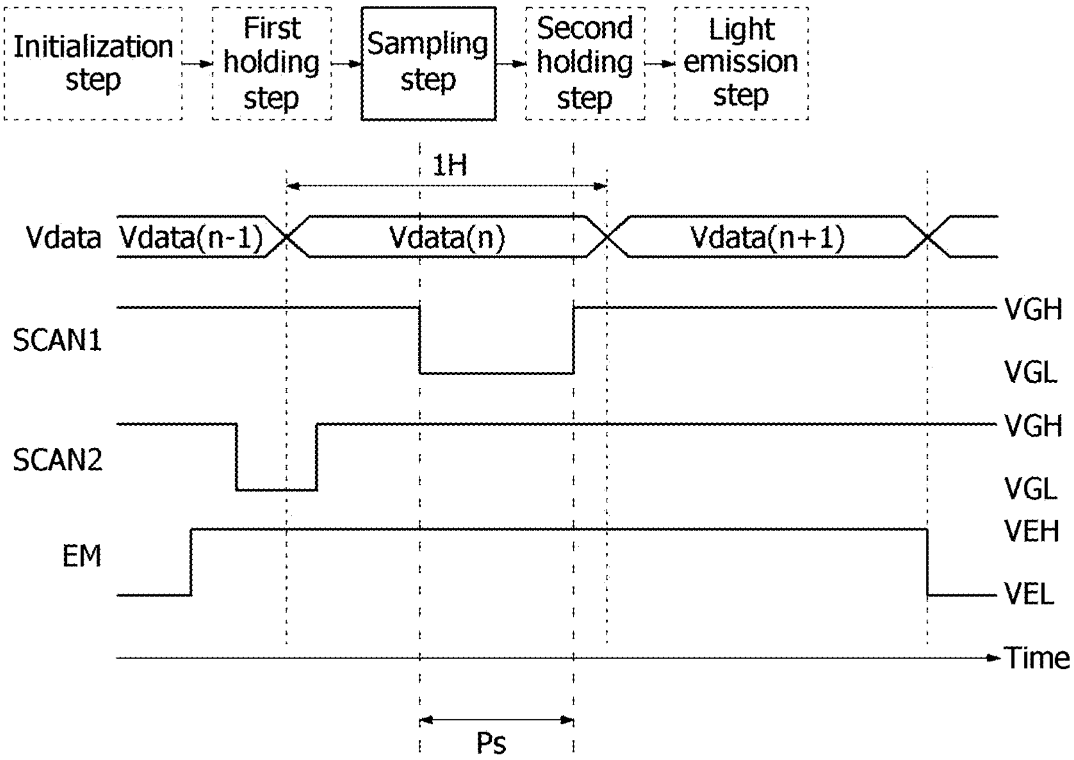

FIGS. 30A and 30B are drawings illustrating the sampling step of the pixel circuit shown in FIG. 27.

Referring to FIGS. 30A and 30B, the sampling step is performed during a third period Ps. During the third period Ps, the voltage of the first scan signal SCAN1 can be the gate-on voltage VGL, and the voltage of the second scan signal SCAN2 and the EM signal EM can be the gate-off voltage VGH, VEH. Accordingly, during the third period Ps, the fourth and fifth switch transistors M04 and M05 can be in the turned-on-state. During the third period Ps, the first, second, third, and sixth switch transistors M01, M02, M03, and M06 are in the off-state. During the third period Ps, the data voltage Vdata(n) is applied to the fifth node n05, and the voltage of the second node n02 rises to a voltage EVDD+Vth. Here, 'Vth' represents the threshold voltage of the driving element DR. The first capacitor Cst is charged with a difference voltage between the voltage of the fifth node n05 and the voltage of the second node n02.

Figure 31A:
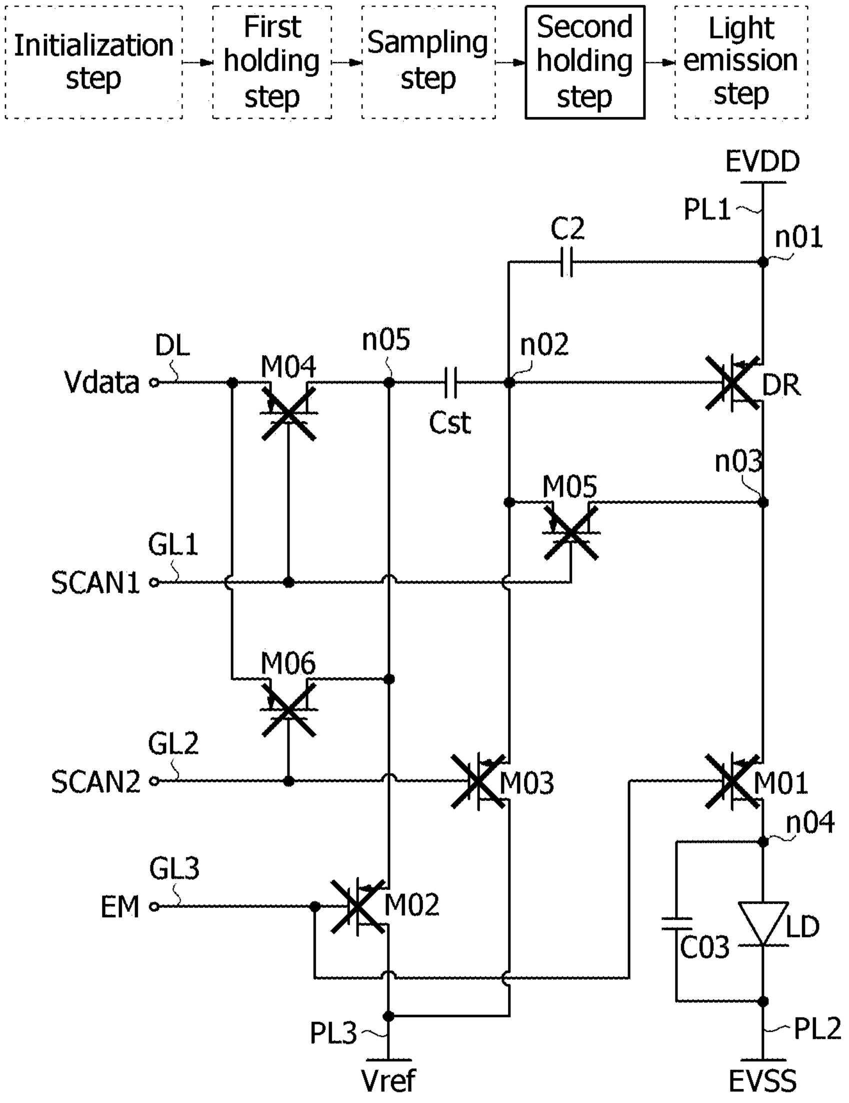
FIGS. 31A and 31B are diagrams illustrating a second holding step of the pixel circuit shown in FIG. 27 according to an embodiment of the present disclosure.
Figure 31B:
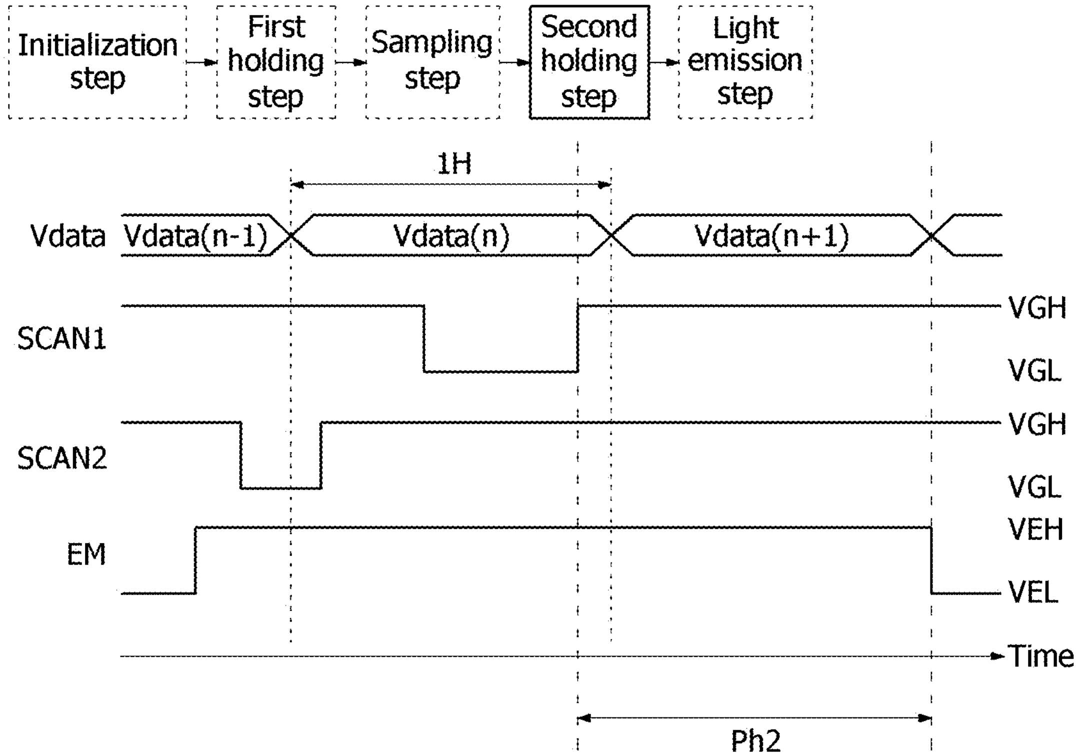

FIGS. 31A and 31B are diagrams illustrating the second holding step of the pixel circuit shown in FIG. 27.

Referring to FIGS. 31A and 31B, the second holding step is performed during a fourth period Ph2. During the fourth period Ph2, the voltage of the first scan signal SCAN1, the second scan signal SCAN2, and the EM signal Em can be the gate-off voltage VGH, VEH. Accordingly, during the fourth period Ph2, since the first to sixth switch transistors M01 to M06 are in the off-state, the second to fifth nodes n02 to n05 are floated, and therefore the voltage across the first capacitor Cst remains at its previous state. The driving transistor DR is in the off-state during the fourth period Ph2.

Figure 32A:
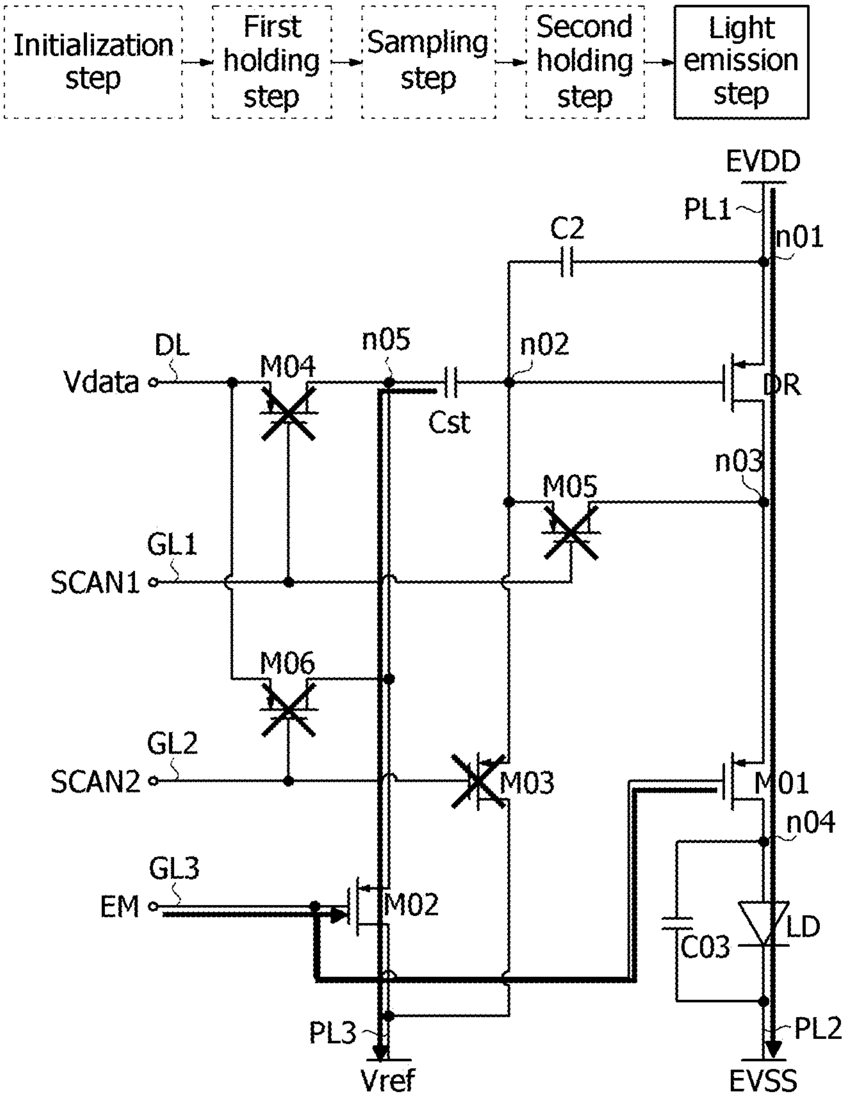
FIGS. 32A and 32B are diagrams illustrating a light emission step of the pixel circuit shown in FIG. 27 according to an embodiment of the present disclosure.
Figure 32B:
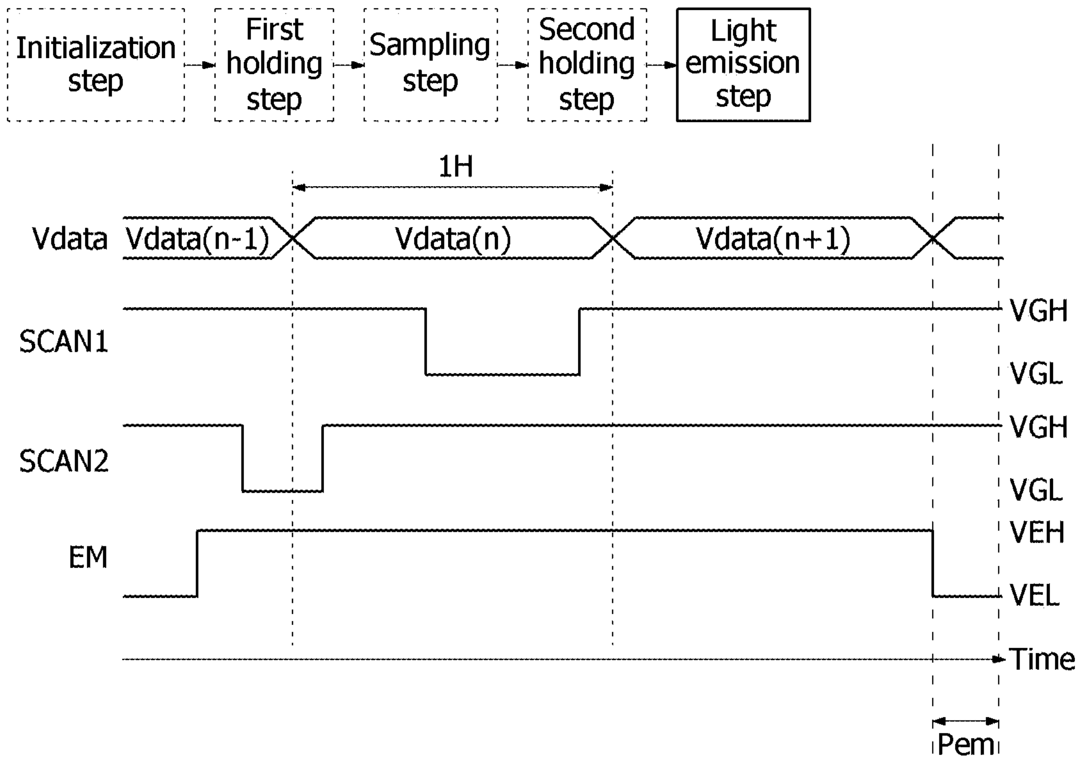

FIGS. 32A and 32B are drawings illustrating the light emission step of the pixel circuit shown in FIG. 27.

Referring to FIGS. 32A and 32B, the light emission step is performed during a fifth period Pem. During the fifth period Pem, the voltage of the EM signal EM can be the gate-on voltage VEL and the voltage of the first scan signal SCAN1 and the second scan signal SCAN2 can be the gate-off voltage VGH. During the fifth period Pem, the first and second switch transistors M01 and M02 are turned on, while the other switch transistors M03, M04, M05, and M06 are in the off-state.

During the fifth period Pem, the reference voltage Vref is applied to the fifth node n05. During the fifth period Pem, the driving transistor DR generates current according to the gate-source voltage Vgs to drive the light-emitting element LD. The light-emitting element LD is emitted by the current ILD from the driving transistor DR during the fifth period Pem. The light-emitting element LD can be driven without being affected by the change in the threshold voltage Vth by compensating the threshold voltage Vth of the driving transistor DR in the light emission step, and without being affected by the RC delay or IR drop of the pixel driving voltage EVDD.

Figure 33A:
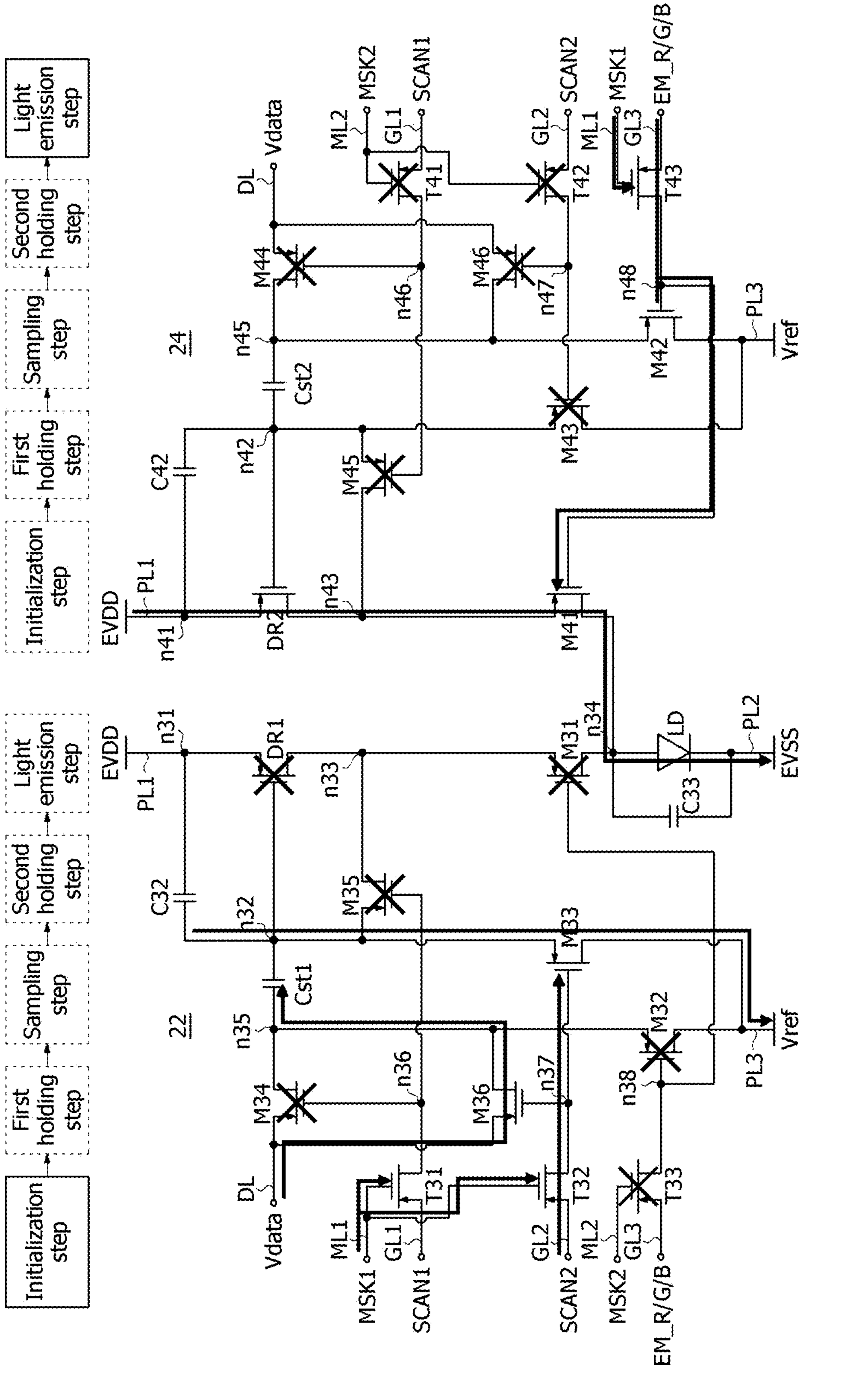
FIGS. 33A and 33B are diagrams illustrating in detail an initialization step and a light emission step of the pixel circuit shown in FIG. 5 during a first frame period according to an embodiment of the present disclosure.
Figure 33B:
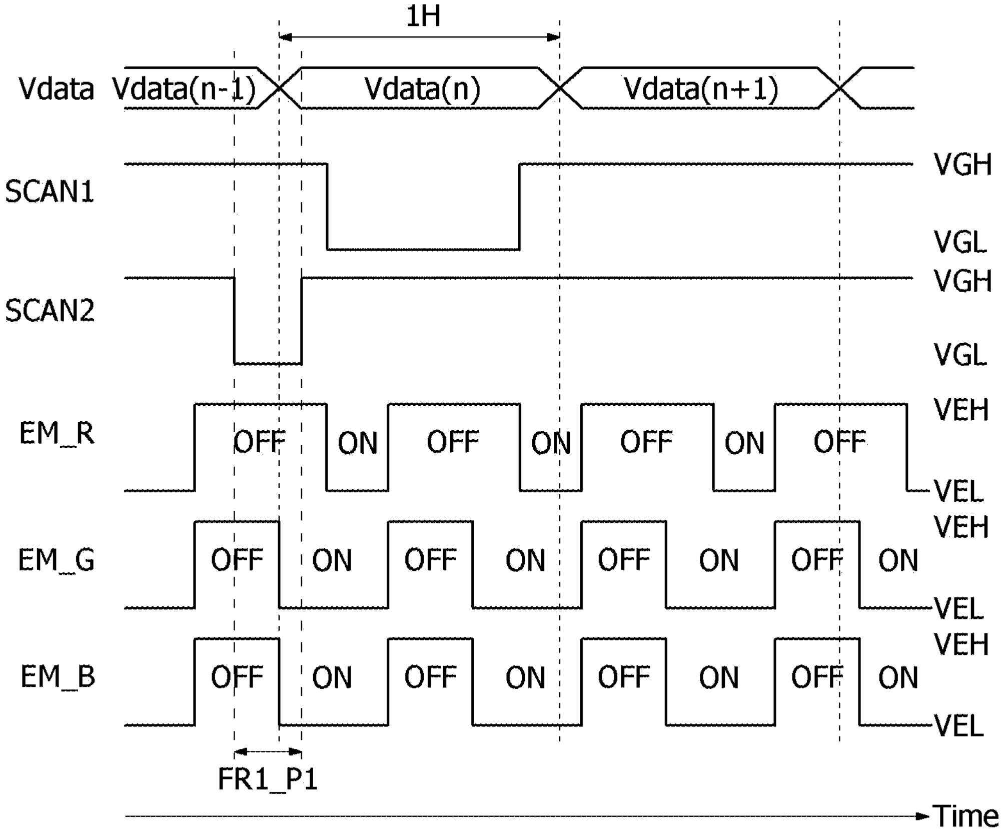

FIGS. 33A to 33B are diagrams illustrating the operation of the pixel circuit 500 shown in FIG. 5 in detail during the first frame period FR1. FIGS. 37A to 40B are diagrams illustrating the operation of the pixel circuit 500 shown in FIG. 5 in detail during the second frame period FR2. In these embodiments, first and second compensation circuits 22 and 24 are examples implemented based on the pixel circuit shown in FIG. 27, but are not limited thereto. In these embodiments, redundant descriptions will be omitted for the components that are substantially the same as the pixel circuit described and illustrated in FIG. 27.

Referring to FIG. 33A, the pixel circuit 500 includes a light-emitting element LD, a first driving transistor DR1, a second driving transistor DR2, a first-first switch transistor M31, a second-first switch transistor M41, the first compensation circuit 22, and the second compensation circuit 24.

An anode electrode of the light-emitting element LD can be connected to a first-fourth node n34. A cathode electrode of the light-emitting element LD can be connected to a second power line PL2 to which the ground voltage EVSS is applied.

The first driving transistor DR1 can include a first electrode connected to a first-first node n31, a gate electrode connected a first-second node n32, and a second electrode connected to a first-third node n33. The second driving element DR2 can include a first electrode connected to a second-first node n41, a gate electrode connected to a second-second node n42, and a second electrode connected to a second-third node n43. A first power line PL1 to which the pixel driving voltage EVDD is applied can be connected to the first-first node n31 and the second-first node n41.

The first-first switch transistor M31 corresponds to the first EM switch transistors SW1 shown in FIG. 5. The first-first switch transistor M31 is connected to the first compensation circuit 22. The second-first switch transistor M41 corresponds to the second EM switch transistors SW2 shown in FIG. 5. The second-first switch transistor M41 is connected to the second compensation circuit 24.

The first compensation circuit 22 can include a plurality of switch transistors M32 to M36 and T31 to T33, and a first-first capacitor Cst1. The first compensation circuit 22 can further include first-second and first-third capacitors C32 and C33.

First-first to first-sixth switch transistors M31 to M36 correspond to the first to sixth switch transistors M01 to M06 shown in FIG. 27, respectively. The first-first capacitor Cst1 can be connected between the first-second node n32 and a first-fifth node n35.

The first-second capacitor C32 can be connected between the first power line PL1 and the first-first node n32. The first-third capacitor C33 can be connected between the first-fourth node n34 and the second power line PL2.

Each of the first-first and the first-second switch transistors M31 and M32 is turned on in response to the gate-on voltage VEL of the color-specific EM signals EM_R, EM_G, and EM_B and turned off in response to the gate-off voltage VEH of the color-specific EM signals EM_R, EM_G, and EM_B. The first-first switch transistor M31 includes a first electrode connected to the first-third node n33, a gate electrode connected to a first-eighth node n38 to which the color-specific EM signals EM_R, EM_G, and EM_B are applied, and a second electrode connected to the first-fourth node n34. The first-second switch transistor M32 includes a first electrode connected to the first-fifth node n35, a gate electrode connected to the first-eighth node n38, and a second electrode connected to a third power line PL3 to which the reference voltage Vref is applied.

The first-third and first-sixth switch transistors M33 and M36 are each turned on in response to the gate-on voltage VGL of the second scan signal SCAN2 and turned off in response to the gate-off voltage VGH of the second scan signal SCAN2. The first-third switch transistor M33 includes a first electrode connected to the first-second node n32, a gate electrode connected to a first-seventh node n37 to which the second scan signal SCAN2 is applied, and a second electrode connected to the third power line PL3. The first-sixth switch transistor M36 includes a first electrode connected to the data line DL, a gate electrode connected to the first-seventh node n37, and a second electrode connected to the first-fifth node n35.

The first-fourth and first-fifth switch transistors M34 and M35 are each turned on in response to the gate-on voltage VGL of the first scan signal SCAN1 and turned off in response to the gate-off voltage VGH of the first scan signal SCAN1. The first-fourth switch transistor M34 includes a first electrode connected to the data line DL, a gate electrode connected to a first-sixth node n36 to which the first scan signal SCAN1 is applied, and a second electrode connected to the first-fifth node n35. The first-fifth switch transistor M35 includes a first electrode connected to the first-second node n32, a gate electrode connected to the first-sixth node n36, and a second electrode connected to the first-third node n33.

The first-seventh and first-eighth switch transistors T31 and T32 are each turned on in response to the gate-on voltage VGL of the first mask signal MSK1 and turned off in response to the gate-off voltage VGH of the first mask signal MSK1. When the first-seventh and first-eight switch transistors T31 and T32 are turned on, the scan signals SCAN1 and SCAN2 can be transmitted to the corresponding gate electrodes of the first-third to first-sixth switch transistors M33, M34, M35, and M36, allowing the initialization step, the first holding step, the sampling step, and the second holding step to be performed normally. On the other hand, when the first-seventh and first-eight switch transistors T31 and T32 are turned off, the initialization step, the first holding step, the sampling step, and the second holding step are not performed because the scan signals SCAN1 and SCAN2 are not transmitted to the corresponding gate electrodes of the first-third to first-sixth switch transistors M33, M34, M35, and M36. For example, in the first compensation circuit 22, the first mask signal MSK1 can block or allow the scan signals SCAN1 and SCAN2, and the second mask signal MSK2 can block or allow the corresponding color-specific EM signal.

The first-seventh switch transistor T31 includes a first electrode connected to a first gate line GL1 to which the first scan signal SCAN1 is applied, a gate electrode connected to a first mask signal line ML1 to which the first mask signal MSK1 is applied, and a second electrode connected to the first-sixth node n36. The first-eighth switch transistor T32 includes a first electrode connected to a second gate line GL2 to which the second scan signal SCAN2 is applied, a gate electrode connected to the first mask signal line ML1, and a second electrode connected to the first-seventh node n37.

The first-ninth switch transistor T33 is turned on in response to the gate-on voltage VGL of the second mask signal MSK2 and turned off in response to the gate-off voltage VGH of the second mask signal MSK2. When the first-ninth switch transistor T33 is turned on, the color-specific EM signals EM_R, EM_G, and EM_B can be transmitted to the gate electrodes of the first-first and first-second switch transistors M12 and M32, allowing the light emission step to be performed normally. On the other hand, when the first-ninth switch transistor T33 is turned off, the color-specific EM signals EM_R, EM_G, and EM_B are not transmitted to the gate electrodes of the first-first and first-second switch transistors M12 and M32, and thus the light emission step is not performed.

The first-ninth switch transistor T33 includes a first electrode connected to a third gate line GL3 to which the color-specific EM signals EM_R, EM_G, and EM_B are applied, a gate electrode connected to a second mask signal line ML2 to which the second mask signal MSK2 is applied, and a second electrode connected to the first-eighth node n38.

The second compensation circuit 24 can include a plurality of switch transistors M41 to M46 and T41 to T43, and a second-first capacitor Cst2. The second compensation circuit 24 can further include a second-second capacitors C42.

Second-first to second-sixth switch transistors M41 to M46 correspond to the first to sixth switch transistors M01 to M06 shown in FIG. 27, respectively. The second-first capacitor Cst2 can be connected between the second-second node n42 and a second-fifth node n45. The second-second capacitor C42 can be connected between the first power line PL1 and the second-second node n42.

Each of the second-first and the second-second switch transistors M41 and M42 is turned on in response to the gate-on voltage VEL of the color-specific EM signals EM_R, EM_G, and EM_B and turned off in response to the gate-off voltage VEH of the color-specific EM signals EM_R, EM_G, and EM_B. The second-first switch transistor M41 includes a first electrode connected to the second-third node n43, a gate electrode connected to a second-eighth node n48 to which the color-specific EM signals EM_R, EM_G, and EM_B are applied, and a second electrode connected to the first-fourth node n34. The second-second switch transistor M42 includes a first electrode connected to the second-fifth node n45, a gate electrode connected to the second-eighth node n48, and a second electrode connected to the third power line PL3 to which the reference voltage Vref is applied.

The second-third and second-sixth switch transistors M33 and M36 are each turned on in response to the gate-on voltage VGL of the second scan signal SCAN2 and turned off in response to the gate-off voltage VGH of the second scan signal SCAN2. The second-third switch transistor M43 includes a first electrode connected to the second-second node n42, a gate electrode connected to a second-seventh node n47 to which the second scan signal SCAN2 is applied, and a second electrode connected to the third power line PL3. The second-sixth switch transistor M46 includes a first electrode connected to the data line DL, a gate electrode connected to the second-seventh node n47, and a second electrode connected to the second-fifth node n45.

The second-fourth and second-fifth switch transistors M44 and M45 are each turned on in response to the gate-on voltage VGL of the first scan signal SCAN1 and turned off in response to the gate-off voltage VGH of the first scan signal SCAN1. The second-fourth switch transistor M44 includes a first electrode connected to the data line DL, a gate electrode connected to a second-sixth node n46 to which the first scan signal SCAN1 is applied, and a second electrode connected to the second-fifth node n45. The second-fifth switch transistor M45 includes a first electrode connected to the second-second node n42, a gate electrode connected to the second-sixth node n46, and a second electrode connected to the second-third node n43.

The second-seventh and second-eighth switch transistors T41 and T42 are each turned on in response to the gate-on voltage VGL of the second mask signal MSK2 and turned off in response to the gate-off voltage VGH of the second mask signal MSK2. When the second-seventh and second-eight switch transistors T41 and T42 are turned on, the scan signals SCAN1 and SCAN2 can be transmitted to the corresponding gate electrodes of the second-third to second-sixth switch transistors M43, M44, M45, and M46, allowing the initialization step, the first holding, the sampling step, and the second holding step to be performed normally. On the other hand, when the second-seventh and second-eight switch transistors T41 and T42 are turned off, the initialization step, the first holding step, the sampling step, and the second holding step are not performed because the scan signals SCAN1 and SCAN2 are not transmitted to the corresponding gate electrodes of the second-third to second-sixth switch transistors M43, M44, M45, and M46. For example, in the second compensation circuit 24, the first mask signal MSK1 can block or allow the corresponding color-specific EM signal, and the second mask signal MSK2 can block or allow the scan signals SCAN1 and SCAN2. In other words, the connections regarding the first mask signal light ML1 and the second mask signal line ML2 in the second compensation circuit 24 are flipped relative to the connections regarding the first mask signal light ML1 and the second mask signal line ML2 in the first compensation circuit 22.

The second-seventh switch transistor T41 includes a first electrode connected to the first gate line GL1 to which the first scan signal SCAN1 is applied, a gate electrode connected to a second mask signal line ML2 to which the second mask signal MSK2 is applied, and a second electrode connected to the second-sixth nodes n46. The second-eighth switch transistor T42 includes a first electrode connected to the second gate line GL2 to which the second scan signal SCAN2 is applied, a gate electrode connected to the second mask signal line ML2, and a second electrode connected to the second-seventh node n47.

The second-ninth switch transistor T43 is turned on in response to the gate-on voltage VGL of the first mask signal MSK1 and turned off in response to the gate-off voltage VGH of the first mask signal MSK1. When the second-ninth switch transistor T43 is turned on, the color-specific EM signals EM_R, EM_G, and EM_B can be transmitted to the gate electrodes of the second-first and second-second switch transistors M41 and M42, allowing the light emission step to be performed normally. On the other hand, when the second-ninth switch transistor T43 is turned off, the color-specific EM signals EM_R, EM_G, and EM_B are not transmitted to the gate electrodes of the second-first and second-second switch transistors M12 and M42, and thus the light emission step is not performed.

The second-ninth switch element T43 includes a first electrode connected to a third gate line GL3 to which the color-specific EM signals EM_R, EM_G, and EM_B are applied, a gate electrode connected to the first mask signal line ML1 to which the first mask signal MSK1 is applied, and a second electrode connected to the second-eighth node n48.

The color-specific EM signals EM_R, EM_G, and EM_B can be set independently for each color of the light-emitting elements as shown in FIGS. 10 and 11. For example, the duty cycles of the color-specific EM signals EM_R, EM_G, and EM_B can be set different from each other, but embodiments are not limited thereto.

In the pixel circuit 500 illustrated in FIG. 5, the first compensation circuit 22 can perform the initialization step, the first holding step, the sampling step, and the second holding step in one horizontal period (1H) during the odd-numbered frame periods FR1 and FR3, as shown in FIGS. 33A to 33B. The second compensation circuit 24 can perform the light emission step during the odd-numbered frame periods FR1 and FR3, including the initialization step, the first holding step, the sampling step, and the second holding step during the odd-numbered frame periods FR1 and FR3, as shown in FIGS. 33A to 33B.

As shown in FIG. 18, the voltage of the first mask signal MSK1 can be the gate-on voltage VGL during the odd-numbered frame periods FR1 and FR3, and the voltage of the second mask signal MSK2 can be the gate-off voltage VGH during the odd-numbered frame periods FR1 and FR3. In this situation, as shown in FIGS. 33A to 36B, the first-seventh and first-eighth switch transistors T31 and T32 of the first compensation circuit 22 can be turned on in response to the gate-on voltage VGL of the first mask signal MSK1 during the odd-numbered frame period FR1 and FR3, while the first-ninth switch transistor T33 can be turned off. During the odd-numbered frame periods FR1 and FR3, the second-ninth switch transistor T43 of the second compensation circuit 24 can be turned on in response to the gate-on voltage VGL of the first mask signal MSK1, while the second-seventh and second-eighth switch transistors T41 and T42 can be turned off.

FIGS. 33A and 33B are drawings illustrating in detail the initialization step and the light emission step of the pixel circuit 500 shown in FIG. 5 during the first frame period FR1.

Referring to FIGS. 18, 33A, and 33B, the first compensation circuit 22 can perform initialization step in a first period of the first frame period FR1_P1. The second compensation circuit 24 can perform the light emission step in the first period of the first frame period FR1_P1. Accordingly, the pixel circuit 500 can simultaneously perform the initialization step and the light emission step in the first period of the first frame period FR1_P1.

During the first period of the first frame period FR1_P1, the voltage of the second scan signal SCAN2 is the gate-on voltage VGL and the voltage of the first scan signal SCAN1 is the gate-off voltage VGH. The second scan signal SCAN2 can be transmitted to the gate electrodes of the first-third and first-sixth switch transistors M33 and M36 through the first-eighth switch transistor T32 during the first frame period FR1. During the first period of the first frame period FR1_P1, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the second-first and second-second switch transistors M41 and M42 through the second-ninth switch transistor T43 during the first frame period FR1.

During the first period of the first frame period FR1_P1, the first-third, first-sixth, first-seventh, and first-eighth switch transistors M33, M36, T31, and T32 in the first compensation circuit 22 are in the on-state, while the other switch transistors M31, M32, M34, T35, and T33 are in the off-state. During the first period of the first frame period FR1_P1, the first driving transistor DR1 is in the off-state. During the first period of the first frame period FR1_P1, the voltage of the first-second node n32 is initialized to the reference voltage Vref, and the voltage of the first-fifth node n35 is the data voltage Vdata(n−1) of a preceding pixel line.

During the first period of the first frame period FR1_P1, the second-first, second-second, and second-ninth switch transistors M41, M42, and T43 in the second compensation circuit 24 are in the on-state, while the other switch transistors M43, M44, M45, M46, T41, and T42 are in the off-state. During the first periods of the first frame period FR1_P1, the second driving transistor DR2 is in the on-state. The second driving transistor DR2 generates a current according to the gate-source voltage Vgs during the first periods of the first frame period FR1_P1 to drive the light-emitting element LD. The light-emitting element LD can emit light by the current from the second driving transistor DR2 in the light-on interval (ON) of the color-specific EM signals EM_R, EM_G, and EM_B during the first period of the first frame period FR1_P1. For example, while the first compensation circuit 22 is beginning initialization, the second compensation circuit 24 can control the light-emitting element LD to emit light during the first period of first frame period FR1_P1.

Figure 34A:
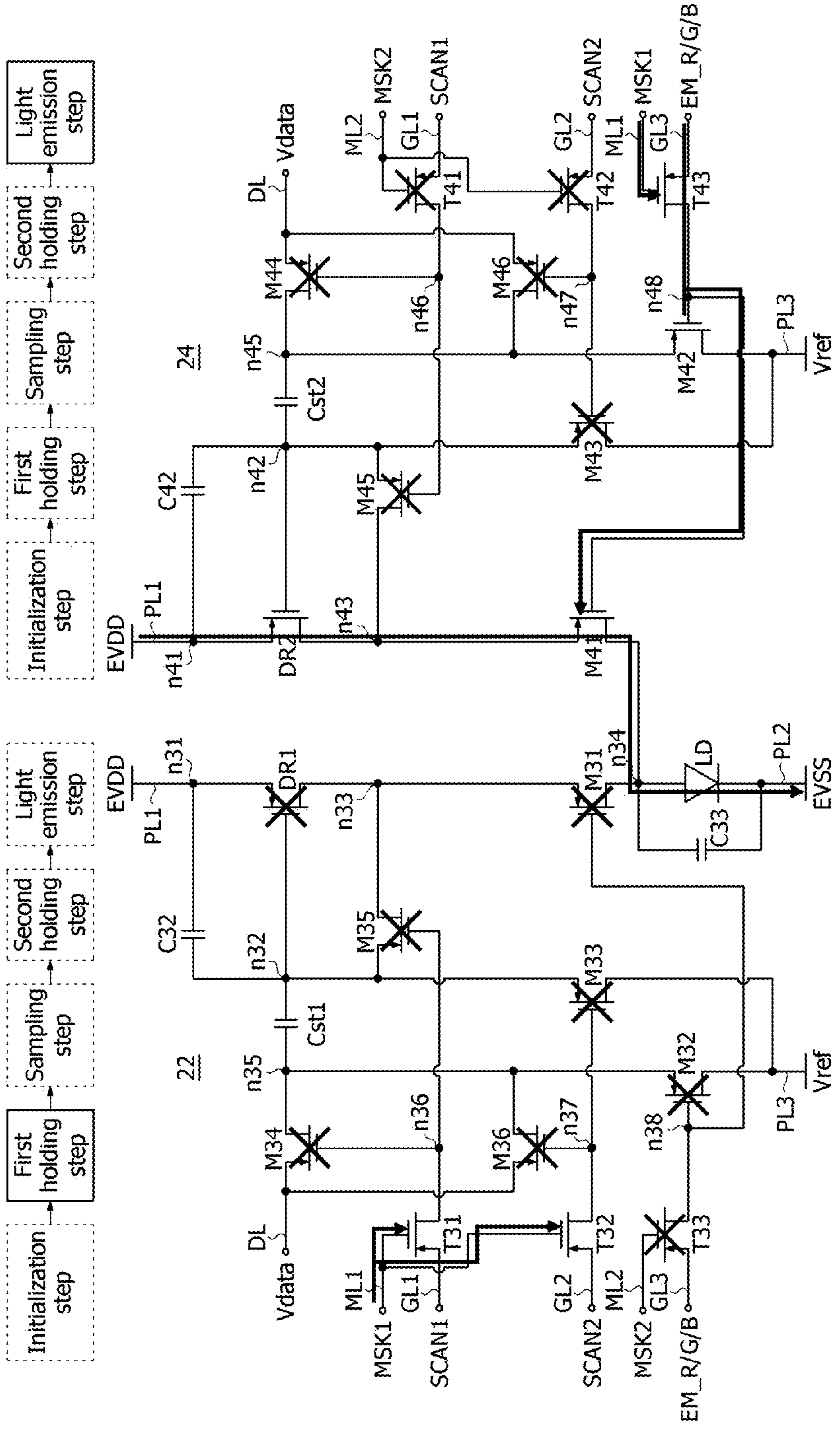
FIGS. 34A and 34B are diagrams illustrating in detail a first holding step and a light emission step of the pixel circuit shown in FIG. 5 during a first frame period according to an embodiment of the present disclosure.
Figure 34B:
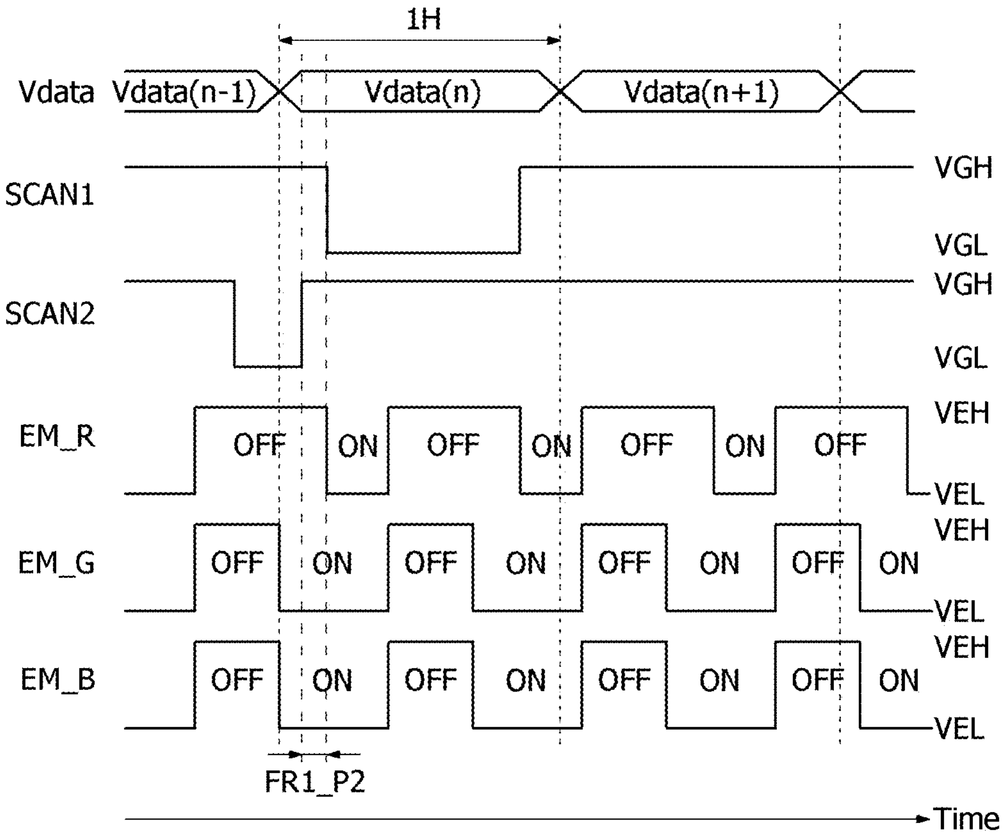

FIGS. 34A and 34B are diagrams illustrating in detail the first holding step and the light emission step of the pixel circuit shown in FIG. 5 during the first frame period FR1.

Referring to FIGS. 18, 34A, and 34B, the first compensation circuit 22 can perform the first holding step in a second period of the first frame period FR1_P2. The second compensation circuit 24 can perform the light emission step in the second period of the first frame period FR1_P2. Accordingly, the pixel circuit 500 can simultaneously perform the first holding step and the light emission step in the second period of the first frame period FR1_P2.

During the second period of the first frame period FR1_P2, the voltage of the first and second scan signals SCAN1 and SCAN2 is the gate-off voltage VGH. During the second period of the first frame period FR1_P2, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the second-first and second-second switch transistors M41 and M42 through the second-ninth switch transistor T43 during the first frame period FR1.

During the second period of the first frame period FR1_P2, the first-seventh and first-eighth switch transistors T31 and T32 in the first compensation circuit 22 are in the on-state. On the other hand, the other switch transistors M31 to M36, and T33 and the first driving transistor DR1 are in the off-state. During the second period of the first frame period FR1_P2, the voltage of first-first capacitor Cst1 remains at the previous state.

During the second period of the first frame period FR1_P2, the second-first, second-second, and second-ninth switch transistors M41, M42, and T43 in the second compensation circuit 24 are in the on-state, while the other switch transistors M43, M44, M45, M46, T41, and T42 are in the off-state. During the second period of the first frame period FR1_P2, the light-emitting element LD can emit light by the current from the second driving transistor DR2 in the light-on interval (ON) of the color-specific EM signals EM_R, EM_G, and EM_B. For example, while the first compensation circuit 22 is performing the first holding step, the second compensation circuit 24 can control the light-emitting element LD to emit light during the second period of first frame period FR1_P2.

Figure 35A:
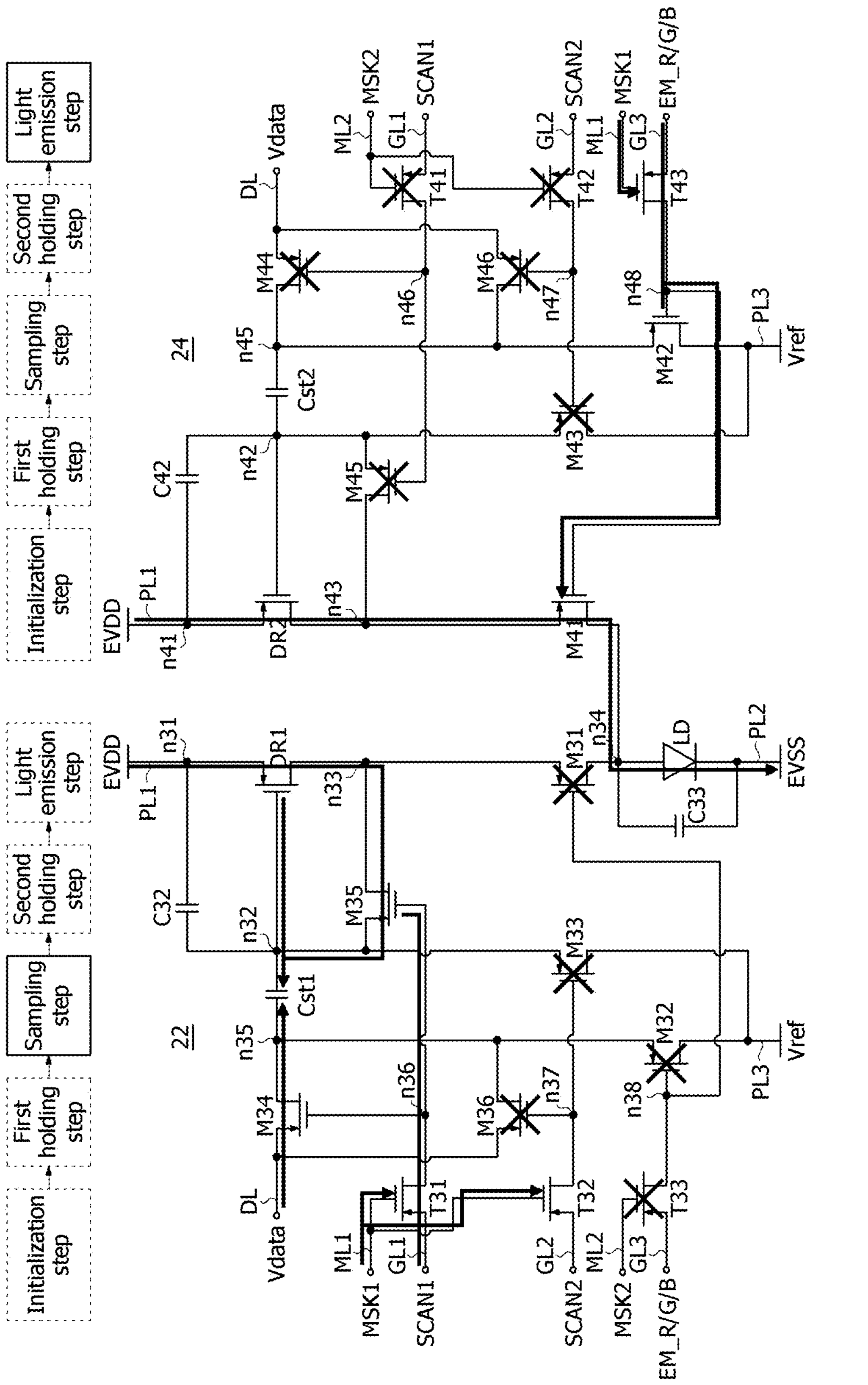
FIGS. 35A and 35B are drawings illustrating in detail a sampling step and a light emission step of the pixel circuit shown in FIG. 5 during a first frame period according to an embodiment of the present disclosure.
Figure 35B:
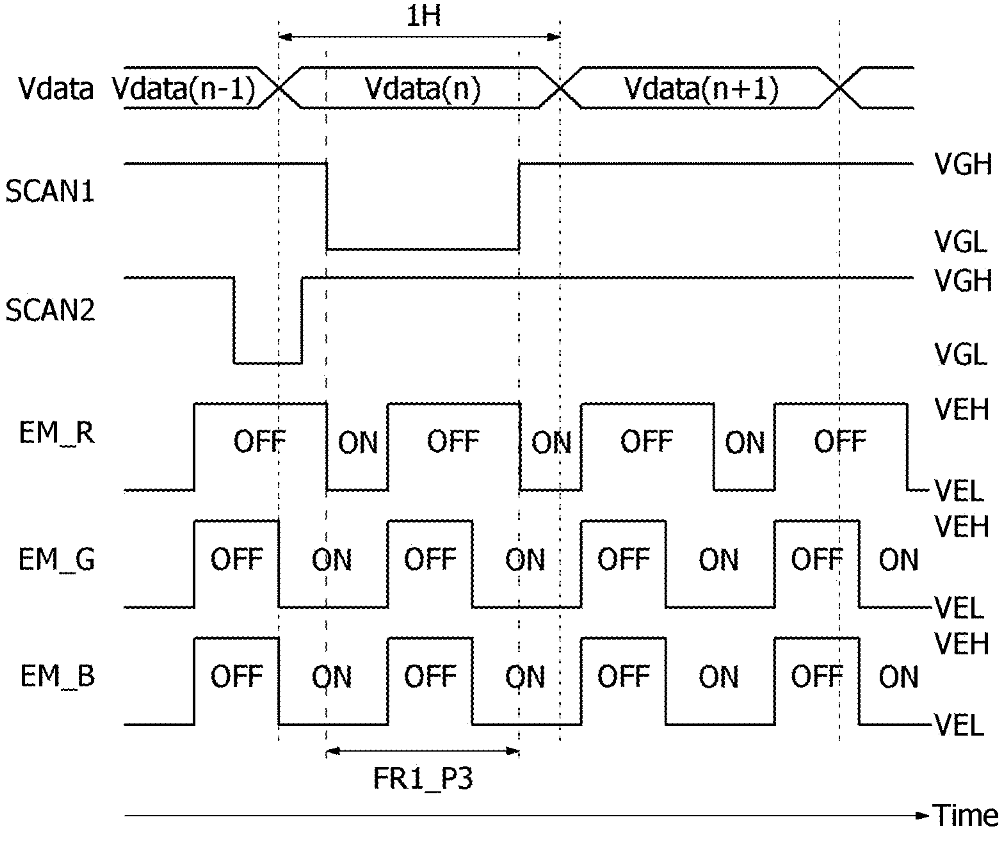

FIGS. 35A and 35B are drawings illustrating in detail the sampling step and the light emission step of the pixel circuit shown in FIG. 5 during the first frame period FR1.

Referring to FIGS. 18, 35A, and 35B, the first compensation circuit 22 can perform the sampling step in a third period of the first frame period FR1_P3. The second compensation circuit 24 can perform the light emission step in the third period of the first frame period FR1_P3. Accordingly, the pixel circuit 500 can simultaneously perform the sampling step and the light emission step in the third period of the first frame period FR1_P3.

During the third period of the first frame period FR1_P3, the voltage of the first scan signal SCAN1 is the gate-on voltage VGL and the voltage of the second scan signal SCAN2 is the gate-off voltage VGH. The first scan signal SCAN1 can be transmitted to the gate electrode of each of the first-fourth and first-fifth switch transistors M34 and M35 through the first-seventh switch transistor T31 during the first frame period FR1. During the third period of the first frame period FR1_P3, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the second-first and second-second switch transistors M41 and M42 through the second-ninth switch transistor T43 during the first frame period FR1.

During the third period of the first frame period FR1_P3, the first-fourth, first-fifth, first-seventh and first-eighth switch transistors M34, M35, T31, and T32 in the first compensation circuit 22 are in the on-state. On the other hand, the first-first, first-second, first-third, first-sixth, and first-ninth switch transistors M31, M32, M33, M36, and T43 are in the off-state. During the third period of the first frame period FR1_P3, the data voltage Vdata(n) is applied to the data line DL. During the third period of the first frame period FR1_P3, the data voltage Vdata(n) is applied to the first-fifth node n35 and the voltage of the first-second node n32 rises to a voltage EVDD+Vth. Here, 'Vth' represents the threshold voltage of the first driving transistor DR1. The first-first capacitor Cst1 is charged with a difference voltage between the voltage of the first-fifth node n35 and the voltage of the first-second node n32.

During the third period of the first frame period FR1_P3, the second-first, second-second, and second-ninth switch transistors M41, M42, and T43 in the second compensation circuit 24 are in the on-state, while the other switch transistors M43, M44, M45, M46, T41, and T42 are in the off-state. During the third period of the first frame period FR1_P3, the light-emitting element LD can emit light by the current from the second driving transistor DR2 in the light-on interval (ON) of the color-specific EM signals EM_R, EM_G, and EM_B. For example, while the first compensation circuit 22 is being sampled, the second compensation circuit 24 can control the light-emitting element LD to emit light during the third period of the first frame period FR1_P3.

Figure 36A:
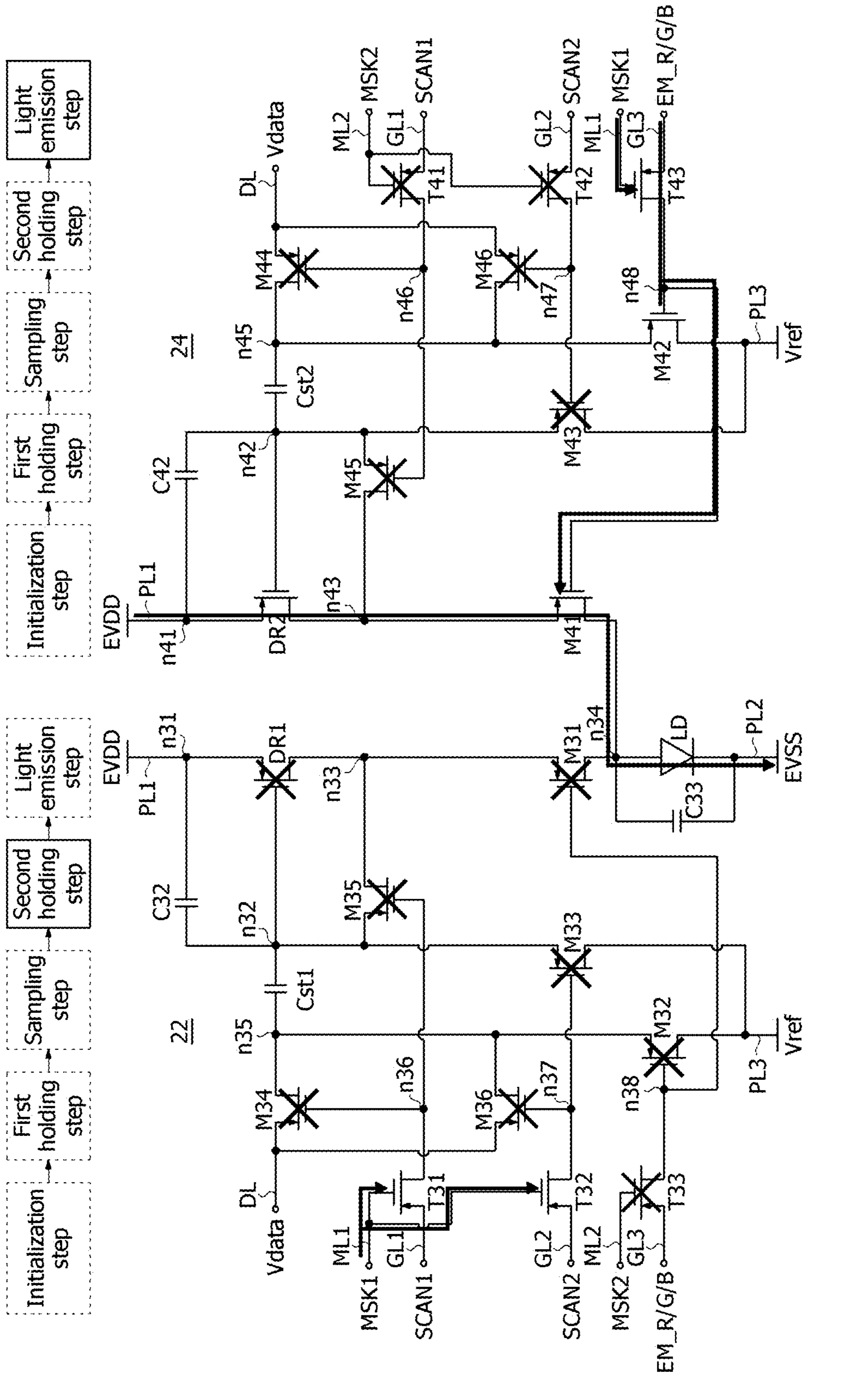
FIGS. 36A and 36B are diagrams illustrating in detail a second holding step and a light emission step of the pixel circuit shown in FIG. 5 during a first frame period according to an embodiment of the present disclosure.
Figure 36B:
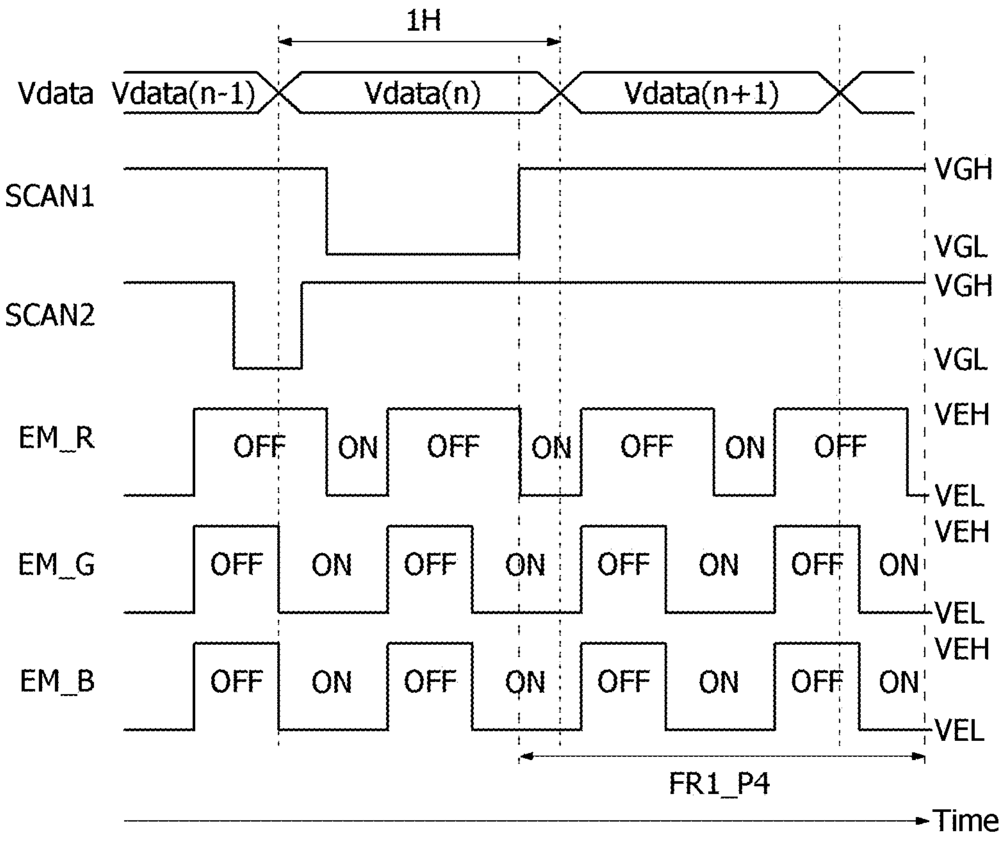

FIGS. 36A and 36B are diagrams illustrating in detail the second holding step and the light emission step of the pixel circuit shown in FIG. 5 during the first frame period FR1.

Referring to FIGS. 18, 36A, and 36B, the first compensation circuit 22 can perform the second holding step in a fourth period of the first frame period FR1_P4. The second compensation circuit 24 can perform the light emission step in the fourth period of the first frame period FR1_P4. Accordingly, the pixel circuit 500 can simultaneously perform the second holding step and the light emission step in the fourth period of the first frame period FR1_P4.

During the fourth period of the first frame period FR1_P4, the voltage of the first and second scan signals SCAN1 and SCAN2 is the gate-off voltage VGH. During the fourth period of the first frame period FR1_P4, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the second-first and second-second switch transistors M41 and M42 through the second-ninth switch transistor T43 during the first frame period FR1.

During the fourth period of the first frame period FR1_P4, the first-seventh and first-eighth switch transistors T31 and T32 in the first compensation circuit 22 are in the on-state. On the other hand, the other switch transistors M31 to M36, and T33 are in the off-state. During the fourth period of the first frame period FR1_P4, the voltage of first-first capacitor Cst1 remains at the previous state.

During the fourth period of the first frame period FR1_P4, the second-first, second-second, and second-ninth switch transistors M41, M42, and T43 in the second compensation circuit 24 are in the on-state, while the other switch transistors M43, M44, M45, M46, T41, and T42 are in the off-state. During the fourth period of the first frame period FR1_P4, the light-emitting element LD can emit light by the current from the second driving transistor DR2 in the light-on interval (ON) of the color-specific EM signals EM_R, EM_G, and EM_B. For example, while the first compensation circuit 22 is performing the second holding step, the second compensation circuit 24 can control the light-emitting element LD to emit light during the fourth period of first frame period FR1_P4.

Figure 37A:
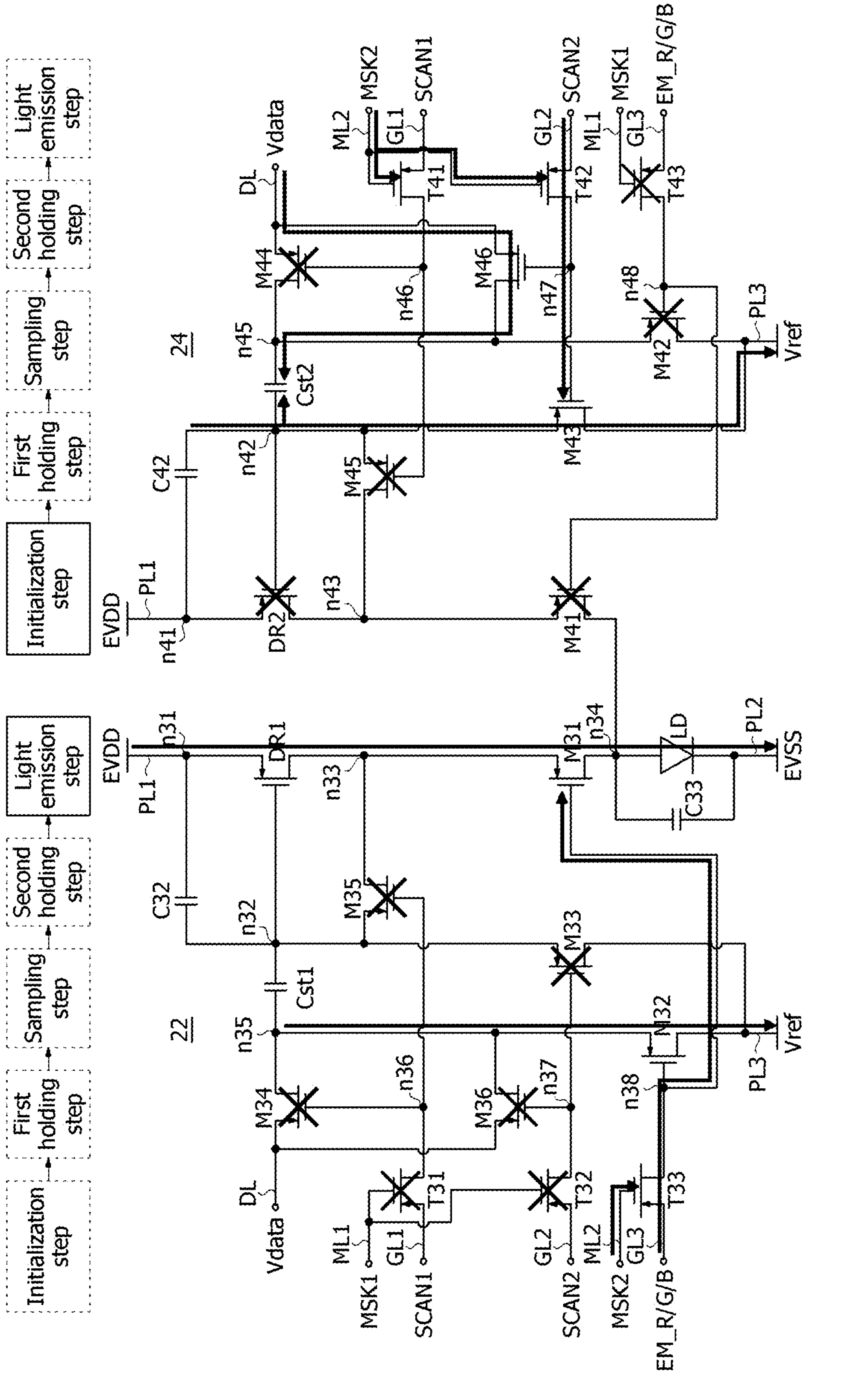
FIGS. 37A and 37B are diagrams illustrating in detail an initialization step and a light emission step of the pixel circuit shown in FIG. 5 during a second frame period according to an embodiment of the present disclosure.
Figure 37B:
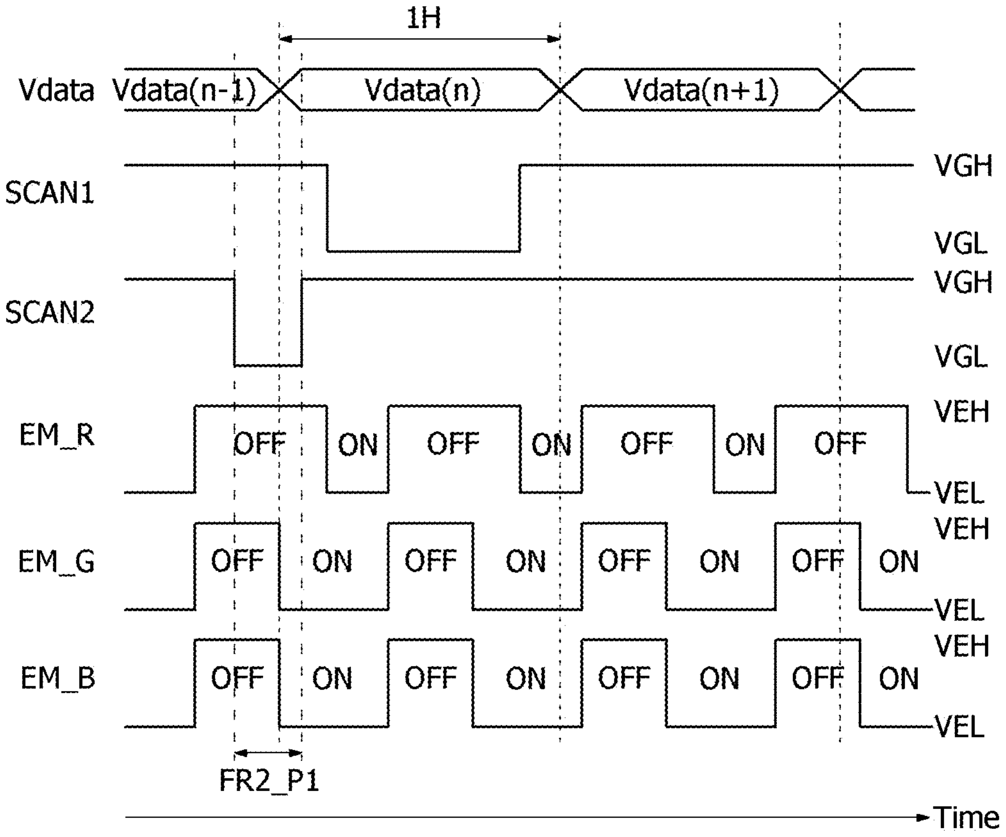

FIGS. 37A and 37B are diagrams illustrating in detail the initialization step and the light emission step of the pixel circuit shown in FIG. 5 during the second frame period FR2. For example, the roles of the first compensation circuit 22 and the second compensation circuit 24 can be reversed (e.g., the first compensation circuit 22 can control the light-emitting element LD to emit light while the second compensation circuit 24 gets ready).

Referring to FIGS. 18, 37A, and 37B, the first compensation circuit 24 can perform the initialization step in a first period of the second frame period FR2_P1. The first compensation circuit 22 can perform the light emission step in the first period of the second frame period FR2_P1. Accordingly, the pixel circuit 500 can simultaneously perform the initialization step and the light emission step in the first period of the second frame period FR2_P1.

During the first period of the second frame period FR2_P1, the voltage of the second scan signal SCAN2 is the gate-on voltage VGL and the voltage of the first scan signal SCAN1 is the gate-off voltage VGH. The second scan signal SCAN2 can be transmitted to the gate electrode of each of the second-third and second-sixth switch transistors M43 and M46 through the second-eighth switch transistor T42 during the second frame period FR2. During the first period of the second frame period FR2_P1, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrodes of the first-first and first-second switch transistors M31 and M32 through the first-ninth switch transistor T33 during the second frame period FR2.

During the first period of the second frame period FR2_P1, the second-third, second-sixth, second-seventh, and second-eighth switch transistors M43, M46, T41, and T42 in the second compensation circuit 24 are in the on-state, while the other switch transistors M41, M42, M44, M45, and T43 and DR2 are in the off-state. During the first period of the second frame period FR2_P1, the second driving transistor DR2 is in the off-state. During the first period of the second frame period FR2_P1, the voltage of the second-second node n42 is initialized to the reference voltage Vref, and the voltage of the second-fifth node n45 is the data voltage Vdata(n−1) of a preceding pixel line.

During the first period of the second frame period FR2_P1, the first-first, first-second, and first-ninth switch transistors M31, M32, and T33 in the first compensation circuit 22 are in the on-state, while the other switch transistors M33, M34, M35, M36, T31, and T32 are in the off-state. During the first period of the second frame period FR2_P1, the light-emitting element LD can emit light by the current from the first driving transistor DR1 in the light-on interval (ON) of the color-specific EM signals EM_R, EM_G, and EM_B. For example, while the second compensation circuit 24 is performing initialization, the first compensation circuit 22 can control the light-emitting element LD to emit light during the first period of second frame period FR2_P1.

Figure 38A:
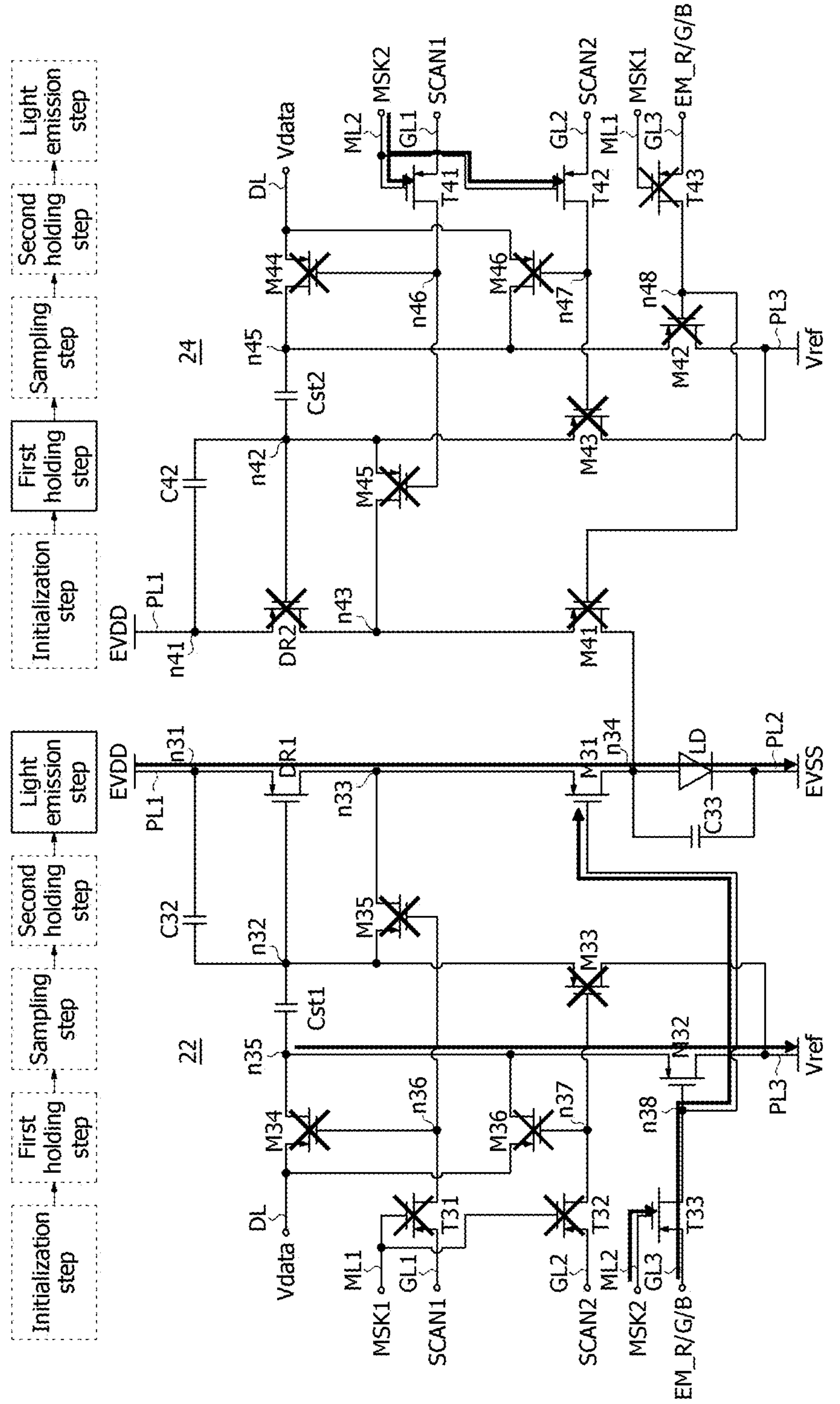
FIGS. 38A and 38B are diagrams illustrating in detail a first holding step and a light emission step of the pixel circuit shown in FIG. 5 during a second frame period according to an embodiment of the present disclosure.
Figure 38B:
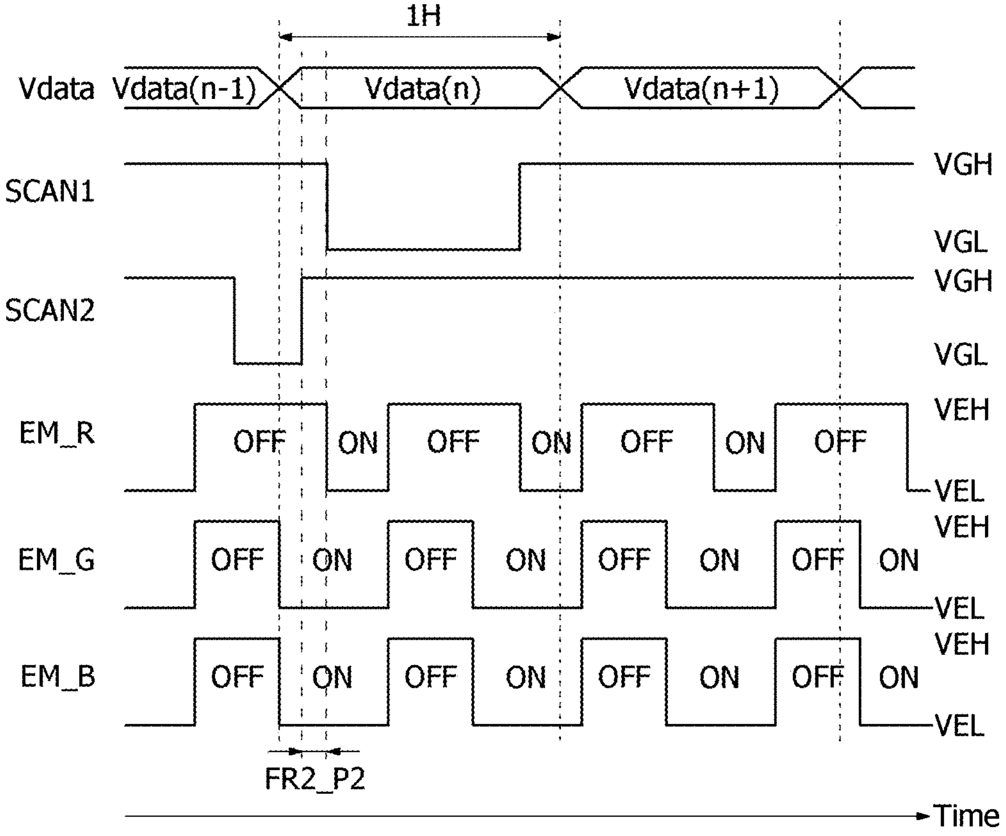

FIGS. 38A and 38B are diagrams illustrating in detail the first holding step and the light emission step of the pixel circuit shown in FIG. 5 during the second frame period FR2.

Referring to FIGS. 18, 38A, and 38B, the second compensation circuit 24 can perform the first holding step in a second period of the second frame period FR2_P2. The first compensation circuit 22 can perform the light emission step in the second period of the second frame period FR2_P2. Accordingly, the pixel circuit 500 can simultaneously perform the first holding step and the light emission step in the second period of the second frame period FR2_P2.

During the second period of the second frame period FR2_P2, the voltage of the first and second scan signals SCAN1 and SCAN2 is the gate-off voltage VGH. During the second period of the second frame period FR2_P2, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the first-first and first-second switch transistors M31 and M32 through the first-ninth switch transistor T33 during the second frame period FR2.

During the second period of the second frame period FR2_P2, the second-seventh and second-eighth switch transistors T41 and T42 in the second compensation circuit 24 are in the on-state. On the other hand, the other switch transistors M41 to M46, and T43 and the second driving transistor DR2 are in the off-state. During the second period of the second frame period FR2_P2, the voltage of second-first capacitor Cst2 remains at the previous state.

During the second period of the second frame period FR2_P2, the first-first, first-second, and first-ninth switch transistors M31, M32, and T33 in the first compensation circuit 22 are in the on-state, while the other switch transistors M33, M34, M35, M36, T31, and T32 are in the off-state. During the second period of the second frame period FR2_P2, the light-emitting element LD can emit light by the current from the first driving transistor DR1 in the light-on interval (ON) of the color-specific EM signals EM_R, and EM_G. For example, while the second compensation circuit 24 is performing the first holding step, the first compensation circuit 22 can control the light-emitting element LD to emit light during the second period of second frame period FR2_P2.

Figure 39A:
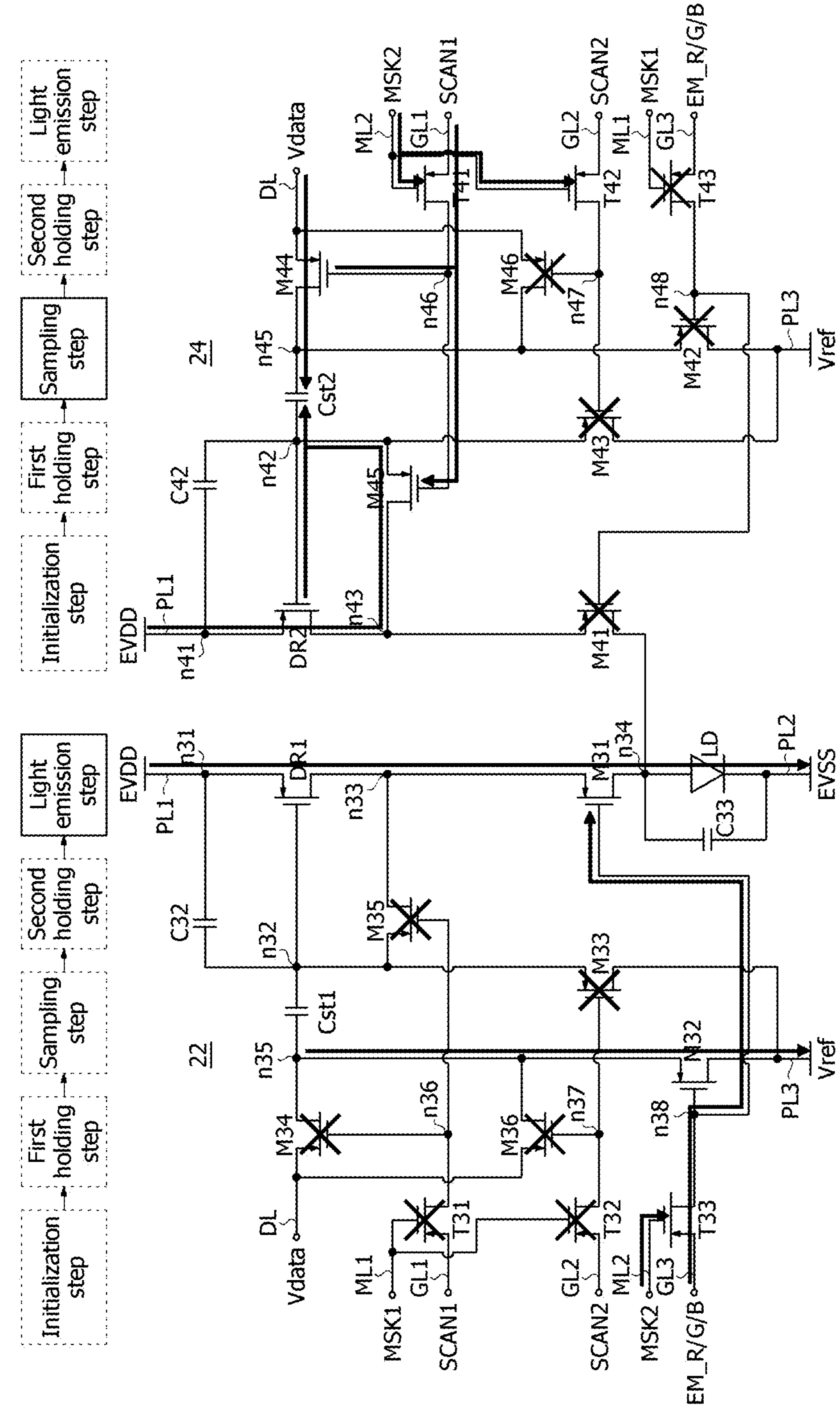
FIGS. 39A and 39B are drawings illustrating in detail a sampling step and a light emission step of the pixel circuit shown in FIG. 5 during a second frame period according to an embodiment of the present disclosure.
Figure 39B:
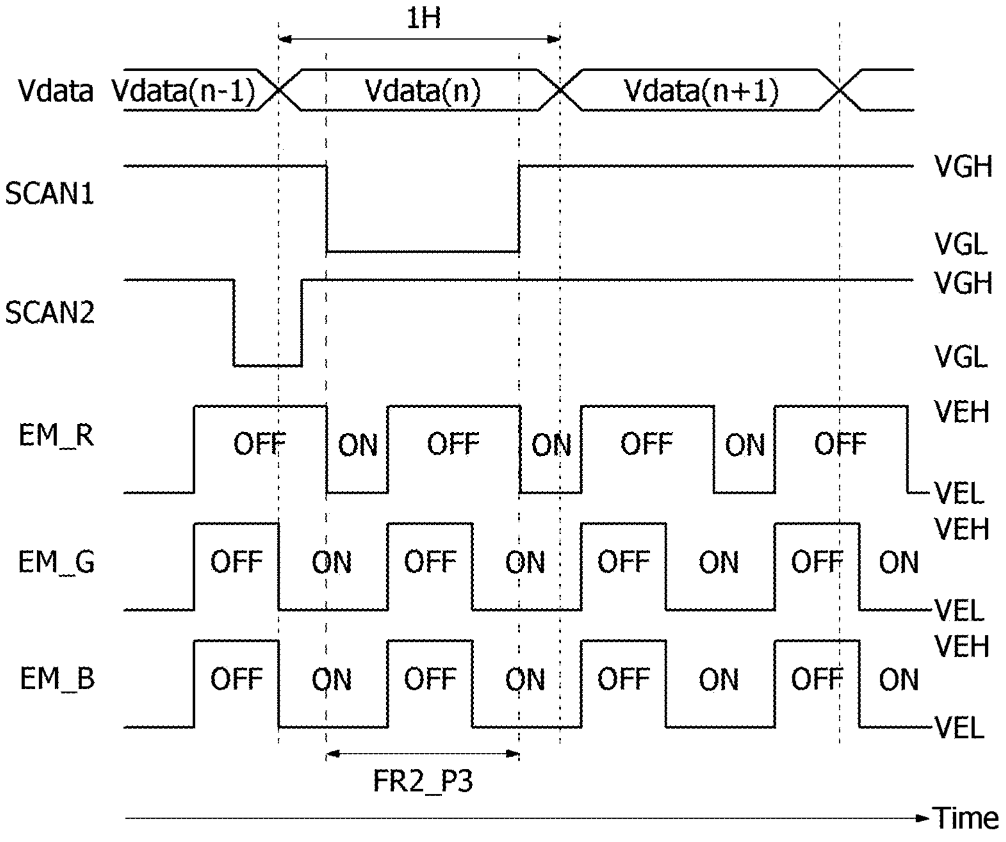

FIGS. 39A and 39B are drawings illustrating in detail the sampling step and the light emission step of the pixel circuit shown in FIG. 5 during the second frame period FR2.

Referring to FIGS. 18, 39A, and 39B, the second compensation circuit 24 can perform the sampling step in a third period of the second frame period FR2_P3. The first compensation circuit 22 can perform the light emission step in the third period of the second frame period FR2_P3. Accordingly, the pixel circuit 500 can simultaneously perform the sampling step and the light emission step in the third period of the second frame period FR2_P3.

During the third period of the second frame period FR2_P3, the voltage of the first scan signal SCAN1 is the gate-on voltage VGL and the voltage of the second scan signal SCAN2 is the gate-off voltage VGH. The first scan signal SCAN1 can be transmitted to the gate electrode of each of the second-fourth and second-fifth switch transistors M44 and M45 through the second-seventh switch transistor T41 during the second frame period FR2. During the third period of the second frame period FR2_P3, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the first-first and first-second switch transistors M31 and M32 through the first-ninth switch transistor T33 during the second frame period FR2.

During the third period of the second frame period FR2_P3, the second-fourth, second-fifth, second-seventh and second-eighth switch transistors M44, M45, T41, and T42 in the second compensation circuit 24 are in the on-state. On the other hand, the second-first, second-second, second-third, second-sixth, and second-ninth switch transistors M41, M42, M43, M46, and T43 are in the off-state. During the third period of the second frame period FR2_P3, the data voltage Vdata(n) is applied to the data line DL. During the third period of the second frame period FR2_P3, the data voltage Vdata(n) is applied to the second-fifth node n45, and the voltage of the second-second node n42 rises to a voltage EVDD+Vth. Here, 'Vth' represents the threshold voltage of the second driving transistor DR2. The second-first capacitor Cst2 is charged with a difference voltage between the voltage of the second-fifth node n45 and the voltage of the second-second node n42.

During the third period of the second frame period FR2_P3, the first-first, first-second, and first-ninth switch transistors M31, M32, and T33 in the first compensation circuit 22 are in the on-state, while the other switch transistors M33, M34, M35, M36, T31, and T32 are in the off-state. During the third period of the second frame period FR2_P3, the light-emitting element LD can emit light by the current from the first driving transistor DR1 in the light-on interval (ON) of the color-specific EM signals EM_R, EM_G, and EM_B. For example, while the second compensation circuit 24 is performing the sampling step, the first compensation circuit 22 can control the light-emitting element LD to emit light during the third period of second frame period FR2_P3.

Figure 40A:
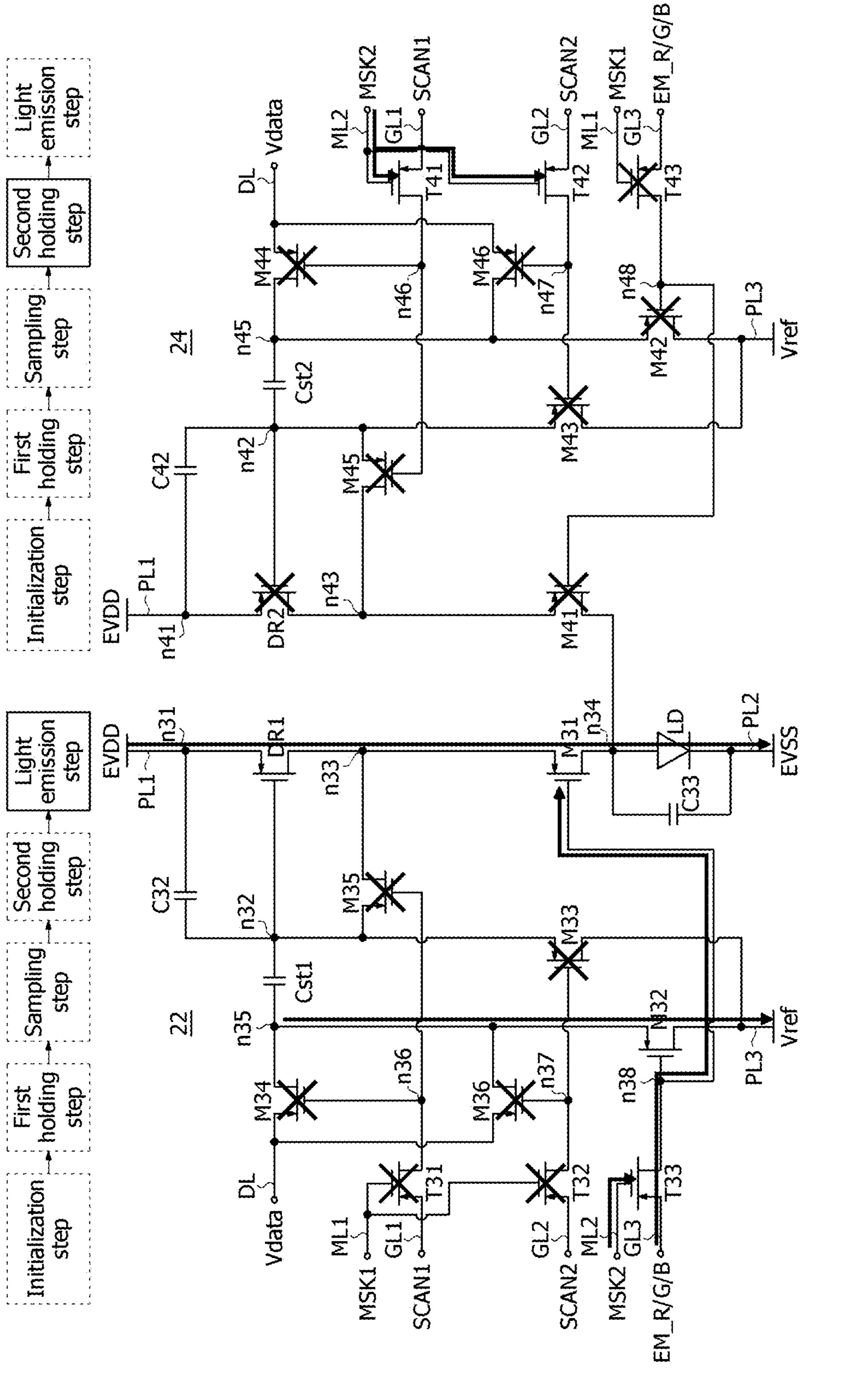
FIGS. 40A and 40B are diagrams illustrating in detail a second holding step and a light emission step of the pixel circuit shown in FIG. 5 during a second frame period according to an embodiment of the present disclosure.
Figure 40B:
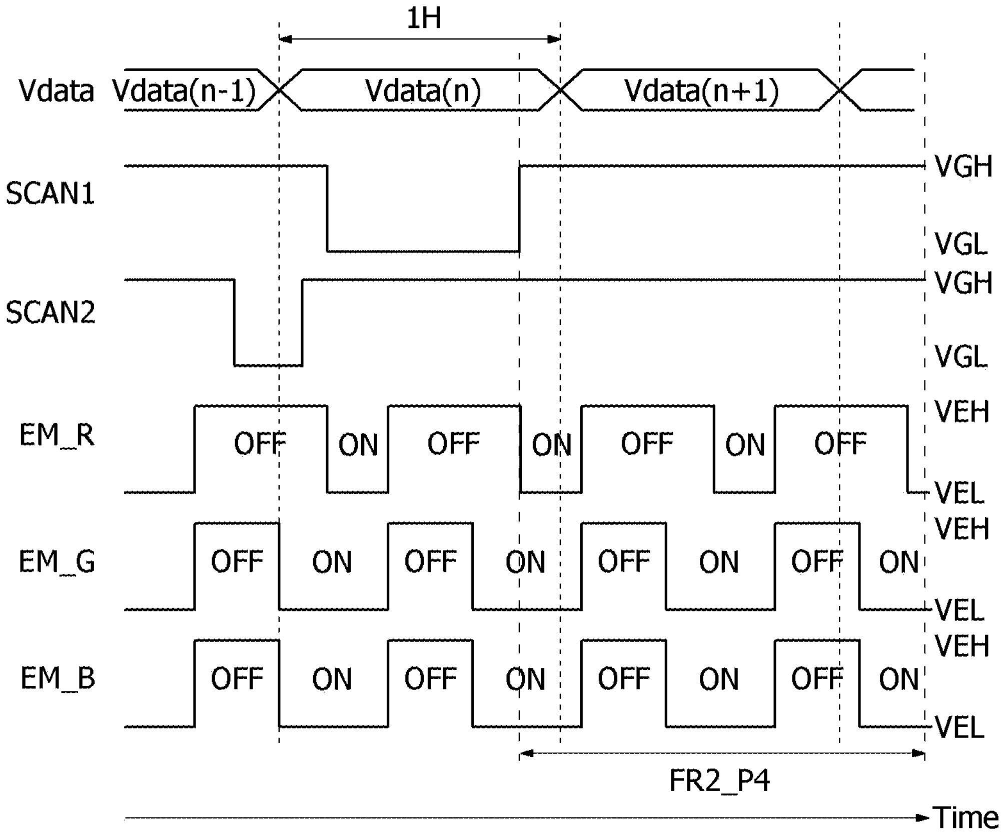

FIGS. 40A and 40B are diagrams illustrating in detail the second holding step and the light emission step of the pixel circuit shown in FIG. 5 during a second frame period.

Referring to FIGS. 18, 40A, and 40B, the second compensation circuit 24 can perform the second holding step in a fourth period of the second frame period FR2_P4. The first compensation circuit 22 can perform the light emission step in the fourth period of the second frame period FR2_P4. Accordingly, the pixel circuit 500 can simultaneously perform the second holding step and the light emission step in the fourth period of the second frame period FR2_P4.

During the fourth period of the second frame period FR2_P4, the voltage of the first and second scan signals SCAN1 and SCAN2 is the gate-off voltage VGH. During the fourth period of the second frame period FR2_P4, the voltage of the color-specific EM signals EM_R, EM_G, and EM_B swings between the gate-on voltage VEL and the gate-off voltage VEH depending on the duty ratio. The color-specific EM signals EM_R, EM_G, and EM_B can be transmitted to the gate electrode of each of the first-first and first-second switch transistors M31 and M32 through the first-ninth switch transistor T33 during the second frame period FR2.

During the fourth period of the second frame period FR2_P4, the second-seventh and second-eighth switch transistors T41 and T42 in the second compensation circuit 24 are in the on-state. On the other hand, the other switch transistors M41 to M46, and T43 are in the off-state. During the fourth period of the second frame period FR2_P4, the voltage of second-first capacitor Cst2 remains at the previous state.

During the fourth period of the second frame period FR2_P4, the first-first, first-second, and first-ninth switch transistors M31, M32, and T33 in the first compensation circuit 22 are in the on-state, while the other switch transistors M33, M34, M35, M36, T31, and T32 are in the off-state. During the fourth period of the second frame period FR2_P4, the light-emitting element LD can emit light by the current from the first driving transistor DR1 in the light-on interval (ON) of the color-specific EM signals EM_R, EM_G, and EM_B. For example, while the second compensation circuit 24 is performing the second holding step, the first compensation circuit 22 can control the light-emitting element LD to emit light during the fourth period of second frame period FR2_P4.

According to one or more embodiments of the present disclosure, the display device can be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop personal computers (PCs), laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure can be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit comprising:

a light-emitting element configured to emit light;

a first driving transistor configured to control the light-emitting element to emit the light;

a second driving transistor configured to control the light-emitting element to emit the light;

a first emission switch transistor configured to electrically connect the first driving transistor to the light-emitting element in response to a light emission signal;

a second emission switch transistor configured to electrically connect the second driving transistor to the light-emitting element in response to the light emission signal;

a first circuit configured to charge a first data voltage during a first driving period and transfer the light emission signal to the first emission switch transistor during a second driving period; and a second circuit configured to transmit the light emission signal to the second emission switch transistor during the first driving period and charge a second data voltage during the second driving period, wherein each of the first and second driving periods is an I-frame period, where I is a positive integer, and wherein a duty ratio of the light emission signal is set independently for the light-emitting element based on a first color of the light emitted by the light-emitting element relative to another light-emitting element that is configured to emit light of a second color different than the first color.

2. The pixel circuit of claim 1, wherein:

the first circuit and the second circuit are both configured to receive a first mask signal, a second mask signal, and the light emission signal, a voltage of the first mask signal and a voltage of the second mask signal are inverted every cycle of an I-frame period, where I is a positive integer, and the voltage of the second mask signal is a gate-off voltage when the voltage of the first mask signal is a gate-on voltage, and the voltage of the second mask signal is the gate-on voltage when the voltage of the first mask signal is the gate-off voltage.

3. The pixel circuit of claim 2, wherein the first circuit and the second circuit are both further configured to receive a first scan signal and a second scan signal, and wherein each of the first scan signal, the second scan signal, the first mask signal, the second mask signal, and the light emission signal swings between the gate-on voltage and the gate-off voltage.

4. The pixel circuit of claim 3, wherein the first driving transistor includes a first electrode connected to a first-first node, a gate electrode connected to a first-second node, and a second electrode connected to a first-third node, wherein the second driving transistor includes a first electrode connected to a second-first node, a gate electrode connected to a second-second node, and a second electrode connected to a second-third node, wherein an anode electrode of the light-emitting element is connected to a first power line configured to receive a pixel driving voltage, and a cathode electrode of the light-emitting element is connected to a first-fourth node, wherein the first emission switch transistor includes:

a first-first switch element including a first electrode connected to the first-fourth node, a gate electrode connected to a first-eighth node configured to receive the light emission signal, and a second electrode connected to the first-first node; and a first-second switch element including a first electrode connected to the first-third node, a gate electrode connected to the first-eighth node, and a second electrode connected to a second power line configured to receive a ground voltage, and wherein the second emission switch transistor includes:

a second-first switch element including a first electrode connected to the first-fourth node, a gate electrode connected to a second-eighth node configured to receive the light emission signal, and a second electrode connected to the second-first node; and a second-second switch element including a first electrode connected to the second-third node, a gate electrode connected to the second-eighth node, and a second electrode connected to the second power line.

5. The pixel circuit of claim 4, wherein the first circuit includes:

a first-third switch element including a first electrode connected to a first-fifth node, a gate electrode connected to the first-eighth node, and a second electrode connected to a third power line configured to receive a reference voltage;

a first-fourth switch element including a first electrode connected to the third power line, a gate electrode connected to a first-seventh node configured to receive the second scan signal, and a second electrode connected to the first-third node;

a first-fifth switch element including a first electrode connected to a data line configured to receive a data voltage, a gate electrode connected to a first-sixth node configured to receive the first scan signal, and a second electrode connected to the first-fifth node;

a first-sixth switch element including a first electrode connected to the first-second node, a gate electrode connected to the first-sixth node, and a second electrode connected to the first-third node;

a first-seventh switch element including a first electrode connected to the first power line, a gate electrode connected to the first-sixth node, and a second electrode connected to the first-first node; and a first-first capacitor connected between the first-second node and the first-fifth node.

6. The pixel circuit of claim 5, wherein the second circuit includes:

a second-third switch element including a first electrode connected to a second-fifth node, a gate electrode connected to the second-eighth node, and a second electrode connected to the third power line;

a second-fourth switch element including a first electrode connected to the third power line, a gate electrode connected to a second-seventh node configured to receive the second scan signal, and a second electrode connected to the second-third node;

a second-fifth switch element including a first electrode connected to the data line, a gate electrode connected to a second-sixth node configured to receive the first scan signal, and a second electrode connected to the second-fifth node;

a second-sixth switch element including a first electrode connected to the second-second node, a gate electrode connected to the second-sixth node, and a second electrode connected to the second-third node;

a second-seventh switch element including a first electrode connected to the first power line, a gate electrode connected to the second-sixth node, and a second electrode connected to the second-first node; and a second-first capacitor connected between the second-second node and the second-fifth node.

7. The pixel circuit of claim 6, wherein the pixel circuit further includes:

a first-eighth switch transistor including a first electrode connected to a first gate line configured to receive the first scan signal, a gate electrode connected to a first mask signal line configured to receive the first mask signal, and a second electrode connected to the first-sixth node;

a first-ninth switch transistor including a first electrode connected to a second gate line configured to receive the second scan signal, a gate electrode connected to the first mask signal line, and a second electrode connected to the first-seventh node;

a first-tenth switch element including a first electrode connected to a third gate line configured to receive the light emission signal, a gate electrode connected to a second mask signal line configured to receive the second mask signal, and a second electrode connected to the first-eighth node;

a second-eighth switch element including a first electrode connected to the first gate line, a gate electrode connected to the second mask signal line, and a second electrode connected to the second-sixth node;

a second-ninth switch element including a first electrode connected to the second gate line, a gate electrode connected to the second mask signal line, and a second electrode connected to the second-seventh node; and a second-tenth switch element including a first electrode connected to the third gate line, a gate electrode connected to the first mask signal line, and a second electrode connected to the second-eighth node, and wherein each of the first-first to first-tenth switch transistors and each of the second-first to second-tenth switch transistors is configured to be turned on in response to the gate-on voltage and to be turned off in response to the gate-off voltage.

8. The pixel circuit of claim 7, wherein:

during a first period of each of a first frame period and a second frame period, the voltage of the second scan signal is the gate-on voltage, and the voltage of the first scan signal is the gate-off voltage, during a second period of each of the first frame period and the second frame period, the voltage of the first scan signal and the second scan signal is the gate-on voltage, during a third period of each of the first frame period and the second frame period, the voltage of the first scan signal is the gate-on voltage, and the voltage of the second scan signal is the gate-off voltage, during a fourth period of each of the first frame period and the second frame period, the voltage of the first scan signal and the second scan signal are the gate-off voltage, and wherein a voltage of the light emission signal:

swings between the gate-on voltage and the gate-off voltage in at least one of the first period, the second period, the third period and the fourth period of the first frame period, and swings between the gate-on voltage and the gate-off voltage in at least one of the first period, the second period, the third period and the fourth period of the second frame period.

9. The pixel circuit of claim 8, wherein the first mask signal is the gate-on voltage during the first frame period and the gate-off voltage during the second frame period, and wherein the second mask signal is the gate-off voltage during the first frame period and the gate-on voltage during the second frame period.

10. The pixel circuit of claim 2, wherein the first circuit includes:

a plurality of first mask switch transistors configured to transmit the first mask signal and the second mask signal to different nodes in the first circuit, and wherein the second circuit includes:

a plurality of second mask switch transistors configured to transmit the first mask signal and the second mask signal to different nodes in the second circuit.

11. The pixel circuit of claim 3, wherein:

the first driving transistor includes a first electrode connected to a first-first node to configured to receive a pixel driving voltage, a gate electrode connected to a first-second node, and a second electrode connected to a first-third node;

the second driving transistor includes a first electrode connected to a second-first node configured to receive the pixel driving voltage, a gate electrode connected to a second-second node, and a second electrode connected to a second-third node;

an anode electrode of the light-emitting element is connected to a first-fourth node, and a cathode electrode of the light-emitting element is connected to a second power line configured to receive a ground voltage, wherein the first emission switch transistor includes:

a first-first switch transistor including a first electrode connected to the first-third node, a gate electrode connected to a first-eighth node configured to receive the light emission signal, and a second electrode connected to the first-fourth node, and wherein the second emission switch transistor includes:

a second-first switch transistor including a first electrode connected to the second-third node, a gate electrode connected to a second-eighth node configured to receive the emission signal, and a second electrode connected to the first-fourth node.

12. The pixel circuit of claim 11, wherein the first circuit includes:

a first-second switch element including a first electrode connected to a first-fifth node, a gate electrode connected to the first-eighth node, and a second electrode connected to a third power line configured to receive a reference voltage is applied;

a first-third switch element including a first electrode connected to the first-second node, a gate electrode connected to a first-seventh node configured to receive the second scan signal is applied, and a second electrode connected to the third power line;

a first-fourth switch element including a first electrode connected to a data line configured to receive a data voltage, a gate electrode connected to a first-sixth node configured to receive the first scan signal is applied, and a second electrode connected to the first-fifth node;

a first-fifth switch element including a first electrode connected to the first-second node, a gate electrode connected to the first-sixth node, and a second electrode connected to the first-third node;

a first-sixth switch element including a first electrode connected to the data line, a gate electrode connected to the first-seventh node, and a second electrode connected to the first-fifth node; and a first-first capacitor connected between the first-second node and the first-fifth node.

13. The pixel circuit of claim 12, wherein the second circuit includes:

a second-second switch element including a first electrode connected to a second-fifth node, a gate electrode connected to the second-eighth node, and a second electrode connected to the third power line;

a second-third switch element including a first electrode connected to the second-second node, a gate electrode connected to a second-seventh node configured to receive the second scan signal, and a second electrode connected to the third power line;

a second-fourth switch element including a first electrode connected to the data line, a gate electrode connected to a second-sixth node configured to receive the first scan signal, and a second electrode connected to the second-fifth node;

a second-fifth switch element including a first electrode connected to the second-second node, a gate electrode connected to the second-sixth node, and a second electrode connected to the second-third node;

a second-sixth switch element including a first electrode connected to the data line, a gate electrode connected to the second-seventh node, and a second electrode connected to the second-fifth node; and a second-first capacitor connected between the second-second node and the second-fifth node.

14. The pixel circuit of claim 13, wherein the pixel circuit further includes:

a first-seventh switch transistor including a first electrode connected to a first gate line configured to receive the first scan signal, a gate electrode connected to a first mask signal line configured to receive the first mask signal, and a second electrode connected to the first-sixth node;

a first-eighth switch transistor including a first electrode connected to a second gate line configured to receive the second scan signal, a gate electrode connected to the first mask signal line, and a second electrode connected to the first-seventh node;

a first-ninth switch element including a first electrode connected to a third gate line configured to receive the light emission signal, a gate electrode connected to a second mask signal line configured to receive the second mask signal, and a second electrode connected to the first-eighth node;

a second-seventh switch element including a first electrode connected to the first gate line, a gate electrode connected to the second mask signal line, and a second electrode connected to the second-sixth node;

a second-eighth switch element including a first electrode connected to the second gate line, a gate electrode connected to the second mask signal line, and a second electrode connected to the second-seventh node; and a second-ninth switch element including a first electrode connected to the third gate line, a gate electrode connected to the first mask signal line, and a second electrode connected to the second-eighth node, and wherein each of the first-first to first-ninth switch transistors and the second-first to second-ninth switch transistors is configured to be turned on in response to the gate-on voltage and to be turned off in response to the gate-off voltage.

15. The pixel circuit of claim 14, wherein:

during a first period of each of a first frame period and a second frame period, the voltage of the second scan signal is the gate-on voltage, and the voltage of the first scan signal is the gate-off voltage, during a second period of each of the first frame period and the second frame period, the voltage of the first scan signal and the second scan signal is the gate-off voltage, during a third period of each of the first frame period and the second frame period, the voltage of the first scan signal is the gate-on voltage, and the voltage of the second scan signal is the gate-off voltage, during a fourth period of each of the first frame period and the second frame period, the voltage of the first scan signal and the second scan signal are the gate-off voltage, wherein a voltage of the light emission signal:

swings between the gate-on voltage and the gate-off voltage in at least one of the first period, the second period, the third period and the fourth period of the first frame period, and swings between the gate-on voltage and the gate-off voltage in at least one of the first period, the second period, the third period and the fourth period of the second frame period.

16. The pixel circuit of claim 15, wherein the first mask signal is the gate-on voltage during the first frame period and the gate-off voltage during the second frame period, and wherein the second mask signal is the gate-off voltage during the first frame period and the gate-on voltage during the second frame period.

17. The pixel circuit of claim 7, wherein the first circuit further includes:

a first-second capacitor connected between the first power line and the first-first node; and a first-third capacitor connected between the first-first node and the first-second node, and wherein the second circuit further includes:

a second-second capacitor connected between the first power line and the second-first node; and a second-third capacitor connected between the second-first node and the second-second node.

18. A display device comprising:

a display panel including a plurality of data lines, a plurality of gate lines, a plurality of power lines, and a plurality of sub-pixels;

a data driver configured to output a data voltage to the plurality of data lines; and a gate driver configured to output a gate signal to the plurality of gate lines, wherein each of the sub-pixels includes:

a light-emitting element configured to emit light;

a first driving transistor configured to control the light-emitting element to emit the light;

a second driving transistor configured to control the light-emitting element to emit the light;

a first emission switch transistor configured to electrically connect the first driving transistor to the light-emitting element in response to a light emission signal;

a second emission switch transistor configured to electrically connect the second driving transistor to the light-emitting element in response to the light emission signal;

a first circuit configured to charge a first data voltage during a first driving period and transfer the light emission signal to the first emission switch transistor during a second driving period; and a second circuit configured to transmit the light emission signal to the second emission switch transistor during the first driving period and charge a second data voltage during the second driving period, wherein:

the gate signal includes a first scan signal, a second scan signal, and the light emission signal, a first gate line connected to the first circuit is configured to receive the first scan signal and a first gate line connected to the second circuit is configured to receive the first scan signal, and a second gate line connected to the first circuit is configured to receive the second scan signal and a second gate line connected to the second circuit is configured to receive the second scan signal.

19. The display device of claim 18, wherein the light emission signal includes:

a first light emission signal applied to a first emission line connected to sub-pixels of a first color among the plurality of sub-pixels;

a second light emission signal applied to a second emission line connected to sub-pixels of a second color among the plurality of sub-pixels, the second color being different than the first color; and a third light emission signal applied to a third emission line connected to sub-pixels of a third color among the plurality of sub-pixels, the third color being different than the first color and the second color, and wherein a duty ratio of the first light emission signal is different than a duty ratio of each of the second light emission signal and the third light emission signal.

20. The display device of claim 18, further comprising:

a circuit configured to output a first mask signal and a second mask signal, wherein the display panel includes:

a first mask line configured to supply the first mask signal to the plurality of sub-pixels; and a second mask line configured to supply the second mask signal to the plurality of sub-pixels, wherein a voltage of the second mask signal is a gate-off voltage when a voltage of the first mask signal is a gate-on voltage, and the voltage of the second mask signal is the gate-on voltage when the voltage of the first mask signal is the gate-off voltage, and wherein the voltage of the first mask signal and the voltage of the second mask signal are inverted every cycle of an I-frame period, where I is a positive integer.

21. A pixel circuit comprising:

a light-emitting element configured to emit light;

a first compensation circuit electrically connected to the light-emitting element, and configured to receive a data voltage, a first scan signal, a second scan signal, a light-emitting signal, a first mask signal and a second mask signal; and a second compensation circuit electrically connected to the light-emitting element, and configured to receive the data voltage, the first scan signal, the second scan signal, the light-emitting signal, the first mask signal and the second mask signal, wherein the first compensation circuit is configured to drive the light-emitting element to emit light while the second compensation circuit performs an initialization step, a sampling step, a holding step, and a light emission step, and wherein the second compensation circuit is configured to drive the light-emitting element to emit light while the first compensation circuit performs at least one of the initialization step, the sampling step, and the holding step.

22. The pixel circuit of claim 21, wherein the first compensation circuit is further configured to:

block or allow the first and second scan signals based on the first mask signal, and block or allow the light-emitting signal based on the second mask signal, and wherein the second compensation circuit is further configured to:

block or allow the first and second scan signals based on the second mask signal, and block or allow the light-emitting signal based on the first mask signal.

23. The pixel circuit of claim 21, wherein the first compensation circuit includes a first driving transistor electrically connected to the light-emitting element, and wherein the second compensation circuit includes a second driving transistor electrically connected to the light-emitting element.

* * * * *